(12) United States Patent
Aranovich et al.

(10) Patent No.: US 9,803,622 B2
(45) Date of Patent: Oct. 31, 2017

(54) VERTICAL AXIS WIND TURBINE SYSTEM WITH ONE OR MORE INDEPENDENT ELECTRIC POWER GENERATION UNITS

(71) Applicant: VERT NOVA, LLC, Verona, PA (US)

(72) Inventors: Jorge Aranovich, Verona, PA (US); Frank W Cooper, Jr., Johnstown, PA (US); José Jorge Gayarre Villoria, Barcelona (ES)

(73) Assignee: VERT NOVA, LLC, Verona, PA (US)

( * ) Notice: Subject to any disclaimer, the term of this patent is extended or adjusted under 35 U.S.C. 154(b) by 0 days.

(21) Appl. No.: 14/938,076

(22) Filed: Nov. 11, 2015

(65) Prior Publication Data

US 2016/0061187 A1    Mar. 3, 2016

Related U.S. Application Data

(63) Continuation of application No. 14/479,256, filed on Sep. 5, 2014, now Pat. No. 9,222,461.

(Continued)

(51) Int. Cl.
*F03D 9/00* (2016.01)
*F03D 3/00* (2006.01)
(Continued)

(52) U.S. Cl.
CPC ............. *F03D 9/002* (2013.01); *F03D 3/005* (2013.01); *F03D 3/02* (2013.01); *F03D 3/062* (2013.01);
(Continued)

(58) Field of Classification Search
CPC ....................................................... F03D 3/02
(Continued)

(56) References Cited

U.S. PATENT DOCUMENTS

| 763,623 A | 6/1904 | Nance |
| 4,088,419 A * | 5/1978 | Hope ........................ F03D 3/02 |
| | | 290/55 |

(Continued)

FOREIGN PATENT DOCUMENTS

| CA | 1117427 | 2/1982 |
| CN | 201858085 | 6/2011 |

(Continued)

OTHER PUBLICATIONS

International Search Report mailed Dec. 8, 2014 in International Application No. PCT/US2014/54430.

(Continued)

*Primary Examiner* — Tulsidas C Patel
*Assistant Examiner* — Sean Gugger
(74) *Attorney, Agent, or Firm* — Smith, Gambrell & Russell, LLP

(57) ABSTRACT

A vertical axis wind turbine system having a vertical mast with one or more turbine units supported thereon. The turbine units are of modular construction for assembly around the foot of the mast; are vertically moveable along the height of the mast by a winch system; and are selectively interlocking with the mast to fix the turbine units in parked positions. The turbine system and each turbine unit includes a network of portals and interior rooms for the passage of personnel through the system, including each turbine unit. The electrical generators, and other sub-components, in the turbine units are of modular construction that permits the selective removal and replacement of component segments, including the transport of component segments through the portals and interior rooms of the turbine system while the turbine units remain supported on the mast. The electrical generators are also selectively convertible between AC generators and DC generators.

20 Claims, 45 Drawing Sheets

Related U.S. Application Data

(60) Provisional application No. 61/874,561, filed on Sep. 6, 2013.

(51) Int. Cl.
| | | |
|---|---|---|
| *F03D 3/02* | (2006.01) | |
| *F03D 3/06* | (2006.01) | |
| *H02K 13/00* | (2006.01) | |
| *F03D 15/20* | (2016.01) | |
| *F03D 13/20* | (2016.01) | |
| *F03D 9/25* | (2016.01) | |
| *F03D 80/50* | (2016.01) | |

(52) U.S. Cl.
CPC ............... *F03D 9/25* (2016.05); *F03D 13/20* (2016.05); *F03D 15/20* (2016.05); *F03D 80/50* (2016.05); *H02K 13/003* (2013.01); *F05B 2220/7066* (2013.01); *F05B 2220/7068* (2013.01); *Y02E 10/74* (2013.01)

(58) Field of Classification Search
USPC .......................................................... 290/55
See application file for complete search history.

(56) References Cited

U.S. PATENT DOCUMENTS

| | | | |
|---|---|---|---|
| 4,311,434 A | 1/1982 | Abe | |
| 5,676,524 A | 10/1997 | Lukas | |
| 6,278,198 B1 | 8/2001 | Willis et al. | |
| 6,357,549 B1 | 3/2002 | Brennan et al. | |
| 6,841,892 B1 | 1/2005 | Le Nabour et al. | |
| 7,218,013 B2 | 5/2007 | Platt | |
| 7,382,072 B2 | 6/2008 | Erfourth | |
| 7,442,009 B2 | 10/2008 | Arel | |
| 8,169,102 B2 | 5/2012 | Lin et al. | |
| 8,413,405 B2 | 4/2013 | Meesenburg | |
| 8,823,241 B2 * | 9/2014 | Jore ........................ | H02K 1/12 310/156.37 |
| 2004/0232792 A1 | 11/2004 | Erfourth | |
| 2007/0160473 A1 | 7/2007 | Arel | |
| 2007/0224029 A1 | 9/2007 | Yokoi | |
| 2007/0257494 A1 | 11/2007 | Vida Marques | |
| 2008/0095621 A1 | 4/2008 | Chi | |
| 2008/0197638 A1 | 8/2008 | Wobben | |
| 2009/0087311 A1 | 4/2009 | Wyborn et al. | |
| 2009/0220342 A1 | 9/2009 | Wu et al. | |
| 2010/0013238 A1 | 1/2010 | Jessie et al. | |
| 2010/0096854 A1 | 4/2010 | Paluszek et al. | |
| 2010/0232965 A1 | 9/2010 | Chang | |
| 2010/0253084 A1 | 10/2010 | Lin et al. | |
| 2010/0270808 A1 | 10/2010 | Bates et al. | |
| 2010/0278630 A1 | 11/2010 | Yamamoto et al. | |
| 2011/0115232 A1 | 5/2011 | Vanderdeen | |
| 2011/0133474 A1 * | 6/2011 | Haar ........................ | F03D 3/06 290/55 |
| 2012/0242087 A1 | 9/2012 | Ruder | |
| 2012/0269625 A1 | 10/2012 | Sabhapathy | |
| 2013/0038069 A1 * | 2/2013 | Hara ........................ | H02K 7/11 290/55 |
| 2015/0292480 A1 * | 10/2015 | Pawar ........................ | F03D 9/12 416/146 R |

FOREIGN PATENT DOCUMENTS

| | | |
|---|---|---|
| CN | 102828917 | 12/2012 |
| EP | 2 000 668 | 12/2008 |
| EP | 2 108 818 | 10/2009 |
| EP | 2 108 821 | 10/2009 |
| EP | 2 128 439 | 12/2009 |
| EP | 2 143 943 | 1/2010 |
| EP | 2 317 128 | 5/2011 |
| GB | 2 432 889 | 6/2007 |
| GB | 2457773 | 9/2009 |
| GB | 2 479 889 | 11/2011 |
| GB | 2 476 126 | 12/2011 |
| JP | 2011-064110 | 3/2011 |
| JP | 2013-040610 | 2/2013 |
| WO | 00/68570 | 11/2000 |
| WO | 2006/108264 | 10/2006 |
| WO | 2011/011018 | 1/2011 |
| WO | 2011/051003 | 5/2011 |
| WO | 2011/104506 A2 | 9/2011 |
| WO | 2011/150484 | 12/2011 |
| WO | 2013/040878 | 3/2013 |
| WO | 2013/054315 A2 | 4/2013 |
| WO | 2013/056322 | 4/2013 |
| WO | 2013/080392 | 6/2013 |

OTHER PUBLICATIONS

Written Opinion of the International Searching Authority mailed Dec. 8, 2014 in International Application No. PCT/US2014/54430.
Chinese Office Action dated Mar. 2, 2017 for CN 201480059108.6 (6 pages in Chinese, plus English Machine Translation).
Supplementary Partial European Search Report dated May 29, 2017 for EP 14842683.6 (8 pages).

* cited by examiner

VERTICAL AXIS WIND TURBINE SYSTEM WITH ONE OR MORE INDEPENDENT ELECTRIC POWER GENERATION UNITS

CROSS-REFERENCE TO RELATED APPLICATIONS

This application is a Continuation of U.S. patent application Ser. No. 14/479,256 (U.S. Pre-Grant Publication 2015/0069759), filed Sep. 5, 2014; which claims priority of U.S. provisional application 61/874,561, filed Sep. 6, 2013; the entire contents of each of which are incorporated herein by reference.

FIELD OF THE INVENTION

The present invention relates to the electric power generation industry. In particular, the present invention relates to a vertical axis wind turbine system having one or more independent turbine units for capturing and converting kinetic energy of wind into electric power via direct drive generators.

BACKGROUND OF THE INVENTION

Windmills, and rotating turbines generally, have been used for grinding grain; pumping water; and, beginning in the twentieth century, as wind turbines to convert kinetic energy of wind into electric power. Traditionally, wind turbines used to generate electricity from wind are horizontal axis turbines with aerodynamic blades radially arranged around a horizontal axis and fixed to an axle mounted at the top of a vertical mast.

Over the years since their introduction, the size and capacity of horizontal axis wind turbines have increased in order to generate more power from a single mast, thus seeking economies of scale to reduce the cost of electricity produced over their lifetimes. The additional power produced by a larger horizontal axis wind turbine requires a generator of larger capacity that, with currently deployed generator technologies, results in a proportionally larger and heavier generator. Consequently, a significant increase in the capacity of the horizontal axis wind turbine requires that its components be significantly larger and be built to withstand significantly larger loads. For example, an increase in the size of the generator necessitates an increase in the length and overall dimensions of the entire blade structure to accommodate both the additional weight and the incremental forces to which the blade will be subjected. However, the blade length of horizontal axis wind turbines has practical limits. Also, increasing the length of the blades makes them more complex and expensive to manufacture as well as to transport, especially in the case of offshore assemblies which will require large seagoing cranes for installation, maintenance and retrofitting of the generator.

Increases to the size of wind turbine generators will also complicate the assembly of those generators. At present, conventional generators require that the wind turbine components be lifted by cranes for placement and securement to a vertical mast via the peak of the mast. This is the case in both horizontal axis turbines, where the wind turbine sits at the peak of the mast, and vertical axis wind turbines, where the wind turbine is lifted above the mast peak and then lowered down to insert the mast peak through an opening in the wind turbine. As such, in either axis type, increases in generators size will require ever larger cranes and lifting equipment to raise the wind turbine units for mounting to the mast via the mast peak.

Increases in generator size also introduce further complications concerning component failure and maintenance. Larger generators will generally require more components and practically all components of a wind turbine constitute a single point of potential operational failure. That is, if one component in the turbine fails, the entire turbine ceases to generate electricity. The chances of component failure are enhanced when the wind turbine is exposed to environmental conditions prone to icing. Even in the absence of component failure, larger generators with more surface area for ice accumulation will present increased maintenance concerns. The accumulation of ice on the blades decreases aerodynamic efficiency and consequently the turbine's power conversion capacity. Excessive ice accumulation can also lead to dynamic loads greater than those tolerable according to design specifications requiring the operator, in these cases, to stop the turbine in order to prevent damage.

Accordingly, there remains a need in the art for a turbine system of a robust construction that can generate greater magnitudes of electrical power while also withstanding the increased stresses that accompany the increased output. There is also a need for a turbine system that facilitates accessibility, maintenance, and replacement of individual components—and does so without requiring a shutdown of the system while maintenance and repairs are underway, such that the system may continue generating electric power, even if at a lower generation capacity. There is also a need for a turbine system that may be assembled with commercial construction equipment—especially in offshore applications, such that there may be avoided any need for large seagoing cranes of considerable expense. There is also a need for a system that inhibits excessive ice accumulation.

SUMMARY OF THE INVENTION

Disclosed herein is a vertical axis wind turbine system having a vertical mast with one or more turbine units supported thereon, the turbine units each including a carousel-carrier and a carousel rotatably supported on the carousel-carrier. A vertical channel extends through a radial center of the carousel-carrier for reception of the vertical mast, and a vertical channel extends through a radial center of the carousel for reception of the carousel-carrier. The carousel includes a carousel-hub, a pair of carousel arms extending from the carousel-hub, and a carousel blade extending between the pair of carousel arms.

Each turbine unit in the turbine system is a modular turbine unit that is an assembly of multiple turbine segments, the turbine segments being circumferential segments that releasably couple to adjacent turbine segments. The carousel-carrier in each turbine unit is a modular carousel-carrier that is an assembly of multiple carouse-carrier segments, the carousel-carrier segments being circumferential segments that releasably couple to adjacent carousel-carrier segments. The carousel in each turbine unit is also a modular carousel that is an assembly of multiple carousel segments, the carousel segments being circumferential segments that releasably couple to adjacent carousel segments.

Within each turbine unit, at the carousel-carrier, is one or more electrical generator stators received within corresponding stator housings. The stators are composed of circumferential segments that are each individually received in a releasable fashion within the stator housing. The stator is segmented with a form factor of three, in that the number of stator segments is a factor of three.

The stator housing includes electrical connections for mating with pre-wired stator segments, including electrical connections for mating with stator segments pre-wired for generating alternating electrical current and electrical connections for mating with stator segments pre-wired for generating direct electrical current. In this way, the stator housing may selectively receive either AC wired stator segments or DC wired stator segments; and may selectively be switched between AC wired stator segments and DC wired stator segments.

Winches at the mast roof join with winch couplers on each of the turbine units for suspending and moving the turbine units along the vertical height of the mast. The mast has a number of vertical tracks and each turbine unit includes a number of movement mechanisms that ride along the vertical tracks on the mast as they move vertically along the mast. When two or more turbine units are supported on the mast, winch cables extending from the mast roof will pass through winch channels in higher turbine units to join with winch couplers on lower turbine units.

Each turbine unit includes load supporting and interlocking mechanisms for selectively interlocking the turbine unit with the mast to secure the turbine unit in a locked position fixing it against vertical movement along the mast. Each turbine unit also includes electrical communications mechanisms for selectively establishing an electrical communication between the mast and the turbine unit; and further includes vertical interlocking mechanisms for selectively interlocking vertically adjacent turbine units with one another.

The mast of the turbine system has one or more elevator shafts extending vertically therethrough and communicating with a number of portals along the external surface of the mast. Each turbine unit has a number of portals at the vertical channel of the carousel-carrier for aligning with the portals along the external surface of the mast to grant access and passage to interior rooms within the carousel-carrier. One or more portals at a radial outer surface the carousel-carrier align with one or more portals at the vertical channel of the carousel-hub to grant access and passage from interior rooms of the carousel-carrier to interior rooms of the carousel-hub. One or more portals at the radial outer surface the carousel-hub grant access and passage from interior rooms of the carousel-hub to interior rooms of the carousel arms.

The turbine unit includes a carousel braking mechanism and a carousel rotation mechanism. The carousel rotation mechanism may incrementally rotate the carousel around the carousel-carrier, while the carousel braking mechanism brakes the carousel against uncontrolled rotation from wind flow forces. The carousel braking and rotation mechanisms may be operated together to align portals in the carousel-hub with portals on the carousel-carrier, and maintain such alignment as desired.

The stator segments, as well as the segments of other cylindrical sub-components within the turbine units, are sufficiently sized for passage through the interior rooms and portals of the mast and turbine unit, such that individual stator segments (or other sub-component segments) may be selectively inserted and removed in the turbine system while the turbine unit remains supported on the mast.

The turbine units in the turbine system may be assembled by aligning a number of turbine segments around the foot of the mast; moving the individual turbine segments into engagement with one another; and joining adjacent turbine segments together at their circumferential edges with a number of coupling mechanisms. Assembly of a turbine unit in this manner simultaneously mounts the turbine unit to the mast, after which the winches at the mast roof may be coupled with the winch couplers of the turbine unit and the turbine unit lifted along the vertical height of the mast.

Both the foregoing general description and the following detailed description are exemplary and explanatory only and are intended to provide further explanation of the invention as claimed. The accompanying drawings are included to provide a further understanding of the invention; are incorporated in and constitute part of this specification; illustrate embodiments of the invention; and, together with the description, serve to explain the principles of the invention.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

The following disclosure discusses the present invention with reference to the examples shown in the accompanying drawings, though does not limit the invention to those examples.

Figure 1:
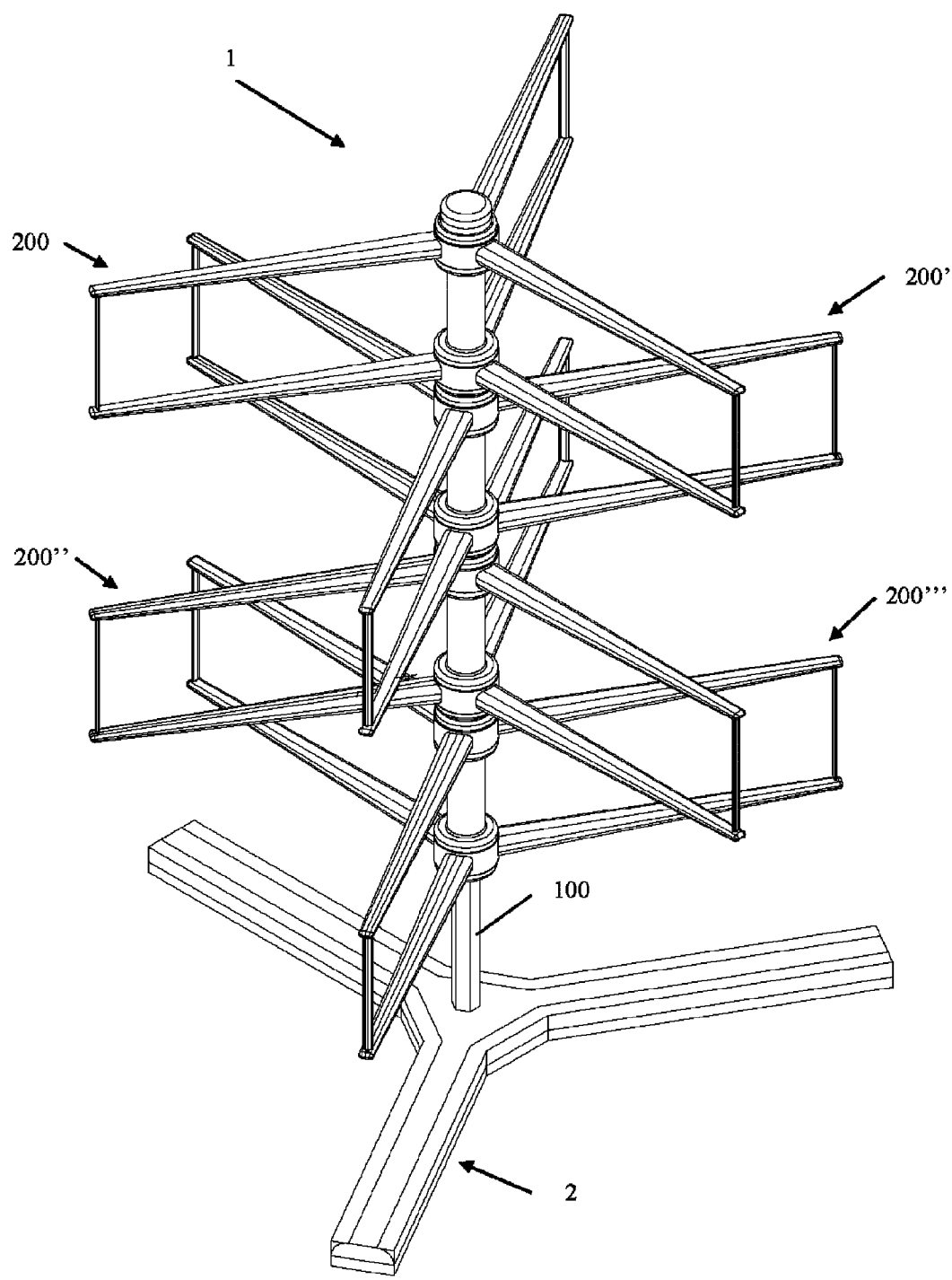
FIG. 1 shows a turbine system according to one embodiment of the invention.
Figure 2:
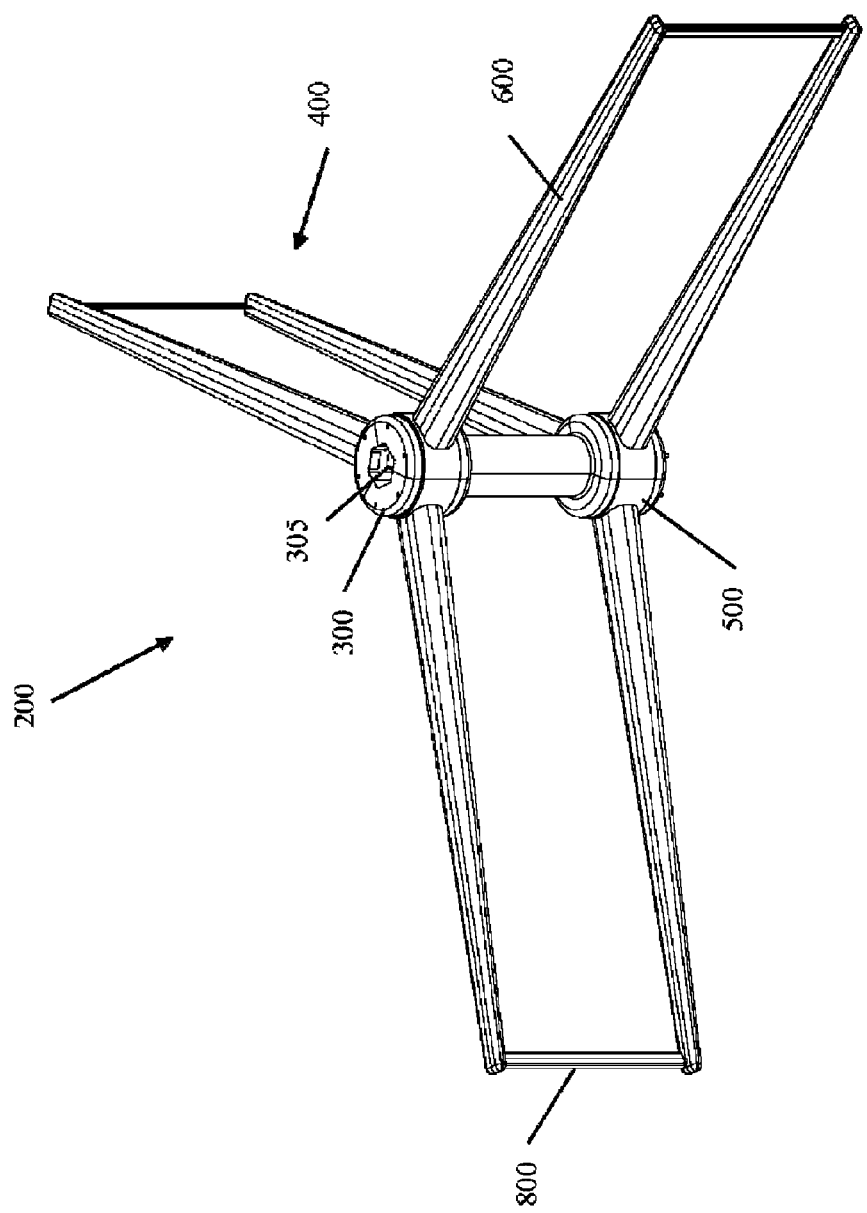
FIG. 2 shows a turbine unit of the turbine system in FIG. 1.

As shown by the example of FIG. 1, the present invention relates to a vertical axis wind turbine system 1 having one or more independent turbine units 200 arranged along a vertical mast 100. The individual turbine units 200 act independently to capture and convert the kinetic energy of the wind into electric power via direct drive electrical generators 230. Construction and maintenance of the wind turbine system 1 is facilitated by the individual turbine units 200, such as that shown in FIG. 2, being composed, primarily, of a carousel-carrier 300 and a carousel 400 that are both of modular constructions that facilitate assembly of multiple turbine segments 201 that may be joined to assemble a turbine unit 200 at the foot of the mast 100.

The carousel-carrier 300 of a turbine unit 200 is itself of a modular construction in that it is formed from multiple arc-shaped circumferential segments 301 that join together to yield a fully assembled carousel-carrier 300. Within the carousel-carrier 300 there is housed one or more generator stators 235. In an assembled state, the carousel-carrier 300 serves as both a supporting and elevating unit for a corresponding carousel 400, and the stationary portion of a direct drive electrical generating unit.

The carousel 400 of a turbine unit 200 is inclusive of a carousel-hub 500, a number of carousel arms 600, and a number of blades 800. The carousel-hub 500 is modular, in that it is formed from multiple arc-shaped circumferential segments 501 that join together to yield a fully assembled carousel-hub 500. Within the carousel-hub 500 there is supported one or more generator rotors 260, which rotate at a one-to-one ratio with the carousel 400. Along a radially outer surface of the carousel-hub 500 there are a number of arm sockets 550 for joining with proximal ends 605 of carousel arms 600 arranged in pairs of upper and lower arms 600A/600B and extending radially outward from the carousel-hub 500. Distal ends 630A/630B of the upper and lower carousel arms 600A/600B are joined to one another by a carousel blade 800. In an assembled state, when supported by a carousel-carrier 300, the carousel 400 serves as a wind capture unit, as well as a rotating portion of a direct electrical generating unit.

As each carousel-carrier 300 is inclusive of at least one direct drive stator 235 and each carousel 400 is inclusive of at least one direct drive rotation rotor 260, each individual turbine unit 200 is itself inclusive of at least one direct drive electrical generator 230—such that each individual turbine unit 200 is operational as a direct drive electrical generating unit. In this way, each individual turbine unit 200 may independently generate electrical power regardless of the presence and/or operating state of any other turbine units 200 along the mast 100.

Vertical Mast

Figure 3:
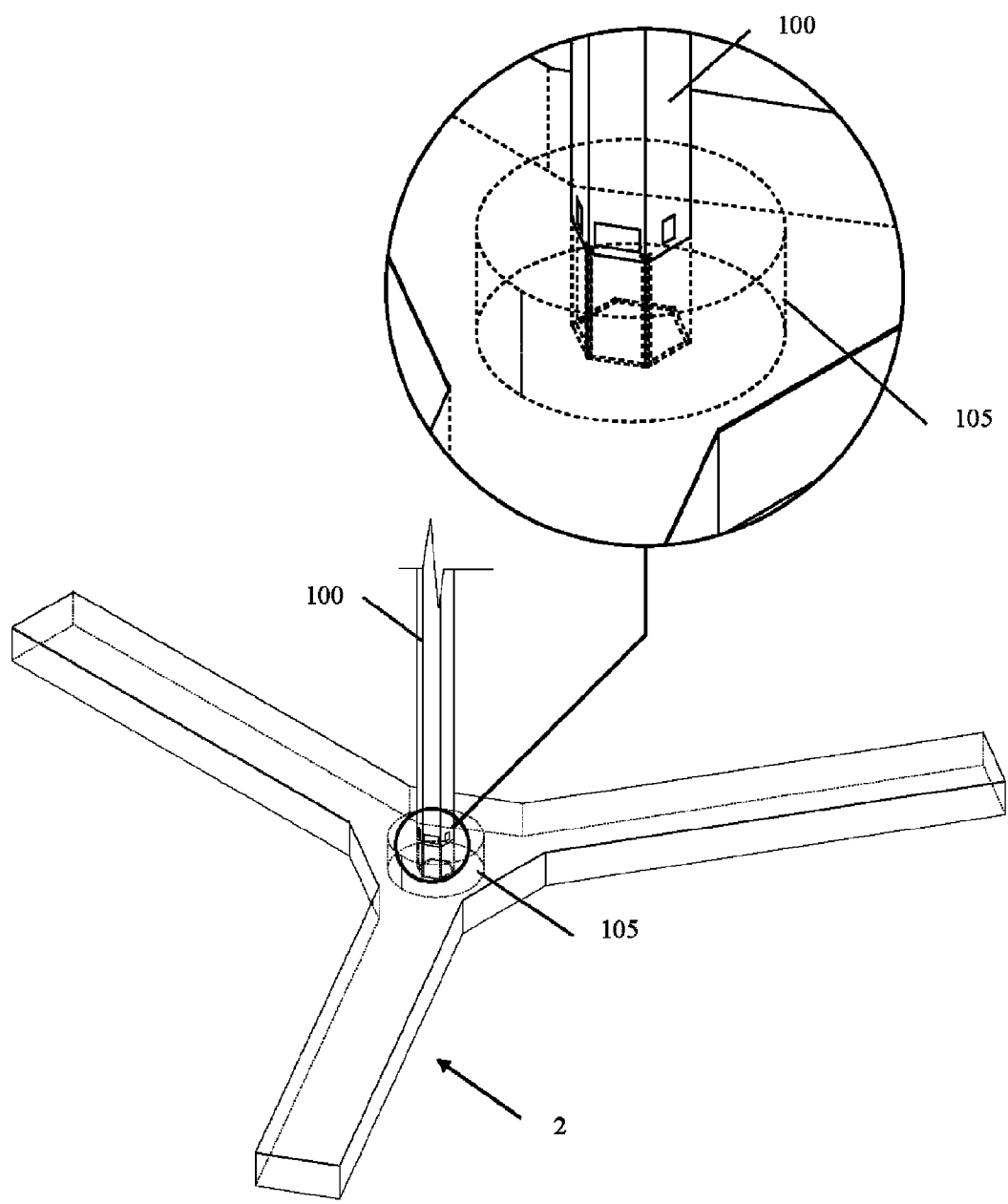
FIG. 3 shows a mast base of the turbine system in FIG. 1.
Figure 4:
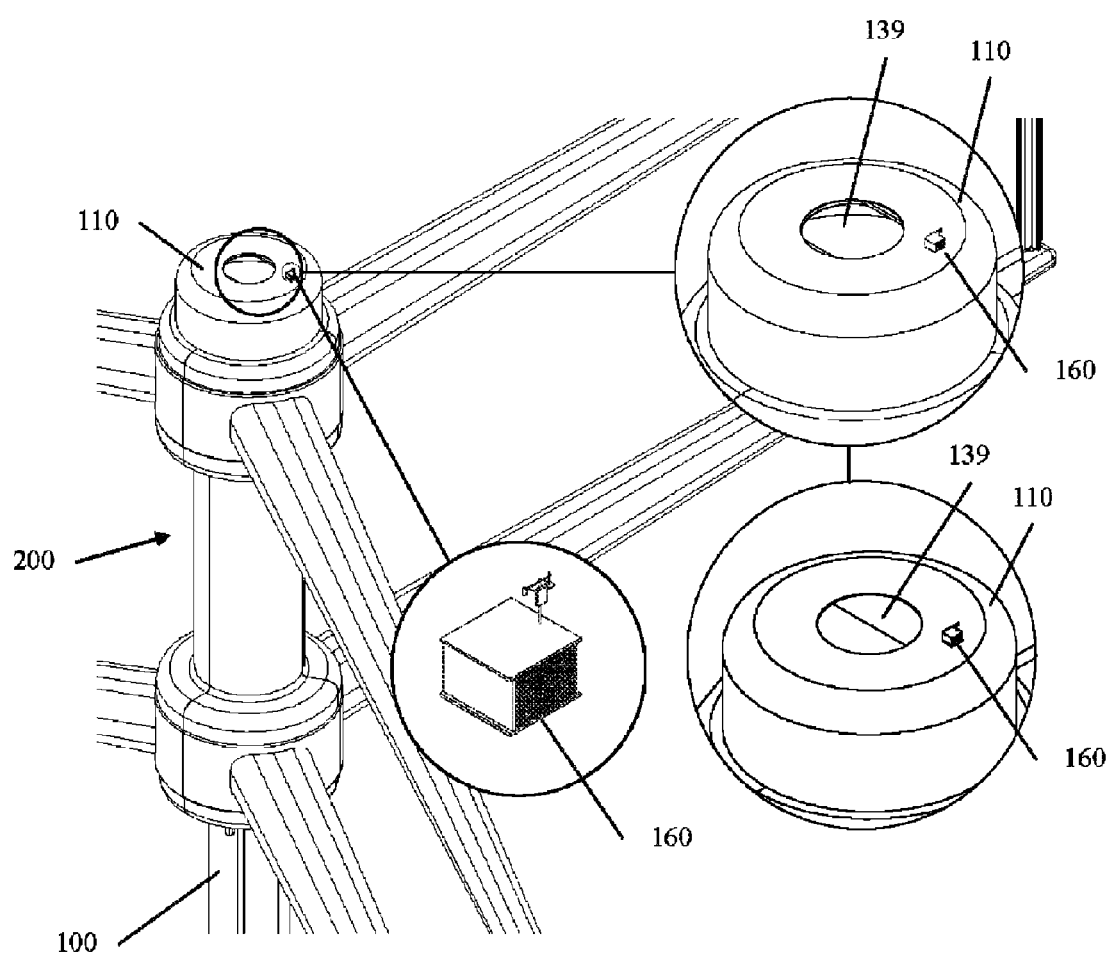
FIG. 4 shows an exterior view of a mast roof of the turbine system in FIG. 1.

As shown by FIGS. 3-4, the mast 100 extends vertically from a mast base 105 and culminates with a mast roof 110. The mast base 105 may include an anchoring system for securing the mast 100 to a base-structure 2, such as an onshore foundation; an offshore platform; an offshore floating vessel; or an offshore submerged and tethered buoyant structure. The mast base 105 and/or the base-structure 2 may house power distribution, power storage, and ancillary power and/or other support systems.

Figure 5:
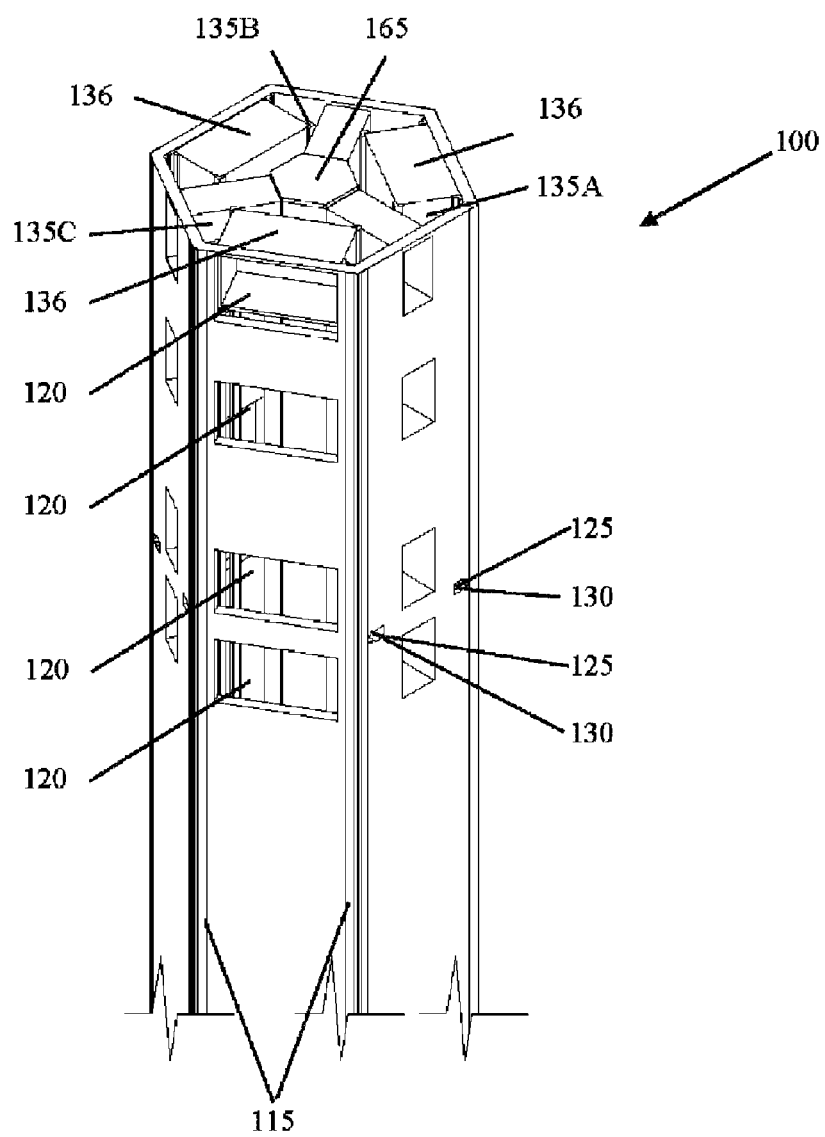
FIG. 5 shows a length of the mast of the turbine system in FIG. 1.

The mast 100 is of a rigid or semi-rigid construction. A semi-rigid construction being one that is of sufficient rigidity to fully support the mast 100, and the components carried thereon (and therein), though also being of ample elasticity to compensate for stresses incurred from wind forces and the movement of the turbine units 200 on the mast 100. As shown in FIG. 5, the external surface of the mast 100 has a polygonal cross-section (in a horizontal plane extending transverse to a vertical major axis) with a series of vertical tracks 115 extending upward along an outer surface thereof. Along the height of the mast 100 there are arranged a number of load supporting mechanisms 125; a number of electrical communications mechanisms 130; and a number of portals 120.

The load supporting mechanisms 125 along the exterior surface of the mast 100 mate with load supporting mechanisms 310 on the carousel-carrier 300 (as in FIGS. 11-12) for securing the carousel-carrier 300 at a position along the mast 100, and fixing it against vertical motion along the mast 100 while so secured. In the example shown in FIG. 5, the load supporting mechanisms 125 along the external surface of the mast 100 are cavities 125 opening at the surface and extending into an interior of the mast 100 for mating with load supporting mechanisms 310 provided on the carousel-carriers 300 in the form of horizontal beams 310 that are horizontally movable for insertion in the cavities 125.

In general, references to electrical communications mechanisms of the turbine system 1 apply to arrangements for both electric power transmission and signal transmission. As such, unless otherwise stated, discussions of electrical communications mechanisms used for power transmission are also applicable to signal transmission and vice versa.

The electrical communications mechanisms 130 along the exterior surface of the mast 100 mate with electrical communications mechanisms 315 on the carousel-carrier 300 for establishing an electrical communication between the mast 100 and the carousel-carrier 300. Together, the electrical communications mechanisms 130/315 establish a male-female, insertion-type electrical joint, wherein the electrical communications mechanisms 130 along the external surface of the mast 100 are electrical sockets 130 opening at the surface and extending into an interior of the mast 100 for mating with electrical communications mechanisms 315 provided on the carousel-carriers 300 in the form of electrical plugs 315 that are movable for insertion in the electrical sockets 130. In some examples, such as that shown in FIG. 5, the electrical communications mechanisms 130/315 may be integral with the load supporting mechanisms 125/310. For example, when the load supporting mechanisms 125/310 are cavities 125 and horizontal beams 310, the electrical sockets 130 may be positioned within the cavities 125 and the electrical plugs 315 may protrude from the horizontal beams 310.

As shown in the example in FIG. 5, three elevator shafts 135A/135B/135C may extend vertically through the mast 100, each carrying an elevator 136 for the transportation of personnel and equipment vertically along the mast 100. The elevators 136 are hoisted by elevator cables 137 communicating with elevator motors at either the mast base 105 or the mast roof 110; and ride along elevator rails 138. The elevator shafts 135 communicate directly with the portals 120 along the external surface of the mast 100 so as to enable passage of personnel and equipment from the elevator 136 to regions external of the mast 100 (e.g., a turbine unit 200). However, the elevator shafts 135 need not open directly to the portals 120, and there may instead be one or more interior rooms between the elevator shafts 135 and the portals 120 along the external surface of the mast 100. Such interior rooms may house operations systems, or serve simply as walkways between the elevator shafts 135 and the exterior portals 120.

As seen in FIG. 5, a mast core 165 extending vertically at the center of the mast 100 may house one or more stairwells spanning the vertical height of the mast 100. The mast core 165 may be connected to the mast 100 at multiple points along its length by means of three structures, arranged at 120° from one another, with internal passageways that communicate the stairwells spanning the vertical height of the mast 100, through portals, with interior rooms of the mast 100 and with interior rooms of the carousel-carrier 300, through which personnel may pass. At the bottom position of the mast 100, the stairwells of the mast core 165 may communicate through portals with interior rooms at the mast base 105, through which personnel may pass. At the top position of the mast 100, the stairwells of the mast core 165 may communicate through portals with interior rooms at the mast roof 110, through which personnel may pass.

Figure 6:
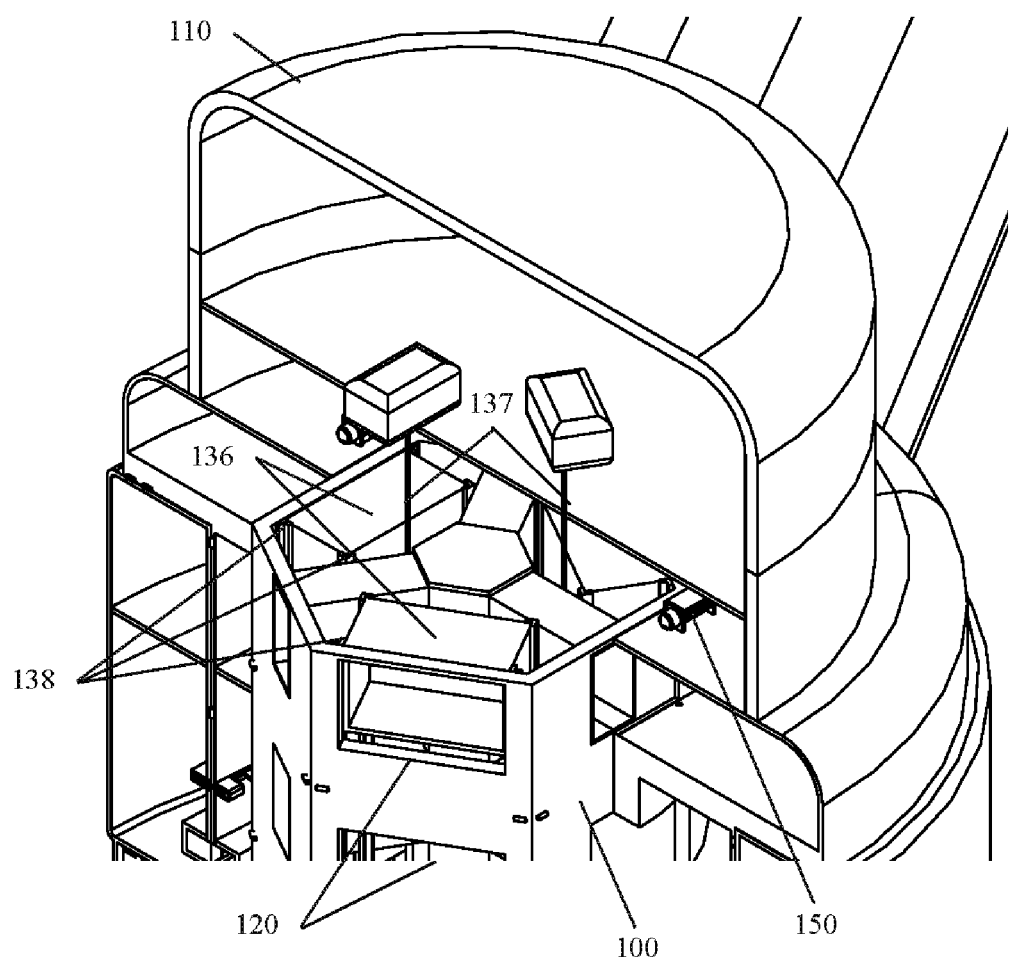
FIG. 6 shows a cross-sectional view of a mast roof of the turbine system in FIG. 1.
Figure 7:
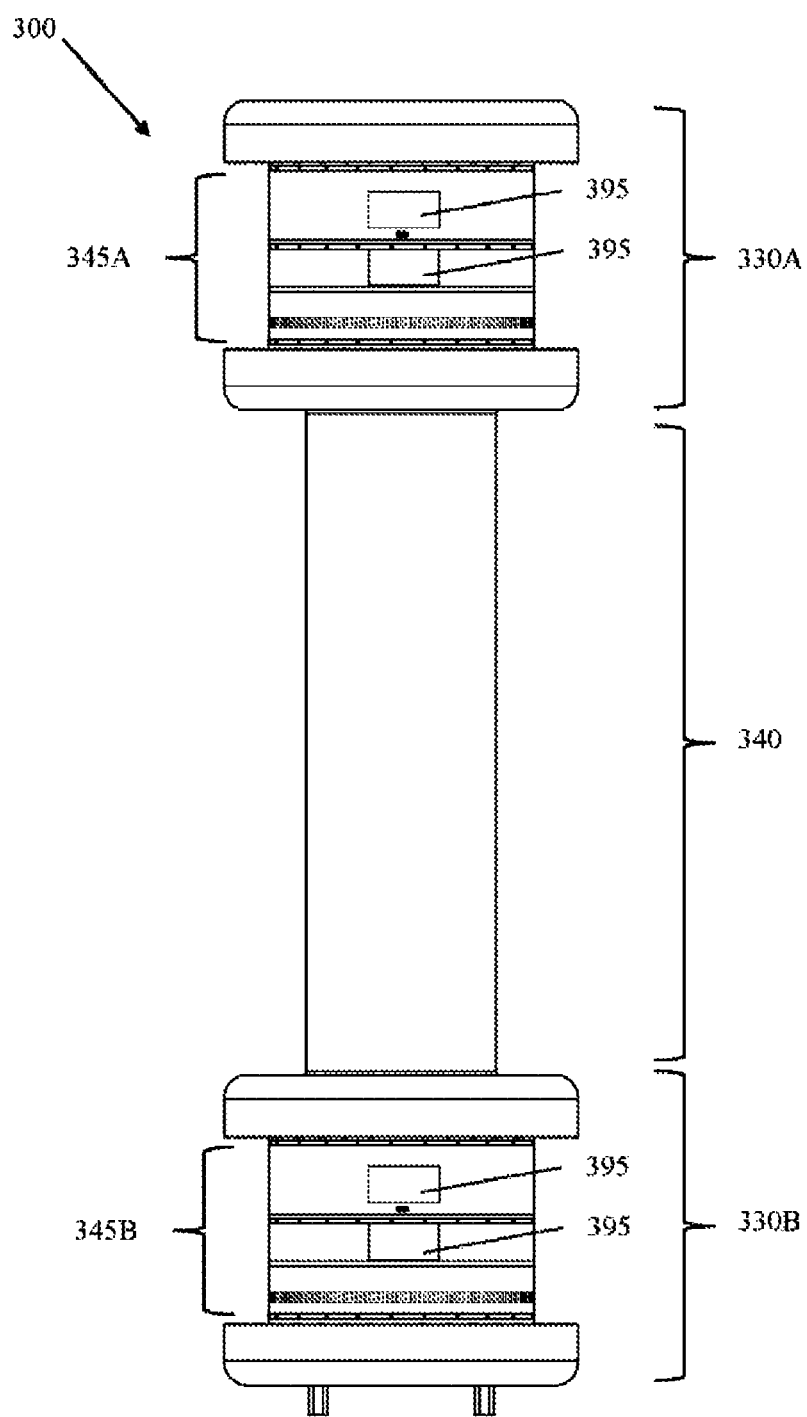
FIG. 7 shows a carousel-carrier of a turbine unit of the turbine system in FIG. 1.

At the bottom position of the mast 100, the elevator shafts 135 may communicate through portals with interior rooms at the mast base 105, through which personnel and equipment may pass. At the top position of the mast 100, the elevator shafts 135 may communicate with interior rooms at the mast roof 110, through which personnel and equipment may pass to gain access to the mast roof 110. In some examples, such as that shown in FIG. 4, the elevator shafts 135 may also communicate with an elevator gate 139 that opens directly to the mast roof 110. As seen in FIG. 6, the mast roof 110 includes a number of winches 150 for raising and lowering turbine units 200 vertically along the mast 100. The mast roof 110 may also include a weather station 160 for monitoring weather patterns and environmental conditions in the region of the turbine system 1; and providing real-time data to a data acquisition and monitoring subsystem for monitoring weather patterns and environmental conditions to coordinate operation of the turbine system 1 and the turbine units 200.

The mast roof 110 may optionally include additional component handling systems. For example, one or more jib cranes may be mounted at an upper end of the mast 100 or on the mast roof 110 for assisting in assembling, maintaining and replacing individual components, assemblies, and sub-assemblies of the turbine system 1. In some examples, the mast roof 110 may have a circular surface, and there may be two radially offset jib cranes mounted at the mast roof 110 that are moveable for stowing when not in use.

Carousel-Carrier

As the supporting and elevating component of the turbine unit 200, the carousel-carrier 300 rotatably supports a carousel 400 and is moveable vertically along the mast 100 via winch cables 151 extending from the winches 150 at the mast roof 110 for changing the elevation of the carousel-carrier 300 (and the turbine unit 200 as a whole) along the vertical height of the mast 100.

The carousel-carrier 300 has a generally cylindrically symmetric structure. As seen in the example of FIGS. 7-10, the carousel-carrier 300 includes an upper compartment 330A with interior rooms 331A-334A therein; a lower compartment 330B with interior rooms 331B-334B therein; and an intermediate section 340 extending between the upper and lower compartments 330A/330B. In the example shown in FIGS. 7-8, the intermediate section 340 isolates the upper and lower compartments 330A/330B, as well as the interior rooms 331A-334A and 331B-334B in the two compartments. In other examples, the intermediate section 340 may include a passageway (e.g., a ladder or stairwell) permitting passage between interior rooms of the upper and lower compartments 330A/330B. A vertical channel 305 extends entirely through a radial center of the carousel-carrier 300, from a bottom surface to a top surface; and at least one peripheral channel 345 extends circumferentially around a radial outer surface of the carousel-carrier 300. In the example of FIGS. 7-10, there are two peripheral channels 345A/345B; one at the upper compartment 330A and one at the lower compartment 330B.

As shown in FIGS. 7-10, the carousel-carrier 300 has a common configuration at the upper and lower ends. As such, unless otherwise stated, discussions of components at the top of the carousel-carrier 300 are also applicable to those common components at the bottom of the carousel-carrier 300, and vice versa.

Figure 8:
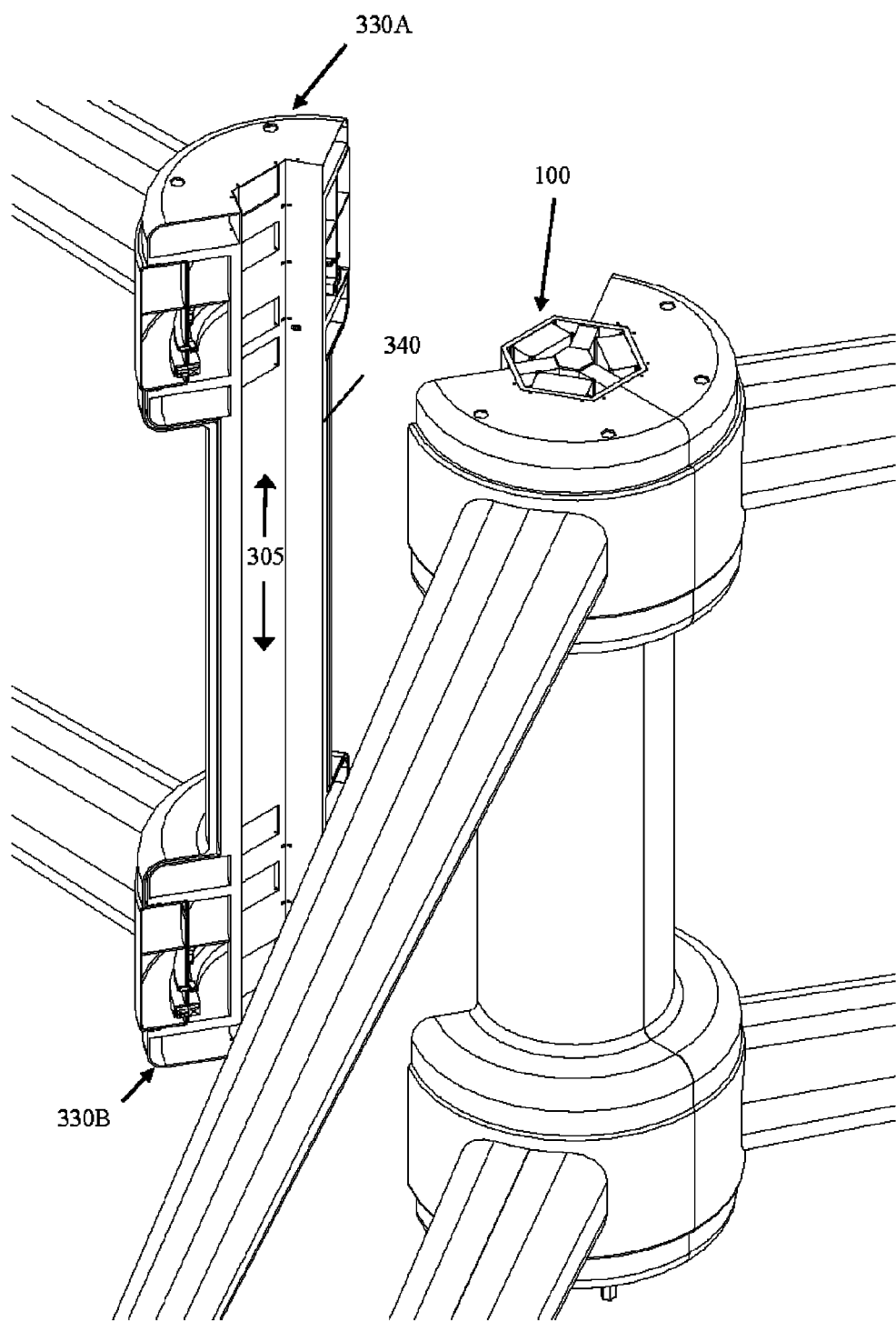
FIG. 8 shows two turbine segments joined to the mast of the turbine system in FIG. 1, and a third turbine segment detached from the mast.
Figure 9:
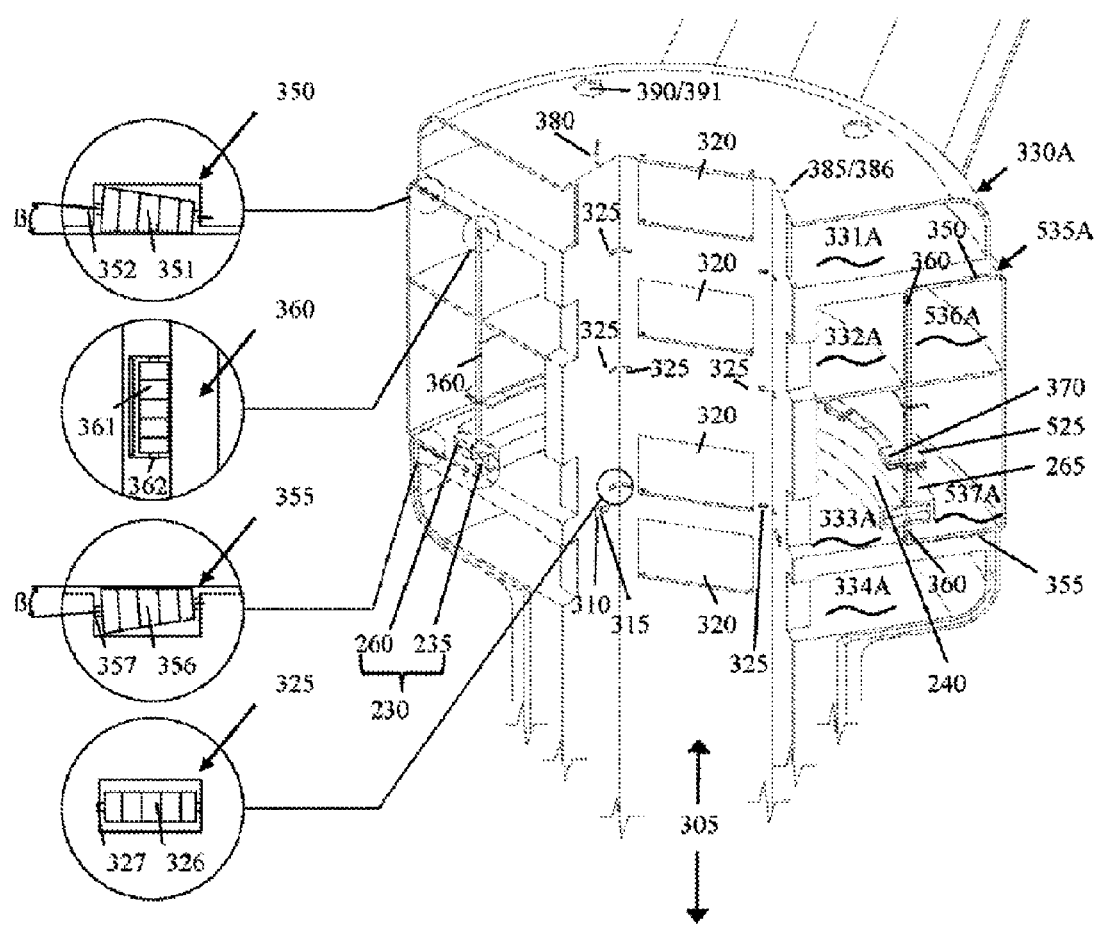
FIG. 9 shows an upper compartment of the turbine segment in FIG. 8.
Figure 10:
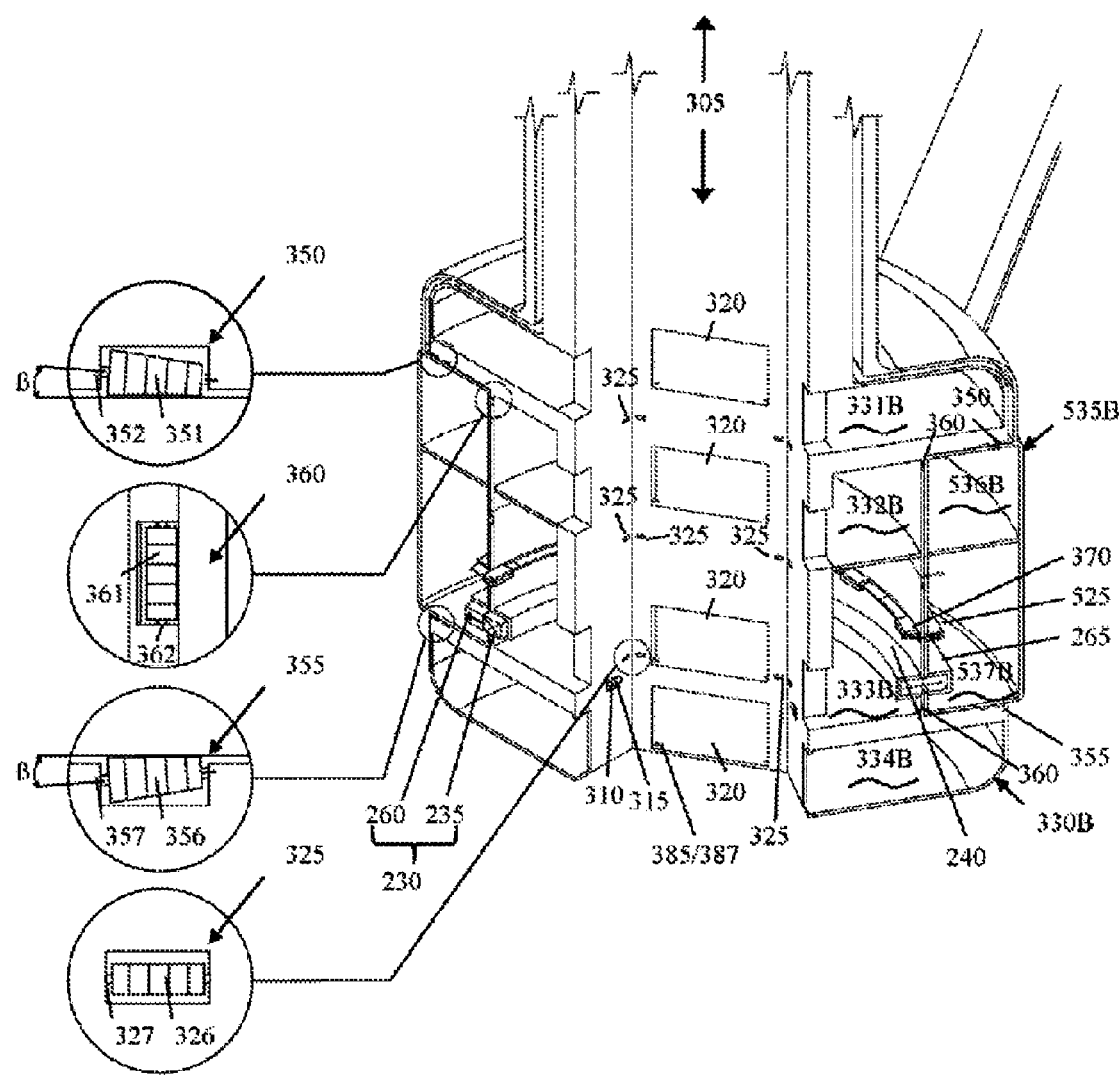
FIG. 10 shows a lower compartment of the turbine segment in FIG. 8.

The vertical channel 305, at the radial center of the carousel-carrier 300, has a polygonal cross-section (in the horizontal plane) corresponding with the polygonal cross-section of the outer surface of the mast 100. As shown in FIGS. 8-10, at a surface of the vertical channel 305 there are arranged: a number of portals 320; a number of movement mechanisms 325; a number of load supporting mechanisms 310; and a number of electrical communications mechanisms 315.

The portals 320 at the vertical channel 305 of the carousel-carrier 300 permit passage into the interior rooms 331-334 of the upper and lower compartments 330, and are positioned for alignment and communication with the portals 120 along the exterior surface of the mast 100. In this way, when aligned with the portals 120 along the surface of the mast 100, the portals 320 in the vertical channel 305 permit the passage of personnel and equipment from the elevator shaft 135 to the interior rooms 331-334 in the upper and lower compartments 330.

In the example shown in FIG. 9, the movement mechanisms 325 at the vertical channel 305 of the carousel-carrier 300 are cylindrical rollers 325 mounted on roller axles 327 having a longitudinal length extending in the horizontal direction, such that the cylindrical rollers themselves are horizontally aligned. FIG. 9 shows an example with multiple circular series of cylindrical rollers 325 extending circumferentially along the vertical channel 305, however in other examples there may be only a single circular series of the cylindrical rollers 325. The horizontally aligned cylindrical rollers 325 are positioned for alignment and engagement with the vertical tracks 115 extending up the external surface of the mast 100. As shown in FIG. 9, the cylindrical rollers 325 may include multiple cylindrical roller segments 326 (e.g., two, three, four or more segments) received on a common roller axle 327, with each roller segment 326 having a common and constant diameter. In other examples, the cylindrical rollers 325 may each be formed of a single integral roller body. Alignment and engagement of the cylindrical rollers 325 with the vertical tracks 115 on the mast 100 facilitates a rolling movement of the carousel-carrier 300 along the mast 100 as it is raised and lowered by the winches 150 at the mast roof 110. In order to dampen the transmission of vibrations from the carousel-carrier 300 to the mast 100, the roller axles 327 may be secured to the carousel-carrier 300 by flexible anti-vibration mountings that serve as vibration dampers. The corresponding polygonal shapes of the mast 100 and the vertical channel 305 in the carousel-carrier 300 further promote a stable linear vertical movement of the carousel-carrier 300 by inhibiting rotation of the carousel-carrier 300 around the mast 100.

The load supporting mechanisms 310 exposed at the vertical channel 305 of the carousel-carrier 300 mate with the load supporting mechanisms 125 along the external surface of the mast 100 for securing the carousel-carrier 300 at a position along the mast 100, and fixing it against vertical motion along the mast 100 while so secured. In the example shown in FIGS. 11-12, the load supporting mechanisms 310 along the vertical channel 305 of the carousel-carrier 300 are horizontal beams 310 that are horizontally movable for insertion in the load supporting mechanisms 125 provided along the external surface of the mast 100 in the form of cavities 125 opening at the surface and extending into an interior of the mast 100. As shown in FIG. 6, movement of the horizontal beams 310 is controlled by a motorized pinion system in the carousel-carrier 300 that includes a pinion meshed with a rack gear fixed to an end of the horizontal beam 310.

The electrical communications mechanisms 315 exposed at the vertical channel 305 of the carousel-carrier 300 mate with the electrical communications mechanisms 130 on the external surface of the mast 100 for establishing an electrical communication between the carousel-carrier 300 and the mast 100. Together, the electrical communications mechanisms 315/130 establish a male-female, insertion-type electrical joint wherein the electrical communications mechanisms 315 at the vertical channel 305 of the carousel-carrier 300 are electrical plugs 315 that mate with the electrical communications mechanisms 130 provided on the mast 100 in the form of electrical sockets 130. The electrical plugs 315 may be made horizontally movable for insertion in the electrical sockets 130 by a motorized pinion system in the carousel-carrier 300 that includes a pinion meshed with a rack gear fixed to an end of the electrical plug 315. In some examples, the electrical communications mechanisms 130/315 may be integral with the load supporting mechanisms 125/310. For example, when the load supporting mechanisms 125/310 are cavities 125 and horizontal beams 310, the electrical sockets 130 may be positioned within the cavities 125 and the electrical plugs 315 may protrude from the horizontal beams 310.

Figure 13:
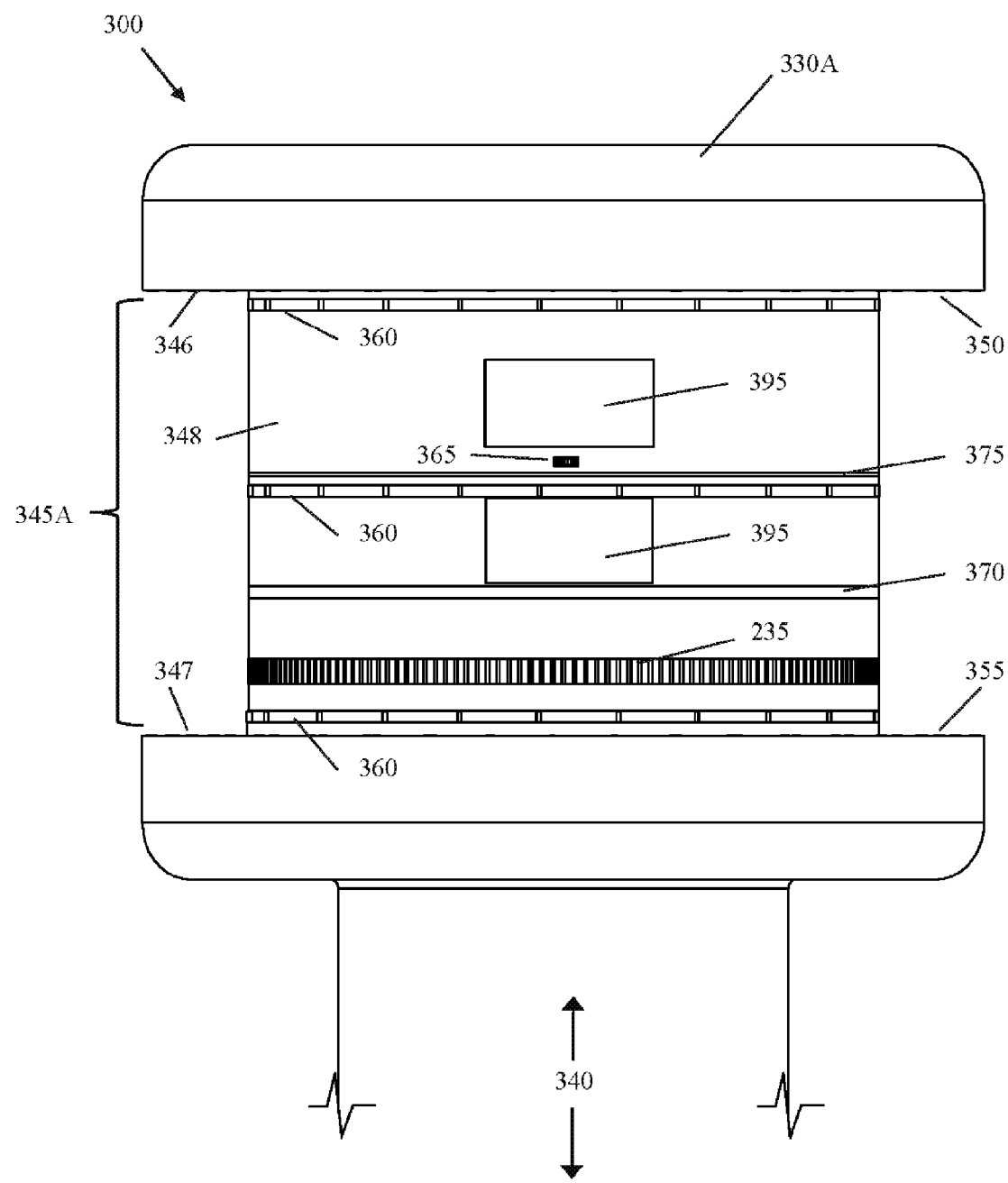
FIG. 13 shows an external view of an upper compartment of an assembled carouse-carrier in the turbine system of FIG. 1.
Figure 14:
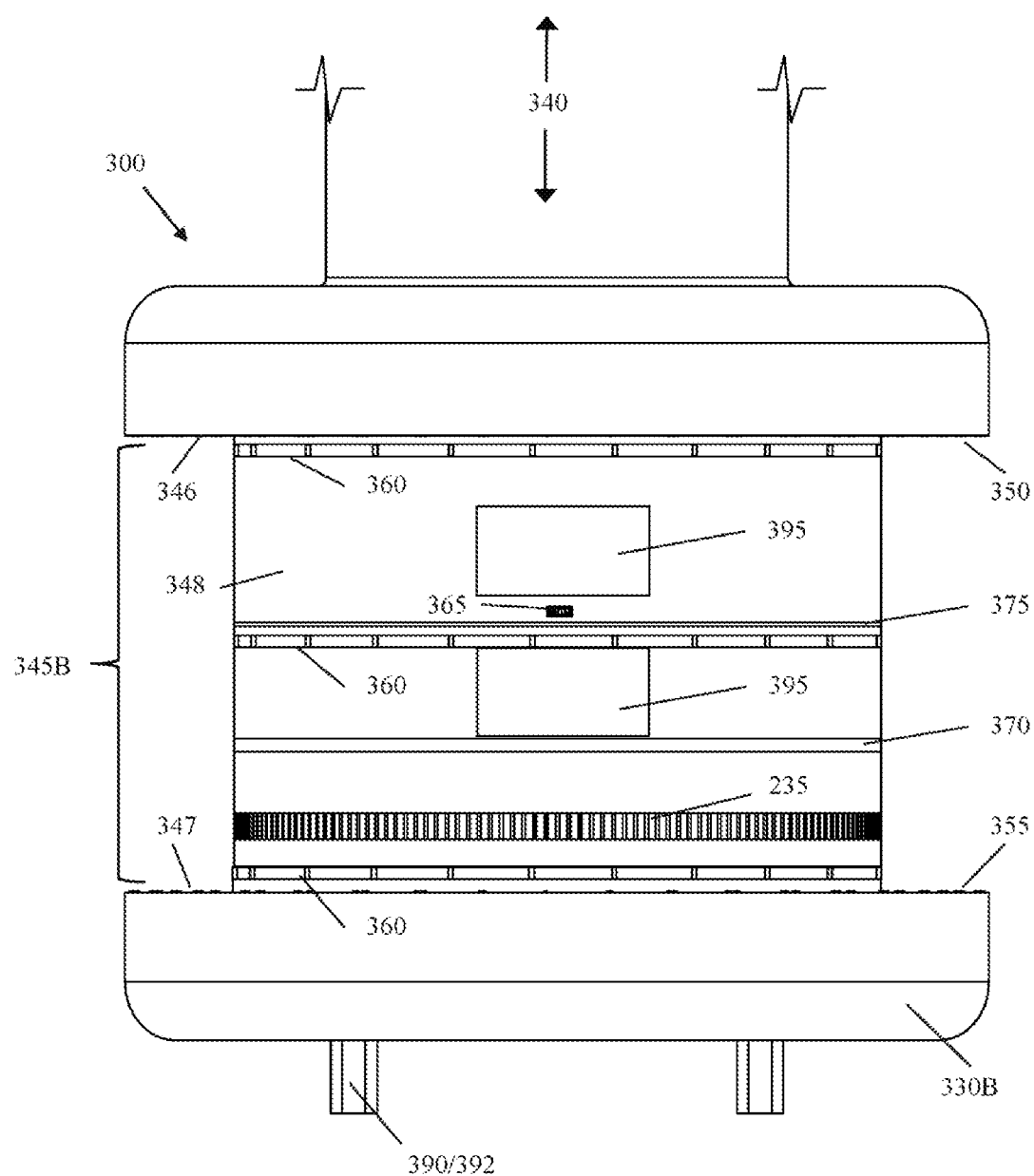
FIG. 14 shows an external view of a lower compartment of an assembled carouse-carrier in the turbine system of FIG. 1.
Figure 15A:
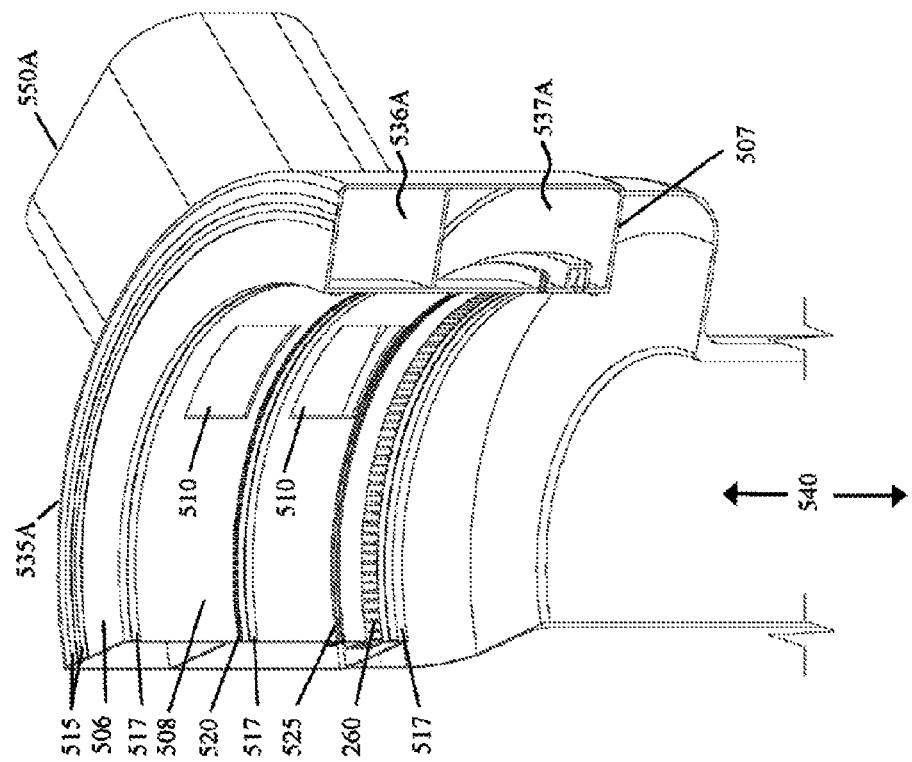
FIG. 15A shows a perspective view of a segment of the upper compartment of the carousel-carrier in FIG. 13.
Figure 15B:
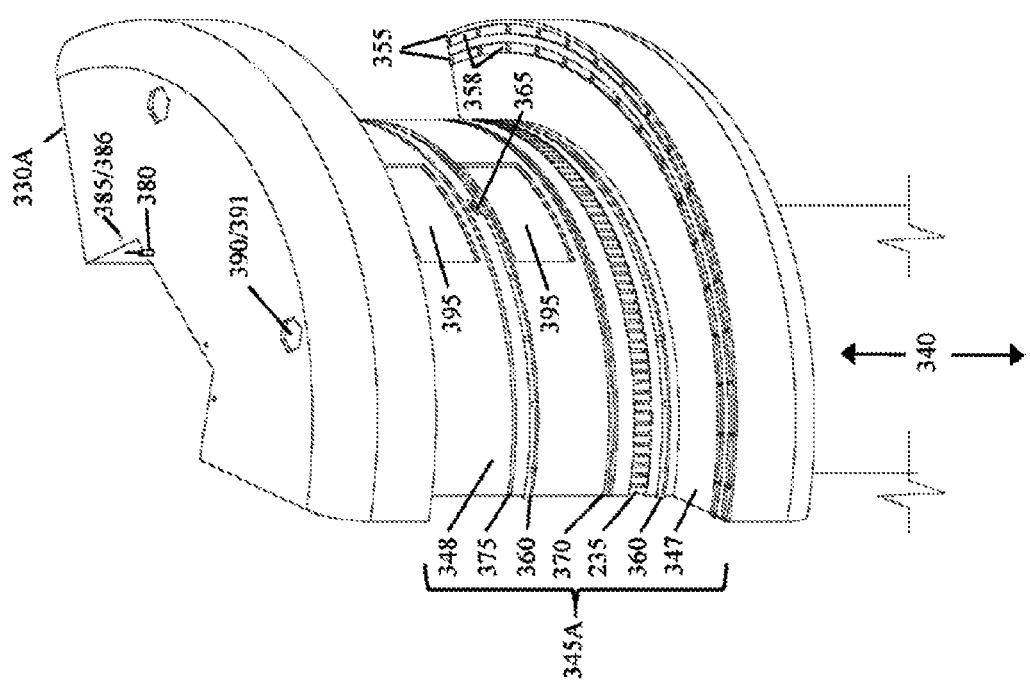
FIG. 15B shows a perspective view of a segment of an upper compartment of a carousel-hub that mates with the segment of the upper compartment of the carousel-carrier in FIG. 15A.

As shown in FIGS. 13-14, the peripheral channel 345 at the radial outer surface of the carousel-carrier 300 has a circular shape, extends circumferentially around the carousel-carrier 300, and has exposed along surfaces therein: a surface of a generator stator 235; a number of portals 395; a number of movement mechanisms 350/355/360; a carousel rotation mechanism 365; a number of braking mechanisms 370; and a number of electrical communications mechanisms 375.

The individual elements exposed at the peripheral channel 345 may be exposed at multiple surfaces thereof. For example, the movement mechanisms 350/355/360 may be arranged in a number of series along multiple surfaces in the peripheral channel 345, which may include: a series of movement mechanisms 350 along a top annular surface 346; a series of movement mechanisms 355 along a bottom annular surface 347; and/or a series of movement mechanisms 360 along an intermediate annular surface 348.

Figure 11:
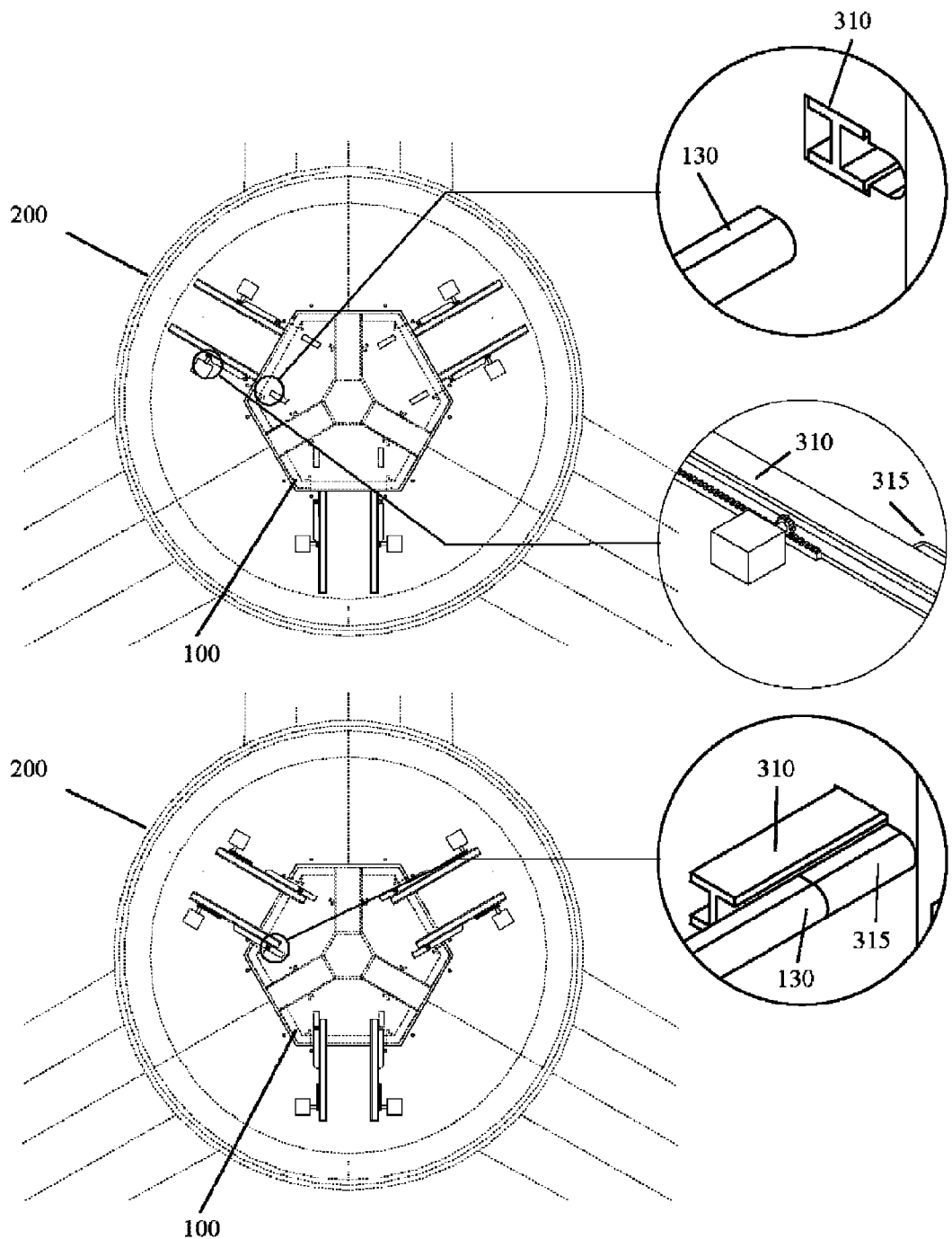
FIG. 11 shows load supporting and electrical communications mechanisms of the turbine system in FIG. 1.
Figure 12:
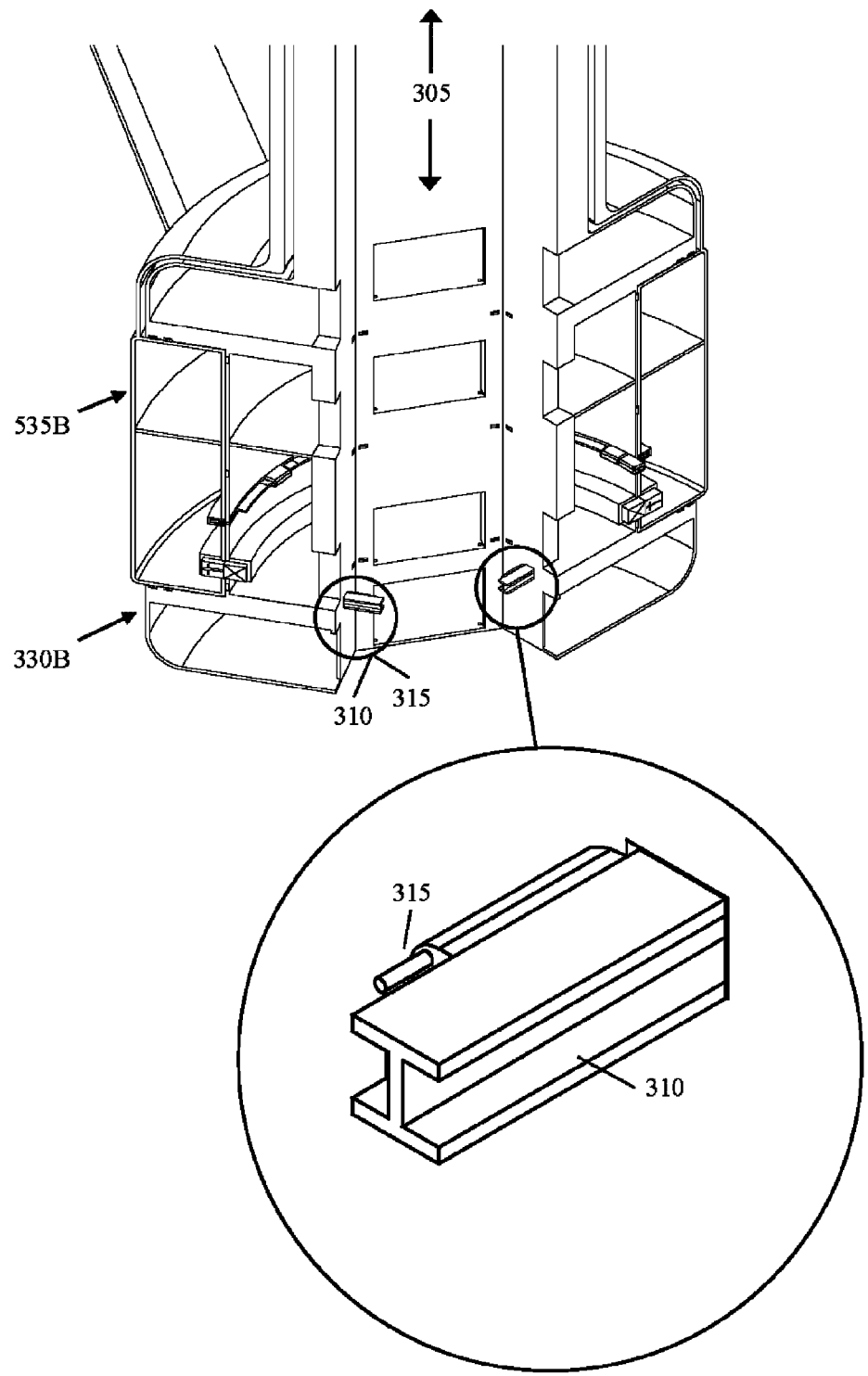
FIG. 12 shows the load supporting and electrical communications mechanisms of FIG. 11, as arranged at a lower compartment of the turbine segment in FIG. 8.

As seen in FIGS. 10-11, a generator stator 235 is stored in a stator housing 240 within an interior room 333 of the compartments 330 in the carousel-carrier 300, with a surface of the stator 235 exposed at the peripheral channel 345 for exposure to a corresponding generator rotor 260 in a carousel-hub 500. The stator 235 communicates with electrical communications mechanisms 315 arranged at the vertical channel 305 for delivering generated electrical energy to energy management systems at the mast base 105 and/or the base-structure 2. There is at least one stator 235 stored in each compartment 330 of the carousel-carrier 300.

The portals 395 at the peripheral channel 345 of the carousel-carrier 300 enable passage of personnel and equipment from at least interior rooms 332-333 of the carousel-carrier 300 to regions external of the carousel-carrier 300 (e.g., a carousel 400).

In the example shown in FIG. 10, there are two types of movement mechanisms—cylindrical rollers 360 arranged in one or more circular rings at the intermediate annular surface 348 of the peripheral channel 345; and conical rollers 350/355 arranged in one or more radially concentric rings at the top and bottom annular surfaces 346/347 of the peripheral channel 345.

The cylindrical rollers 360 are mounted on roller axles 362 having longitudinal lengths extending in the vertical direction, such that the cylindrical rollers 360 are vertically aligned. FIGS. 13-14 show an example with multiple circular series of cylindrical rollers 360 extending circumferentially along the intermediate annular surface 348 of the peripheral channel 345, however in other examples there may be only a single circular series of the cylindrical rollers 360. The cylindrical rollers 360 are positioned to align and engage with corresponding circular tracks 517 at an intermediate annular surface 508 of a carousel-hub 500 supported on the carousel-carrier 300. As shown in FIG. 10, the cylindrical rollers 360 may include multiple cylindrical roller segments 361 (e.g., two, three, four or more segments) received on a common roller axle 362, with each roller segment 361 having a common and constant diameter. In other examples, the cylindrical rollers 360 may each be formed of a single integral roller body.

The conical rollers 350/355 in the example of FIG. 10 are mounted on roller axles 352/357 having longitudinal lengths extending radially away from the radial center of the carousel-carrier 300, and at an angle β relative to the horizontal plane, such that the roller axle 352/357 either ascends (e.g., at the top annular surface 346) or descends (e.g., at the bottom annular surface 347) relative to the horizontal plane as it extends radially outward. The roller axles 352/357, with the conical rollers 350/355 thereon, are mounted inside circular roller platforms 353/358 that extend circumferentially around the top and bottom annular surfaces 346/347 of the peripheral channel 345. There may be multiple circular roller platforms 353/358 arranged in radially concentric rings along both the top and bottom annular surfaces 346/347 of the peripheral channel 345 (as in FIGS. 10-11), or there may be only a single circular roller platform 353/358 extending circumferentially along the top and bottom annular surfaces 346/347 of the peripheral channel 345. Each circular roller platform 353/358 is composed of multiple arc-shaped roller platform segments 354/359 (as may be seen in FIG. 27), with each segment including one or more conical rollers 350/355 and being releasably fastened to one another to form a fully assembled circular roller platform 353/358 carrying the conical rollers 350/355. The conical rollers 350/355 are positioned to align and engage with circular tracks 515/516 at top and bottom annular surfaces 506/507 of a carousel-hub 500 supported on the carousel-carrier 300. The horizontal angle β of the roller axle 352/357 and the taper of the conical roller 350/355 complement one another such that an outer surface of the conical roller 350/355 lies substantially flat against the engaging surface in a corresponding circular track 506/507 on the carousel-hub 500, along substantially the entire length of the conical roller 350/355. As shown in FIG. 10, the conical rollers 350/355 may include multiple tapered roller segments 351/356 (e.g., two, three, four or more segments) received on a common roller axle 352/357, with roller segments 351/356 positioned further radially inward having relatively lesser diameters and roller segments 351/356 positioned further radially outward having relatively greater diameters. In other examples, the individual conical rollers 350/355 may be formed of a single integral roller body.

Conical rollers are preferred at the top and bottom annular surfaces 346/347 of the peripheral channel 345 as the tapered shape of such rollers accommodates differences in linear velocity at different radial lengths of a rotating carousel-hub 500, and accommodates radial loads placed on the rollers (e.g., compressing and elongating stresses applied against the rollers in the radial direction).

In order to dampen the transmission of vibrations from the rotating carousel 400 to the carousel-carrier 300, the cylindrical and conical rollers 360, 350/355 may be supported on the carousel-carrier 300 by flexible anti-vibration mountings that serve as vibration dampers. In some examples, the flexible anti-vibration mountings may be mountings between the individual roller axles 352/357/362 and the respective roller platform 354/359 or the carousel-carrier 300. In other examples, the flexible anti-vibration mountings may be mountings between the roller platform 352/357 and the carousel-carrier 300. In yet other examples, there may be a set of flexible anti-vibration mountings between the individual roller axles 352/357 and the respective roller platforms 354/359 and a set between the individual roller axles 362 and the carousel-carrier 300; and a second set of flexible anti-vibration mountings between the roller platforms 354/359 and the carousel-carrier 300.

The carousel rotation mechanism 365 exposed at the peripheral channel 345 of the carousel-carrier 300 mates with a carousel rotation mechanism 520 on a carousel-hub 500 for controlling rotation of the carousel-hub 500 (and the carousel 400 as a whole) around the carousel-carrier 300. The carousel rotation mechanism 365 exposed at the peripheral channel 345 of the carousel-carrier 300 may be a pinion 365 of a carousel rotation system housed in at least one of the interior rooms 331-334 of the carousel-carrier 300. The carousel rotation system includes at least one motor, one gearbox, and the pinion 365 that engages and disengages the carousel rotation mechanism 520 on the carousel-hub 500. The carousel rotation system stored in the carousel-carrier 300 may take the form of a Bendix type system (or similar mechanism), with the pinion 365 mating with a corresponding carousel rotation mechanism 520 provided on the carousel-hub 500 in the form of a crown gear 520 arranged along the inner circumference of the carousel-hub 500. The Bendix type system may include a worm gear transmission or similar mechanical gearing design (e.g., harmonic drive) for the purpose of locking the carousel 400 in position when the motor is not turning. Rotation control by the carousel rotation system may be used for initiating rotation of a carousel 400 to start an electrical generation operation of the turbine unit 200; selecting the rotation direction of a carousel 400 in carrying out an electrical generation operation of the turbine unit 200; and aligning one or more portals 510 exposed at a surface of the carousel-hub 500 with one or more portals 395 in the peripheral channel 345 of the carousel-carrier 300.

The braking mechanisms 370 exposed at the peripheral channel 345 of the carousel-carrier 300 mate with braking mechanisms 525 on a carousel-hub 500 for securing the carousel-hub 500 on the carousel-carrier 300 in a manner to fix the carousel-hub 500 (and the carousel 400 as a whole) against rotation about the carousel-carrier 300 while so secured. In the example shown in FIGS. 13-14, the braking mechanisms 370 at the peripheral channel 345 of the carousel-carrier 300 are brake calipers 370 for mating with a braking mechanism 525 provided on the carousel-hub 500 in the form of an annular brake rotor 525—with the brake calipers 370 movable to clamp against a surface of the annular brake rotor 525. The brake calipers 370 are arranged within a cavity that extends along the intermediate annular surface of the carousel-carrier 300 for reception of the annular brake rotor 525 therein, for clamping within the calipers 370 arranged therein.

The electrical communications mechanisms 375 exposed at the peripheral channel 345 of the carousel-carrier 300 mate with electrical communications mechanisms 530 on the carousel-hub 500 for establishing an electrical communication between the carousel-carrier 300 and the carousel-hub 500. Together, the electrical communications mechanisms 375/530 establish a rotating electrical joint, wherein the electrical communications mechanisms 375 exposed at the peripheral channel 345 of the carousel-carrier 300 present an electrical slip ring 375 for mating with electrical communications mechanisms 530 provided on the carousel-hub 500 in the form of slip ring brushes 530. In the slip ring type electrical joint between the carousel-carrier 300 and the carousel-hub 500, the slip ring 375 at the carousel-carrier 300 is composed of arc-shaped circumferential segments 376 that are releasably fastened to one another to form a complete slip ring 375. In the slip ring type electrical joint between the carousel-carrier 300 and the carousel-hub 500, the slip ring brushes 530 at the carousel-hub 500 rotate about the stationary slip ring 375 at the carousel-carrier 300.

At the upper surface of the carousel-carrier 300 there are arranged a number of winch coupling mechanisms 380; first openings 386 of a number of winch channels 385; and a number of vertical interlocking mechanisms 390. At the bottom surface of the carousel-carrier 300, there are exposed second openings 387 of a number of winch channels 385; and a number of vertical interlocking mechanisms 390.

The winch coupling mechanisms 380 exposed at the top surface of the carousel-carrier 300 mate with winch cables 151 of the winches 150 at the mast roof 110 for raising and lower the carousel-carrier 300 (and the turbine unit 200 as a whole) along the vertical height of the mast 100.

Figure 39:
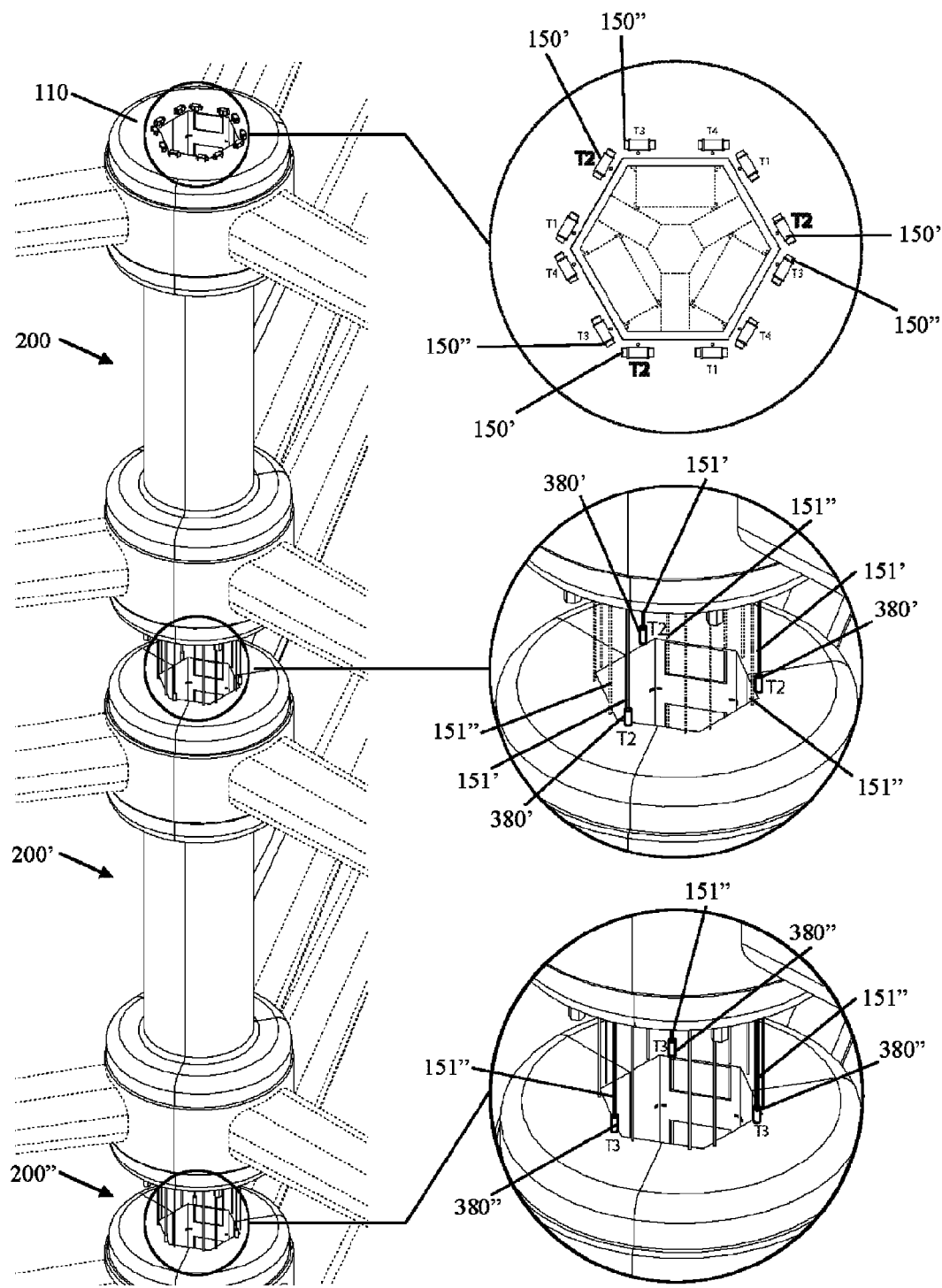
FIG. 39 shows three turbine units suspended by the winches in FIG. 38.
Figure 40:
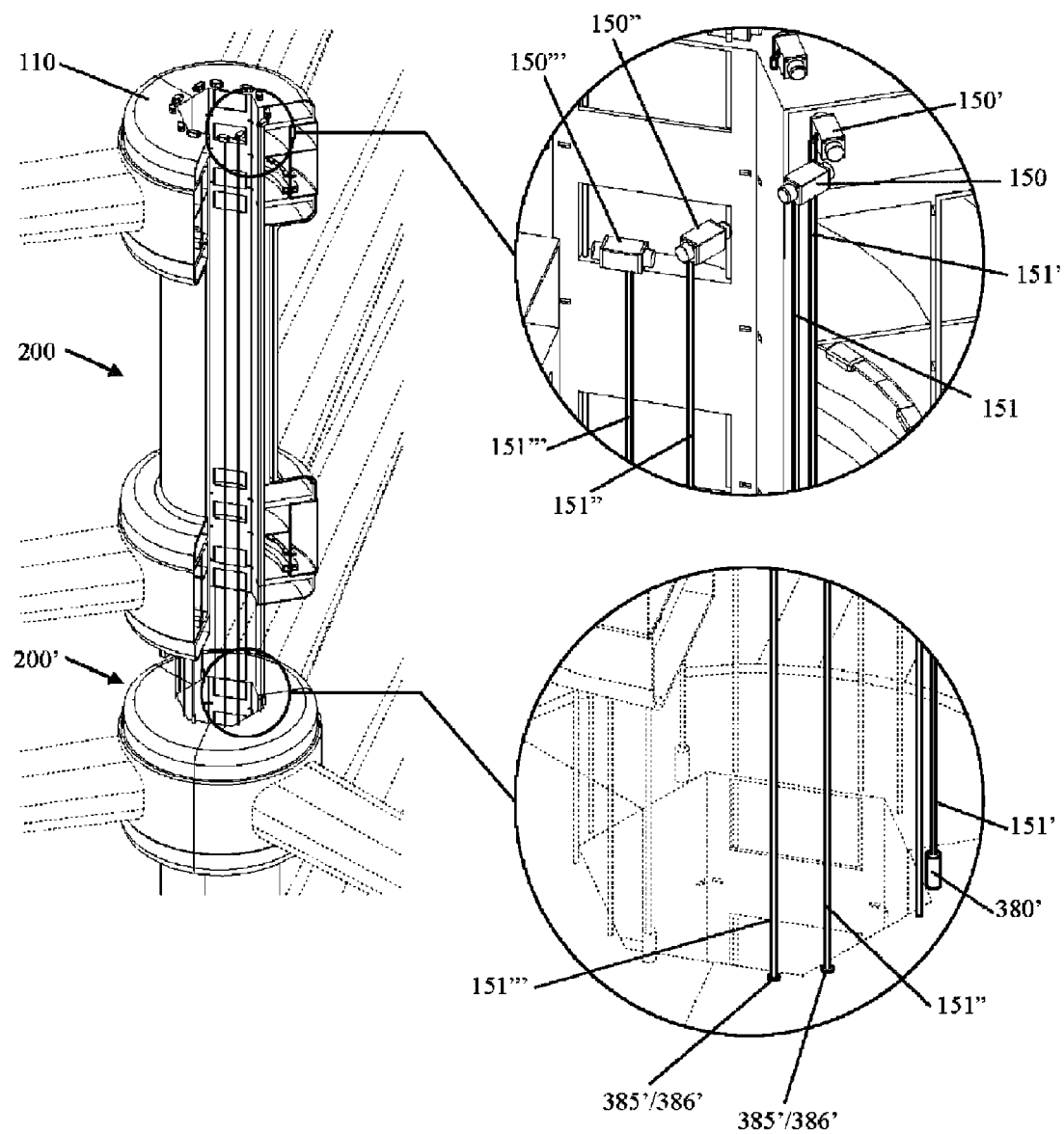
FIG. 40 shows a sectional view of a turbine unit with winch cables of the winches in FIG. 38 passing therethrough.

The winch channels 385 having first openings 386 exposed at the top surface of the carousel-carrier 300 and second openings 387 exposed at the bottom surface of the carousel-carrier 300 are positioned and dimensioned for the passage of winch cables 151 through the carousel-carrier 300 for engaging one or more carousel-carriers 300 mounted lower on the mast 100. As shown in the example of FIGS. 39-40, when employing a turbine system 1 using winches 150 at the mast roof 110 to raise and lower the turbine units 200, the winch cables 151 supporting one or more lower turbine units 200 will pass through the winch channels 385 in each higher carousel-carrier 300 so as to extend to and couple with winch coupling mechanisms 380 on the carousel-carrier 300 of the lower turbine unit 200.

The vertical interlocking mechanisms 390 exposed at the top and bottom surfaces of the carousel-carrier 300 mate with vertical interlocking mechanisms 390 on the top and bottom surfaces of adjacent carousel-carriers 300 for securing the two (or more) carousel-carriers to one another. In the example shown in FIG. 42, the vertical interlocking mechanisms 390 include cavities 391 exposed at top and/or bottom surfaces of the carousel-carriers 300 and vertical beams 392 exposed at the bottom and/or top surfaces of the carousel-carriers 300. For example, where cavities 391 are exposed at the bottom surfaces of carousel-carriers 300 and vertical beams 392 are exposed at the top surfaces of carousel-carriers 300, the vertical beams 392 will be vertically movable to extend upward from the top surface of a lower carousel-carrier 300 and insert into the cavities 391 on the bottom surface of a higher carousel-carrier 300. In other examples, the vertical beams 392 may be exposed on the bottom surface and the cavities exposed on the top surface; and the vertical beams 392 may be vertically moveable to extend downward from the bottom surface of a higher carousel-carrier 300 and insert into the cavities 391 on the top surface of a lower carousel-carrier 300. In yet other examples, there may be both cavities 391 and vertical beams 392 exposed at both the top and bottom surfaces of the carousel-carriers 300, and the vertical beams 392 in both adjacent carousel-carriers 300 may vertically move in the appropriate directions to engage the cavities 391 in the other carousel-carrier 300. The vertical beams 392 may be vertically moveable by a motorized pinion system in the carousel-carrier 300, having a pinion meshed with a rack gear fixed to an end of the vertical beam 392. A vertical interlocking mechanism 390 between adjacent carousel-carriers 300 may facilitate reductions in torsional stresses and moments conferred to the mast 100 from the rotation of separate carousels 400 at adjacent and vertically locked turbine units 200.

The interior rooms 331-334 in the compartments 330 of the carousel-carrier 300 may house operations components and systems of the carousel-carrier 300, and the turbine unit 200 as a whole. Among the components and systems that may be housed in the interior rooms 331-334 are the stator 235 of the electrical generator 230, the carousel rotation system, and one or more aerodynamic command systems for controlling rotation of carousel blades 800.

The interior rooms 331-334 are sufficiently sized and dimensioned to enable the passage of personnel and equipment therethrough (as when the portals 120/320 at the mast 100 and vertical channel 305 of the carousel-carrier 300 are aligned), so as to enable ready access to the many components in the carousel-carrier 300 for maintenance, repair, and/or replacement thereof. The access offered by the interior rooms 331-334 of the carousel-carrier 300 may include access to the stator 235; the carousel rotation system; the motorized pinion systems; movement mechanisms 325/350/355/360; load supporting mechanisms 310; electrical communications mechanisms 315/375; braking mechanisms 370; and vertical interlocking mechanisms 390.

In the example shown in FIGS. 8-10, the upper and lower compartments 330 both include four separate rooms 331-334 separated over four floors, with each floor having its own portal 320 for alignment and communication with the elevator shaft 135. However, any number of rooms may be provided on any number of floors, with the separate rooms and/or floors isolated from one another (as in FIGS. 8-10) or communicating with one another (e.g., by portals between floors on a common floor; by a ladder or stairwell between floors).

Carousel-Hub

The carousel-hub 500 is the rotational core at the radial center of the carousel 400, supporting the radially extending carousel arms 600 with the carousel blades 800 mounted at their distal ends 630.

The carousel-hub 500 has a generally cylindrically symmetric structure. In the example shown in FIGS. 8-10, the carousel-hub 500 includes an upper compartment 535A with interior rooms 536A-537A therein; a lower compartment 535B with interior rooms 536B-537B therein; and an intermediate section 540 extending between the upper and lower compartments 535A/535B. In the example shown in FIG. 8, the intermediate section 540 isolates the upper and lower compartments 535A/535B, as well as the interior rooms 536A-537A and 536B-537B in the two compartments. In other examples, the intermediate section 540 may include a passageway (e.g., a ladder or stairwell) permitting passage between interior rooms 536A-537A and 536B-537B of the upper and lower compartments 535A/535B. The number of compartments 535 in the carousel-hub 500 may correspond with the number of compartments 330 in the carousel-carrier 300—as well as the number of peripheral channels 345 in the carousel-carrier 300. As shown in the example of FIGS. 8-10, the compartments 535A/535B on the carousel-hub 500 may be formed as projecting regions of the carousel-hub 500 that extend into the recessed peripheral channels 345A/345B of the carousel-carrier 300. A vertical channel 505 extends entirely through a radial center of the carousel-hub 500, from a bottom surface to a top surface; and a number of arm sockets 550 protrude from the radial outer surface of the carousel-hub 500, at least at the compartments 535.

As shown in FIGS. 8-10, the carousel-hub 500 has a common configuration at the upper and lower ends. As such, unless otherwise stated, discussions of components at the top of the carousel-hub 500 are also applicable to those common components at the bottom of the carousel-hub 500, and vice versa.

The vertical channel 505 at the radial center of the carousel-hub 500 has a circular configuration (in the horizontal plane) that corresponds with the radial outer surface of the carousel-carrier 300—thereby facilitating rotation of the carousel-hub 500 circumferentially about the carousel-carrier 300. Along one or more surfaces of the vertical channel 505 and/or the upper and lower compartments 535A/535B there are exposed: a surface of a generator rotor 260; a number of portals 510; a number of circular tracks 515-517; a carousel rotation mechanism 520; a number of braking mechanisms 525; and a number of electrical communications mechanisms 530.

The individual elements exposed at the vertical channel 505 and/or the upper and lower compartments 535A/535B of the carousel-hub 500 may be exposed at multiple surfaces thereof. For example, circular tracks 515-517 may be arranged in a number of series along multiple surfaces, which may include: a series of circular tracks 515 along top annular surfaces 506 of the compartments 535A/535B; a series of circular tracks 516 along bottom annular surfaces 507 of the compartments 535A/535B; and/or a series of circular tracks 517 along intermediate annular surfaces 508 of the vertical channel 505 and/or the compartments 535A/535B.

A generator rotor 260 is stored in a rotor housing 265 within an interior room 536-537 of the carousel-hub 500, with a surface of the rotor 260 exposed at a radial inner surface of the vertical channel 505 and/or a compartment 535 of the carousel-hub 500 for exposure to a corresponding generator stator 235 in a carousel-carrier 300. In some examples, when the generator rotor 260 is an electromagnetic rotor, the rotor 260 communicates with electrical communications mechanisms 530 arranged at the intermediate annular surface 517 of the vertical channel 505 (and the respective compartment 535A/535B) of the carousel-hub 500. In other examples, such as when the rotor 260 is a permanent magnet rotor, the rotor 260 in the carousel-hub 500 need not communicate with the electrical communications mechanisms 530 arranged at the vertical channel 505. There is at least one rotor 260 stored in each compartment 535 of the carousel-hub 500.

The portals 510 at the vertical channel 505 of the carousel-hub 500 permit passage into the interior rooms 536-537 of the upper and lower compartments 535, and are positioned for alignment and communication with the portals 395 at the peripheral channel 345 of the carousel-carrier 300. In this way, when aligned with the portals 395 at the peripheral channel 345 of the carousel-carrier 300, the portals 510 in the vertical channel of the carousel-hub 500 permit passage of personnel and equipment from at least interior rooms 332-333 of the carousel-carrier 300 to interior rooms 536-537 of the carousel-hub 500.

The circular tracks 515-517 at the vertical channel 505 and the top and bottom annular surfaces 506/507 of the compartments 535 are arranged in one or more rings for alignment and engagement with movement mechanisms 350/355/360 provided on a carousel-carrier 300 in the form of rollers. In particular, the circular tracks 517 exposed at the vertical channel 505 (which may coincide with the intermediate annular surface of a compartment 535) are annular circular tracks 517 with a straight vertical surface for aligning and engaging with the vertically oriented cylindrical rollers 360 exposed at the intermediate annular surface 348 of the peripheral channel 345 of the carousel-carrier 300. In some examples there may be multiple annular circular tracks 517 along the intermediate annular surface 508 of the vertical channel 505 of the carousel-hub 500 for mating with multiple annular arrangements of cylindrical rollers 360. However, in other examples, there may be a single annular circular track 517 at the intermediate annular surface 508 of the vertical channel 505 for mating with a single annular arrangement of cylindrical rollers 360. Similarly, the circular tracks 515/516 exposed at the top and bottom annular surfaces 506/507 of the compartments 535 are circumferential tracks with a straight horizontal surface for aligning and engaging with the horizontally oriented conical rollers 350/355 exposed at the top and bottom annular surfaces 346/347 of the peripheral channel 345 of the carousel-carrier 300. In some examples there may be multiple radially concentric circumferential tracks 515/516 at the top and bottom annular surfaces 506/507 of the compartments 535, for mating with the multiple radially concentric circumferential arrangements of conical rollers 350/355. However, in other examples, there may be a single circumferential track 515/516 at the top and bottom annular surfaces 506/507 of the compartments 535 for mating with a single circumferential arrangement of conical rollers 350/355.

The circular tracks 517 exposed at the vertical channel 505 are segmented in multiple arc-shaped circumferential segments 513 that are releasably fastened to one another to form a fully assembled circular track 517. Similarly, the circular tracks 515/516 exposed at the top and bottom annular surfaces 506/507 of the compartments 535 are segmented in multiple arc-shaped circumferential segments 511/512 that are releasably fastened to one another to form a fully assembled circular track 515/516.

The carousel rotation mechanism 520 exposed at the vertical channel 505 of the carousel-hub 500 mates with the carousel rotation mechanism 365 exposed at the peripheral channel 345 of the carousel-carrier 300 for enabling rotation control of the carousel-hub 500 (and the carousel 400 as a whole) around the carousel-carrier 300. In one example, the carousel rotation mechanism 520 exposed at the vertical channel 505 of the carousel-hub 500 is a crown gear 520 along the radial inner surface that mates with the carousel rotation mechanism 365 provided in the peripheral channel 345 of the carousel-carrier 300 in the form of a pinion 365. The crown gear 520 along the radial inner surface of the carousel-hub 500 is segmented in multiple arc-shaped circumferential segments 521 that are releasably fastened to one another to form a fully assembled crown gear 520.

The braking mechanisms 525 exposed at the vertical channel 505 of the carousel-hub 500 mate with the braking mechanisms 370 exposed in the peripheral channel of a carousel-carrier 300 for securing the carousel-hub 500 on the carousel-carrier 300 in a manner to fix the carousel-hub 500 (and the carousel 400 as a whole) against rotation about the carousel-carrier 300 while so secured. In one example, the braking mechanism 525 along the vertical channel 505 of the carousel-hub 500 is an annular brake rotor 525 for mating with braking mechanisms 370 provided in the peripheral channel 345 of the carousel-carrier 300 in the form of brake calipers 370—with the brake calipers 370 movable to clamp against a surface of the annular brake rotor 525. The annular brake rotor 525 along the radial inner surface of the carousel-hub 500 is segmented in multiple arc-shaped circumferential segments 526 that are releasably fastened to one another to form a complete annular brake rotor 525.

The electrical communications mechanisms 530 exposed at the vertical channel 505 of the carousel-hub 500 mate with the electrical communications mechanisms 375 exposed in the peripheral channel 345 of the carousel-carrier 300 for establishing an electrical communication between the carousel-hub 500 and the carousel-carrier 300. Together, the electrical communications mechanisms 530/375 establish a rotating electrical joint, wherein the electrical communications mechanisms 530 exposed at the vertical channel 505 of the carousel-hub 500 are slip ring brushes 530 for mating with the electrical communications mechanisms 375 provided on the carousel-carrier 300 in the form of a slip ring 375. In the slip ring type electrical joint between the carousel-carrier 300 and the carousel-hub 500, the slip ring brushes 530 at the carousel-hub 500 rotate about the stationary slip ring 375 at the carousel-carrier 300.

The radial outer surface of the carousel-hub 500 preferably has a circular profile to enhance the aerodynamics of the carousel-hub 500 in rotating on the carousel-carrier 300, with a plurality of arm sockets 550 exposed at the radial outer surface for supporting carousel arms 600. Proximate the arm sockets 550, at the radial outer surface of the carousel-hub 500, there are arranged a number of portals 555 and a number of electrical communications mechanisms 560.

Figure 16:
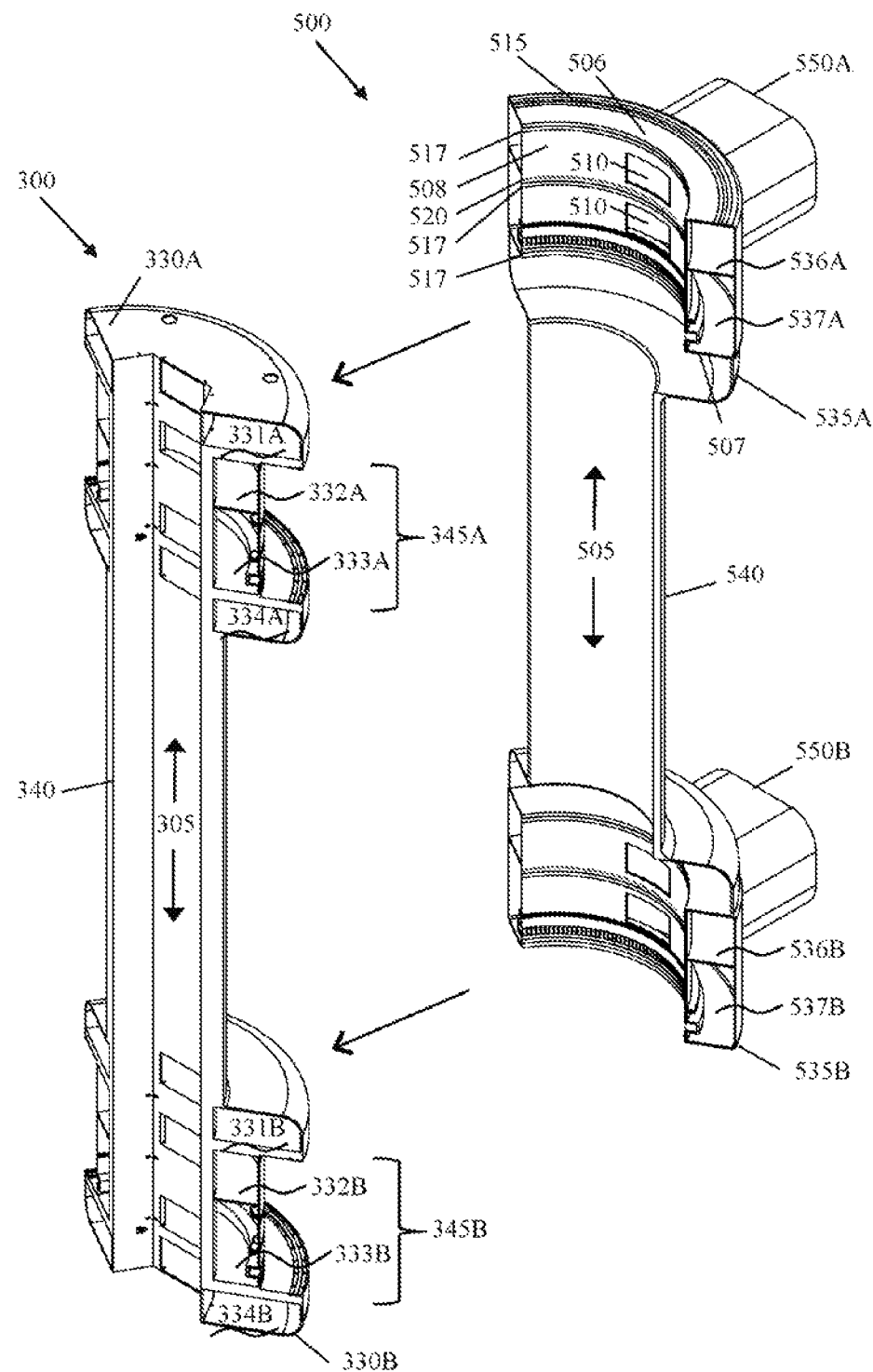
FIG. 16 shows a carousel-carrier segment of the turbine system in FIG. 1, and a mating carousel-hub segment.
Figure 17:
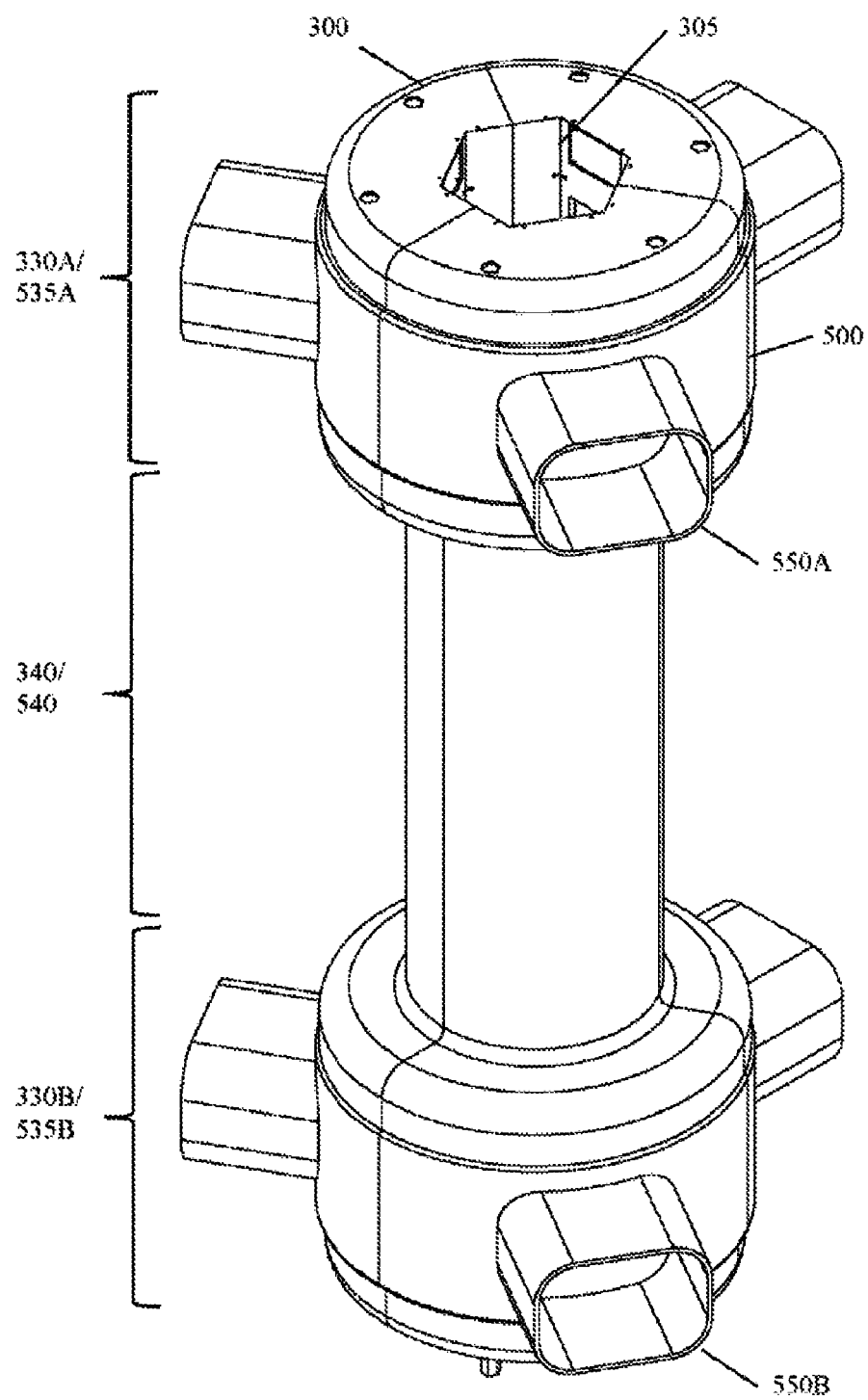
FIG. 17 shows an assembled carousel-hub supported on an assembled carousel-carrier of the turbine system in FIG. 1.
Figure 18:
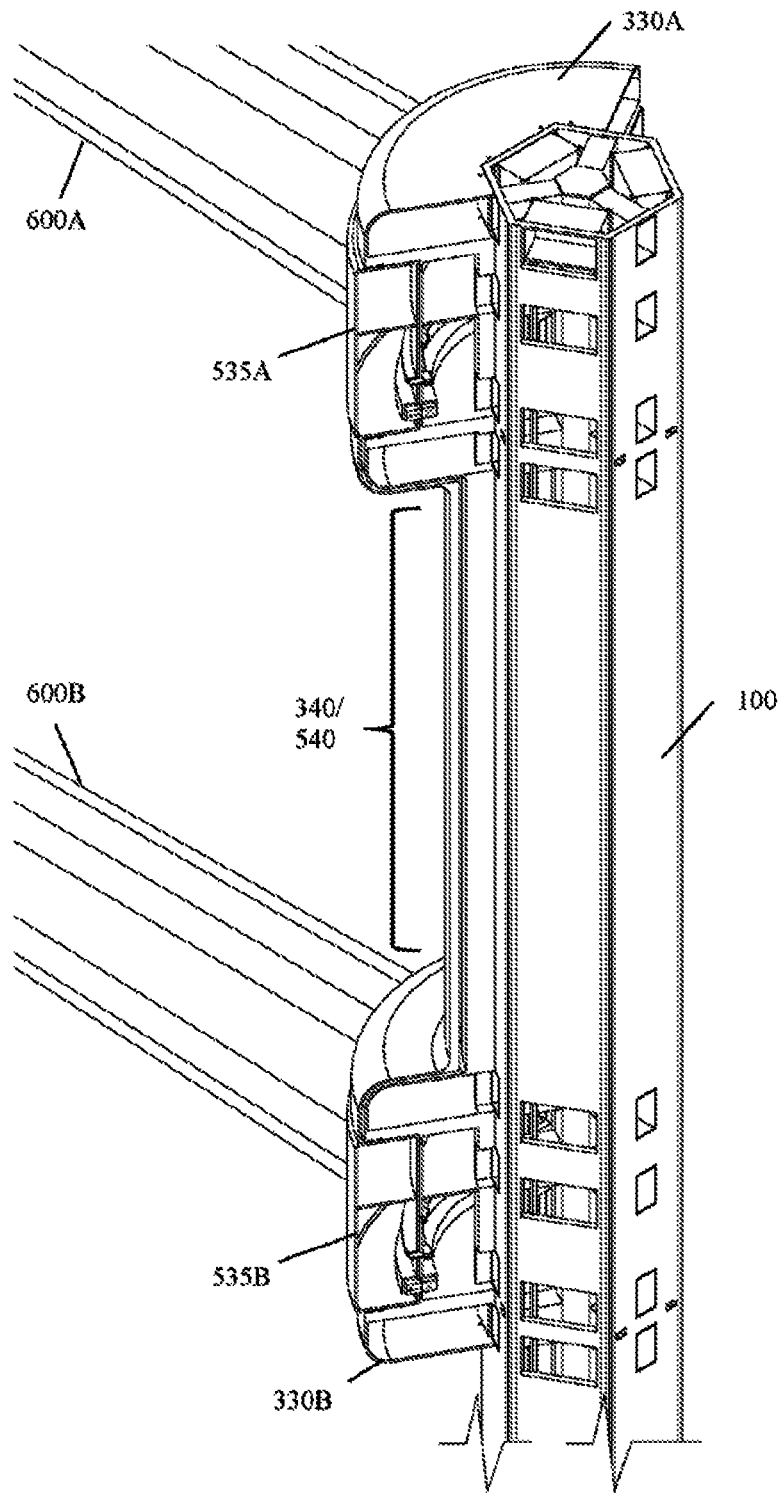
FIG. 18 shows a carousel-carrier segment joined to the mast of the turbine system in FIG. 1.

In the example shown in FIGS. 16-17, the arm sockets 550 are sleeve-like protrusions projecting radially outward from the radial outer surface of the carousel-hub 500. In other examples, the arm sockets 550 may be formed as cavities opening at the radial outer surface of the carousel-hub 500 and projecting into an interior of the carousel-hub 500. Positioning of the arm sockets 550 may vary depending on the configuration of the carousel arms 600. In some examples, as that in FIG. 17, upper and lower arm sockets 550A/550B may be vertically spaced though circumferentially aligned with one another (one directly vertical above the other) such that corresponding upper and lower carousel arms 600A/600B extend parallel with one another in the same radial direction and are joined at their distal ends 630A/630B by a straight vertical blade 800. In other examples, upper and lower arm sockets may be both vertically and circumferentially displaced from one another such that corresponding upper and lower carousel arms extend in different radial directions, and are joined to one another at their distal ends by a non-straight vertical blade.

Regardless of the alignment between corresponding upper and lower arm sockets 550A/550B, the individual arms sockets are equidistantly spaced from one another around the circumference of the carousel-hub 500, such that the pairs of carousel arms 600 are similarly equidistantly spaced around the circumference of the carousel-hub 500. For example, in arrangements with three pairs of upper and lower carousel arms 600A/600B, each upper carousel arm 600A is spaced 120° from the adjacent upper carousel arms 600A/600B, and each lower carousel arm 600B is spaced 120° from the adjacent lower carousel arms 600A/600B—this may apply regardless whether the upper and lower carousel arms 600A/600B in each pair are vertically aligned or displaced from one another. In other examples, carousel arms may be spaced 60° apart in arrangements with six pairs of arms; 40° apart in arrangements with nine pairs of arms; and so on.

The portals 555 at the radial outer surface of the carousel-hub 500, proximate to the arm sockets 550, enable passage of personnel and equipment from interior rooms 536-537 of the carousel-hub 500 to regions external of the carousel-hub 500 (e.g., carousel arms 600).

The electrical communications mechanisms 560 arranged at the arm sockets 550 of the carousel-hub 500 mate with electrical communications mechanisms 610 on a carousel arm 600 for establishing an electrical communication between the carousel-hub 500 and the carousel arm 600. In one example, the electrical communications mechanisms 560 at the arm sockets 550 of the carousel-hub 500 are electrical sockets 560 for mating with electrical communications mechanisms 610 provided on a carousel arm 600 in the form of electrical plugs 610.

The interior rooms 536-537 in the compartments 535 of the carousel-hub 500 may house operations components and systems of the carousel-hub 500, the carousel arms 600 and/or the carousel blades 800. Among the components and systems that may be housed in the interior rooms 536-537 is the rotor 260 of the electrical generator 230.

The interior rooms 536-537 are sufficiently sized and dimensioned to enable the passage of personnel and equipment therethrough (as when the portals 395/510 at the peripheral channel 345 of the carousel-carrier 300 and the vertical channel 505 of the carousel-hub 500 are aligned), so as to enable ready access to the many components in the carousel-hub 500 for maintenance, repair, and/or replacement thereof. The access offered by the interior rooms 536-537 of the carousel-hub 500 may include access to the rotor 260; electrical communications mechanisms 530/560; and braking mechanisms 525.

In the example shown in FIGS. 8-10, the upper and lower compartments 535A/535B both include two separate rooms 536-537 separated over two floors, with each floor having its own portal 510 for alignment and communication with at least interior rooms 332-333 of the carousel-carrier 300. However, any number of rooms may be provided on any number of floors, with the separate rooms and/or floors isolated from one another (as in FIGS. 8-10) or communicating with one another (e.g., by portals between floors on a common floor; by a ladder or stairwell between floors).

Carousel Arms

When assembled in a turbine unit 200, the upper and lower carousel arms 600A/600B extend radially outward from the carousel-hub 500. Each carousel arm has a radially extending longitudinal axis extending from a proximal end 605, where the arm is joined to an arm socket 550 at the radial outer surface of the carousel-hub 500, to a distal end 630 spaced from the outer surface of the carousel-hub 500. The distal ends 630A/630B of corresponding upper and lower arms 600A/600B in a carousel arm pair are joined to one another by at least one carousel blade 800.

Figure 19:
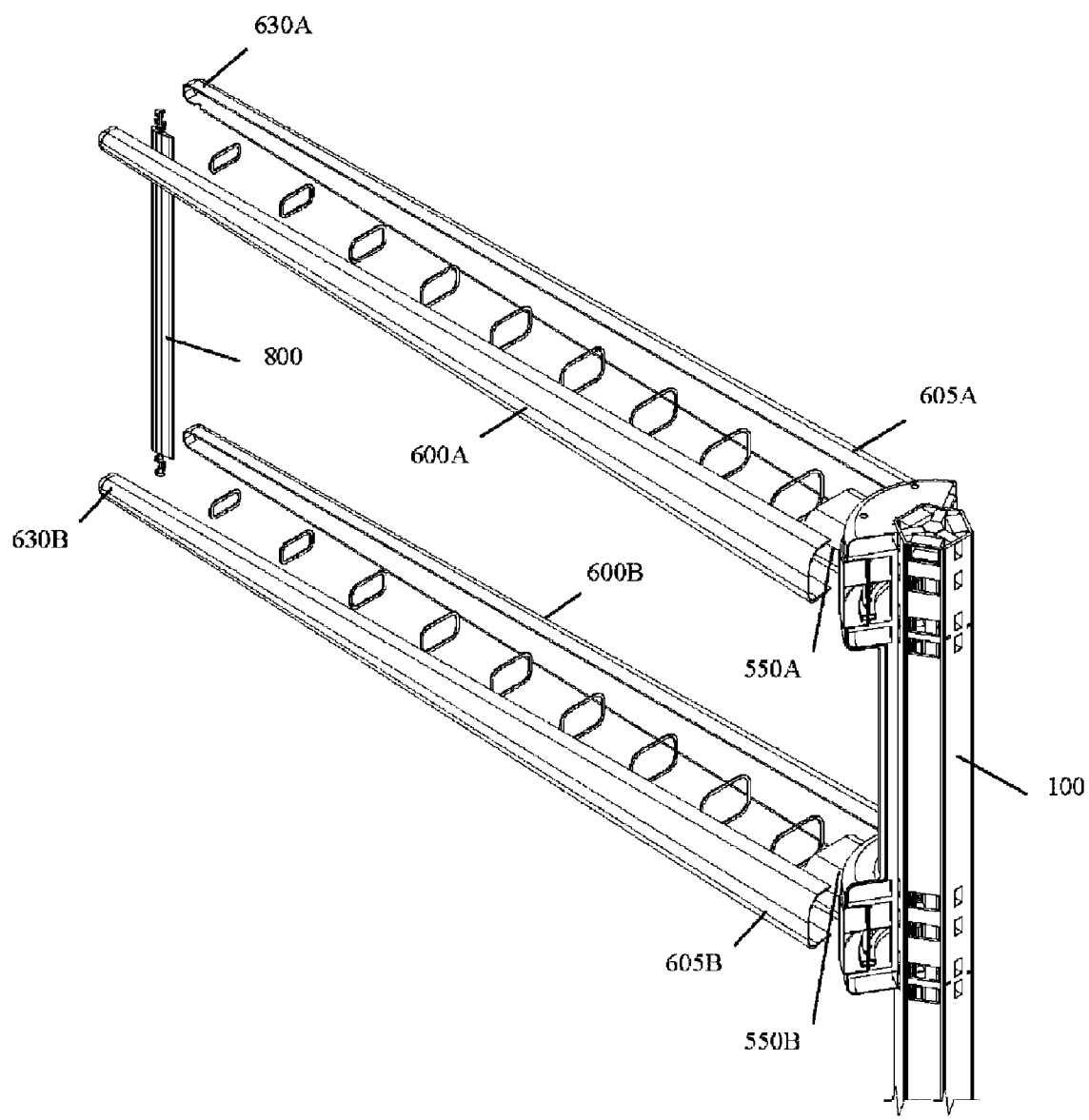
FIG. 19 shows an exploded view of the carousel arms in a turbine segment joined to the mast of the turbine system in FIG. 1.

As shown in FIG. 19, the upper and lower carousel arms 600A/600B have common configurations. As such, unless otherwise stated, discussions of a carousel arm 600, and components thereof, are applicable to both the upper and lower carousel arms 600A/600B.

The outer surface of a carousel arm 600 has a cross-sectional shape with an airfoil profile (in a vertical plane extending transverse to the longitudinal axis). The cross-sectional shape of the carousel arm 600 gradually tapers in area along the length thereof, from a greater area at the proximal end 605 to a lesser area at the distal end 630. A passageway 615 extends horizontally through the longitudinal length of the carousel arm 600.

In the example shown in FIG. 19, the proximal end 605 of the carousel arm 600 is an open end that joins with an arm socket 550 at the radial outer surface of the carousel-hub 500; and a number of electrical communications mechanisms 610 are arranged at the proximal end 605. At its distal end 630, the carousel arm 600 includes an axle socket 635 for receiving a blade axle 750 that supports a carousel blade 800. In some examples, the carousel arm 600 may have a number of axle sockets 635 along its length for receiving a number of blade axles 750.

The electrical communications mechanisms 610 arranged at the proximal end 605 of the carousel arm 600 mate with the electrical communications mechanisms 560 arranged at the arm socket 550 of the carousel-hub 500 for establishing an electrical communication between the carousel arm 600 and the carousel-hub 500. Together, the electrical communications mechanisms 610/560 establish a male-female, insertion-type electrical joint, such as one wherein the electrical communications mechanisms 610 at the proximal end 605 of the carousel arm 600 are electrical plugs 610 that mate with the electrical communications mechanisms 560 arranged at the arm socket 550 of the carousel-hub 500, which are provided in the form of electrical sockets 560.

Figure 20:
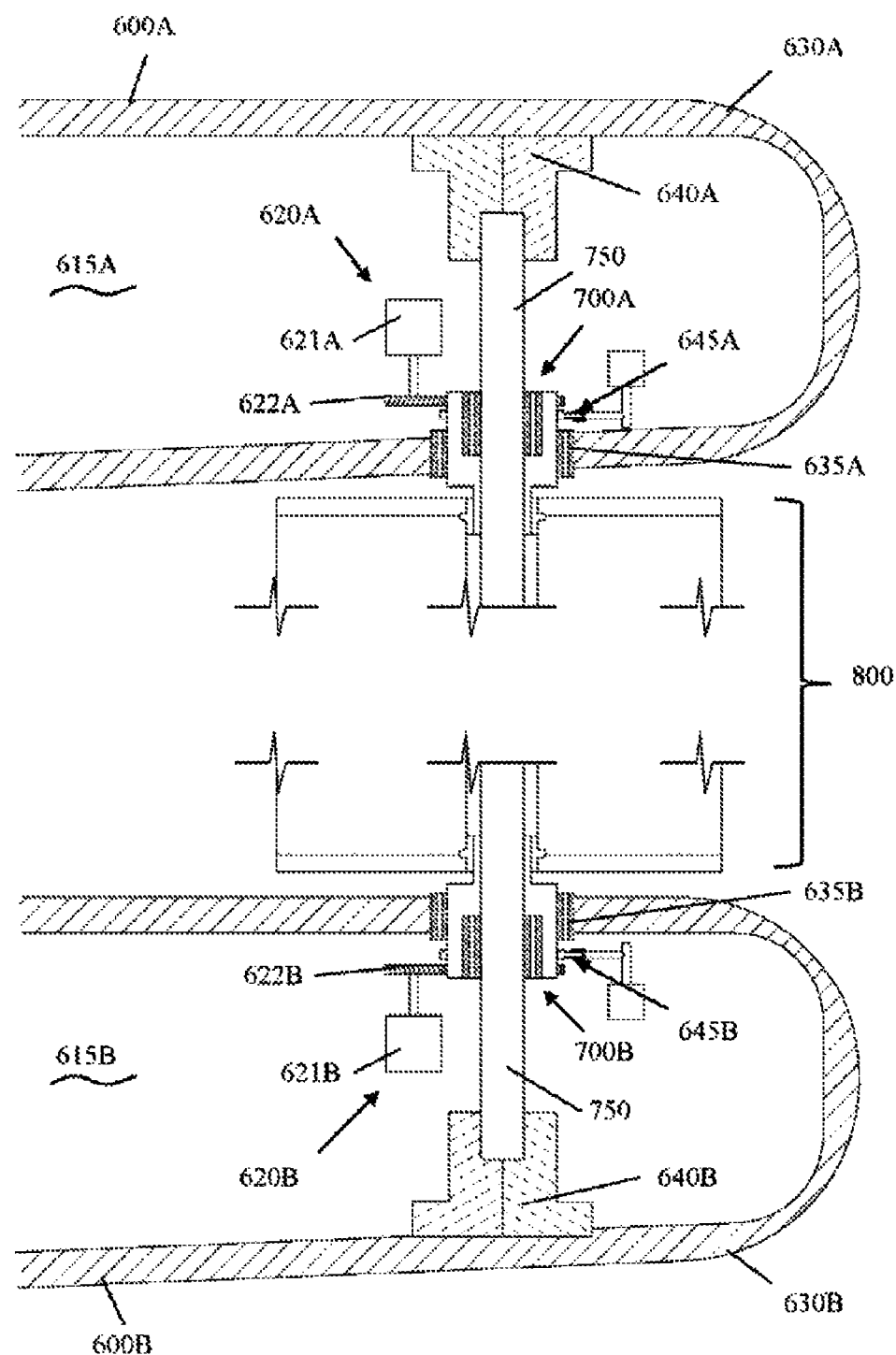
FIG. 20 shows a cross-sectional view of the carousel arms in a turbine unit of the turbine system of FIG. 1.

In the example shown in FIG. 20, the axle socket 635 at the distal end 630 of the carousel arm 600 is a cavity-type socket that opens at an outer surface of the carousel arm 600 and extends into an interior space of the arm 600 for reception of a blade axle 750. In other examples, the axle socket 635 may be formed as a sleeve-type socket that protrudes from the carousel arm 600 surface. At an internal side of the axle socket 635, either in the interior space of the carousel arm 600 relative to a cavity-type axle socket 635 or in the protruding sleeve of a sleeve-type axle socket, there is positioned an axle stay 640 for joining with a blade axle 750 inserted in the axle socket 635. In pairs of carousel arms 600, the upper carousel arm 600A will have an axle socket 635 at a bottom surface and the lower carousel arm 600B will have an axle socket 635 at a top surface.

Figure 21:
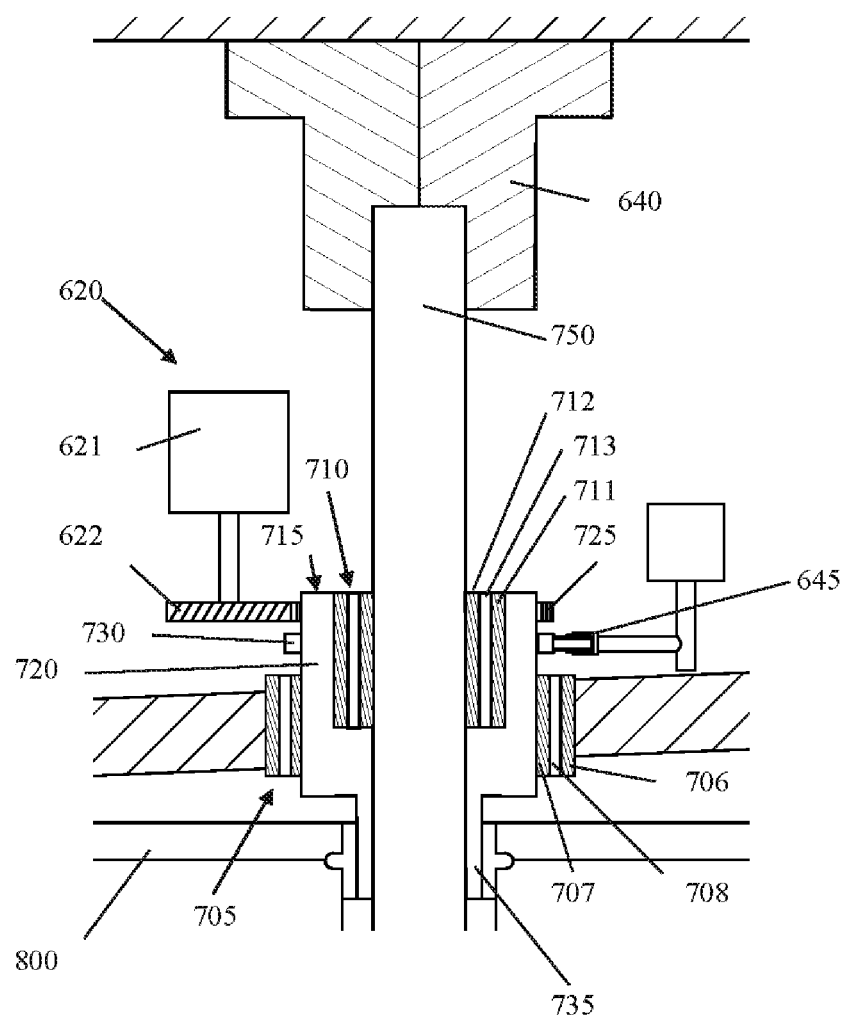
FIG. 21 shows a cross-sectional view of a blade coupler in FIG. 20.
Figure 22:
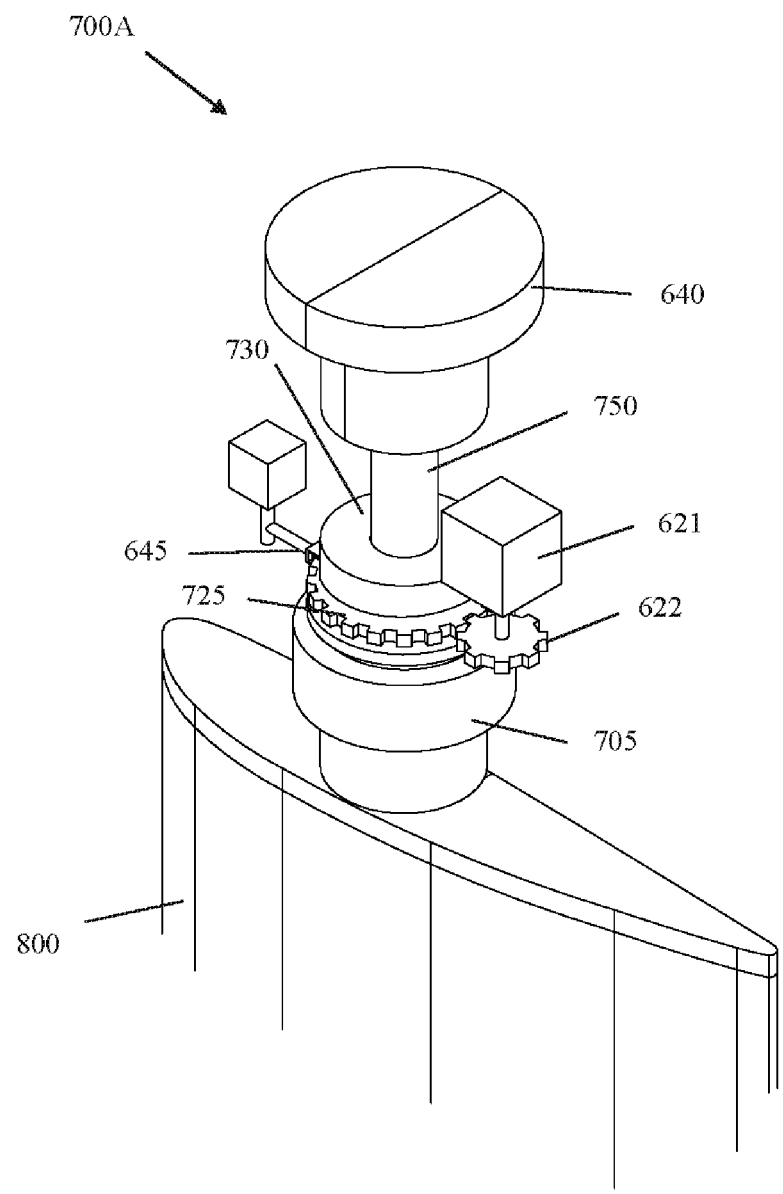
FIG. 22 shows a perspective view of a blade coupler in FIG. 20.

An electrical communications mechanism 645 may be arranged adjacent the axle socket 635 for mating with an electrical communications mechanism 730 arranged on a blade coupler 700 mounted on a blade axle 750 received in the axle socket 635. The electrical communications mechanism 645 may be integral with the axle stay 640, or may be arranged adjacent an edge of the axle socket 635. The nature of the electrical communication mechanism 645 may vary based on the type of carousel blade 800 employed in the turbine system 1. For example, if using a fixed carousel blade, the electrical communication mechanism 645 may be part of a male-female, insertion-type electrical joint such as an electrical socket for mating with an electrical plug on a fixed carousel blade. In other examples employing a rotatable carousel blade 800, the electrical communications mechanism 645 may be a rotating electrical joint type, such as that in the example of FIG. 21 wherein the electrical communications mechanism 645 at the axle socket 635 is one or more slip ring brushes 645 for mating with an electrical communications mechanism 730 provided on a blade coupler 700 in the form of a slip ring 730. In the slip ring type electrical joint between the carousel arm 600 and the blade coupler 700, the slip ring 730 at the blade coupler 700 rotates relative to the slip ring brushes 645 at the axle socket 635.

The passageway 615 in the carousel arm 600 may house internal components and systems for operation of the carousel arm 600 and/or the carousel blade 800. Among the components and systems that may be housed within the passageway 615 is a blade rotation system 620.

A blade rotation system 620 will be housed in the carousel arm 600, if the turbine system 1 employs rotatable carousel blades 800. However, if fixed carousel blades are used, there is no need for housing a blade rotation system 620 in the carousel arm 600.

A blade rotation system 620 may be positioned, at least in part, adjacent the axle socket 635 in the carousel arm 600 and may communicate (via electrical communications mechanisms) with one or more aerodynamic command systems housed in the carousel-carrier 300 for enabling rotational control of a carousel blade 800 mounted on a blade axle 750 received in the adjacent axle socket 635.

In a preferred example, the blade rotation system 620 includes a stepper motor having an output pinion coupled to an input shaft of a blade gearbox 621, which blade gearbox 621 may include a worm gear communicating with an output gear 622 positioned for aligning and meshing with a mating gear 725 on a blade coupler 700 mounted on a blade axle 750 received in the axle socket 635.

In addition to housing components, the passageway 615 in the carousel arm 600 may be sufficiently sized and dimensioned to enable the passage of personnel and equipment therethrough. Such a sizing and dimensioning of the passageway 615 permits personnel to readily access the many components in the carousel arm 600 for maintenance, repair, and/or replacement thereof. The access offered by the passageway 615 need not be limited to only the blade rotation system 620. For example, the passageway 615 may also be used to access electrical communications mechanisms 610/645 and other subsystems.

In the example shown in FIG. 19, there is only a single passageway 615 through the carousel arm 600. However, other examples may include multiple passageways through the carousel arms 600—and the passageways may include a number of rooms provided on a number of floors, with the separate rooms and floors isolated from one another or communicating with one another (e.g., by portals between rooms on a common floor; by a ladder or stairwell between floors). The passageway 615 of the carousel arm 600 may have a plurality of portals granting access between interior rooms of the carousel arm and to external surfaces above and/or below the carousel arm.

Blade Coupler

When assembled in a turbine unit 200, the carousel blades 800 extend between distal ends 630A/630B of corresponding upper and lower carousel arms 600A/600B. The carousel blades 800 may be fixed or rotatable blades, and the blades may be straight blades that extend directly vertical or they may be curved or otherwise not straight in the vertical sense. In the example of FIG. 20, the carousel blade 800 is a straight rotatable blade 800 mounted on a blade axle 750. The blade axle 750 extends along a vertical longitudinal axis and the carousel blade 800 is mounted on and rotatable about the blade axle 750 by a blade coupler 700.

As shown in FIG. 20, the upper and lower ends of the combined arrangement of the blade axle 750 and the carousel blade 800 have common configurations (including common blade coupler 700 configurations). As such, unless otherwise stated, discussions relative to the top end of the carousel blade 800, the top end of the blade axle 750, and an upper blade coupler 700 are also applicable to a common arrangement of the bottom end of the carousel blade 800, the bottom end of the blade axle 750, and a lower upper blade coupler 700, and vice versa.

The blade axle 750 is a straight beam having an upper end inserted in an axle socket 635 of an upper carousel arm 600A and secured by an axle stay 640 therein, and a lower end inserted in an axle socket 635 of a lower carousel arm 600B and secured by an axle stay 640 therein. Securement of the top and bottom ends of the blade axle 750 by the respective axle stays 640 are such as to render the blade axle 750 non-rotatable. The non-rotatable securement of the blade axle 750 may be facilitated by providing the blade axle 750 and the axle stays 640 with mating surfaces of non-circular polygonal shape.

Mounted along the blade axle 750 are an upper blade coupler 700; a lower blade coupler 700; and, optionally, a number of intermediate blade couplers. At least the upper and lower blade couplers 700 include an outer bearing 705 mounted in the axle socket 635, an inner bearing 710 mounted on the blade axle 750; and a bushing insert 715 rotatably mounted between the inner and outer bearings 710/705.

As shown in FIG. 20, the upper and lower blade couplers 700A/700B have common, though inverted configurations. As such, unless otherwise stated, discussions of the upper coupler 700A are also applicable to the lower coupler 700B (though with the understanding that the arrangement is inverted), and vice versa.

The outer bearing 705 in the upper blade coupler 700 includes an inner surface 707, an outer surface 706, and a number of rollers 708 between the inner and outer surfaces 707/706. The outer surface 706 of the outer bearing 705 is mounted in the axle socket 635 in a non-rotatable manner by providing the outer surface 706 and the axle socket 635 with mating non-circular polygonal shapes. The inner surface 707 of the outer bearing 705 is rotatable within the outer surface 706 (and within the axle socket 635) via the rollers 708.

The inner bearing 710 of the upper blade coupler includes an inner surface 712, an outer surface 711, and a number of rollers 713 between the inner and outer surfaces 712/711. The inner surface 712 of the inner bearing 710 is mounted on the blade axle 750 in a non-rotatable manner by providing the inner surface 712 with a corresponding non-circular polygonal shape as the outer surface of the blade axle 750. The outer surface 711 of the inner bearing 710 is rotatable about the inner surface 712 (and the blade axle 750) via the rollers 713.

The bushing insert 715 is mounted between the outer surface 711 of the inner bearing 710 and the inner surface 707 of the outer bearing 705; and is thus rotatable with both surfaces, within the axle socket 635 and around the blade axle 750. An upper end 720 of the bushing insert 715 extends through the axle socket 635, and into the upper carousel arm 600A; and a lower end 735 of the bushing insert 715 extends into a carousel blade 800. Coupled to the upper end 720 of the bushing insert 715 exposed within the upper carousel arm 600A is a toothed gear 725 and an electrical communications mechanism 730. Coupled to the lower end of the bushing insert 715 exposed within the carousel blade 800 is a number of fastening mechanisms 740 and electrical communications mechanisms 745.

The toothed gear 725 coupled to the upper end 720 of the bushing insert 715 is positioned to align with the output gear 622 of the blade gearbox 621 of the blade rotation system 620 housed in the upper carousel arm 600A. The blade gearbox 621 of the blade rotation system 620 may include a worm gear transmission or similar mechanical gearing design (e.g., harmonic drive) for the purpose of locking the carousel blade 800 in position when the stepper motor is not turning.

The electrical communications mechanism 730 at the upper end 720 of the bushing insert 715 mates with the electrical communications mechanisms 645 adjacent the axle socket 635 for establishing an electrical communication between the blade coupler 700 and the carousel arm 600. Together, the electrical communications mechanisms 730/645 establish a rotating electrical joint, such as one wherein the electrical communications mechanism 730 provide at the bushing insert 715 of the blade coupler 700 is a slip ring 730 for mating with the electrical communications mechanism 645 provided adjacent the axle socket 635 in the form of slip ring brushes 645. In the slip ring type electrical joint between the blade coupler 700 and the carousel arm 600, the slip ring 730 at the bushing insert 715 of the blade coupler 700 rotates relative to the slip ring brushes 645 adjacent the axle socket 635 of the carousel arm 600.

The fastening mechanisms 740 at the lower end of the bushing insert 715 mate with fastening mechanisms 815 arranged in the carousel blade 800 for securing the carousel blade 800 to the bushing insert 715. In one example, the fastening mechanisms 740/815 in both the bushing insert 715 and the carousel blade 800 are a number of bores 740/815 positioned for alignment and simultaneous reception and securement of a bolt in both. The electrical communications mechanisms 745 at the lower end of the bushing insert 715 mate with electrical communications mechanisms 820 within the carousel blade 800 for establishing an electrical communication between the blade coupler 700 and the carousel blade 800. Together, the electrical communications mechanisms 745/820 may establish a male-female electrical joint, such as one where the electrical communications mechanisms 745 provided at the bushing insert 715 of the blade coupler 700 are electrical sockets 745 for mating with the electrical communications mechanisms 820 provided within the carousel blade 800 in the form of electrical plugs 820.

The lower blade coupler 700B may optionally have the same arrangement as the upper blade coupler 700A—including both the mechanical rotation and electrical communications couplings of the bushing insert 715 relative to the systems in the carousel arm 600 and the carousel blade 800—though, preferably, with an inverted orientation due to the arrangement of the lower blade coupler 700B being one for joining a bottom end of the blade axle 750 to an axle socket 635 in an upper surface of a lower carousel arm 600B.

Carousel Blade

The carousel blade 800 is of virtually rigid aerodynamic structure extending vertically and substantially parallel with the blade axle 750, when mounted thereto. The carousel blade 800 has an airfoil profile—preferably with an asymmetrical cross-section (in a horizontal plane)—with a chord approximately parallel to the horizontal plane. The cross-sectional area of the carousel blade 800 remains substantially constant along the height of the straight vertical blade 800.

The carousel blade 800 is composed of at least a foil body 805 and a channel cover 825. The foil body 805 presents an outer surface having, generally, an airfoil profile with the exception of a region where there is formed an axle channel 810 at the outer surface. The axle channel 810 has an opening facing outward of the foil body 805, and is shaped to receive the upper and lower bushing inserts 715A/715B of the upper and lower blade couplers 700A/700B. Exposed within the axle channel 810 are a number of fastening mechanisms 815 and a number of electrical communications mechanisms 820.

Included among the fastening mechanisms 815 in the axle channel 810 are a number of fastening mechanisms 815 for mating with fastening mechanisms 740 exposed at the lower end of the bushing insert 715 of the upper blade coupler 700A and a number of fastening mechanisms 815 for mating with fastening mechanisms 740 exposed at an upper end of the bushing insert 715 of the lower blade coupler 700B. In one example, the fastening mechanisms 815/740 in the axle channel 810 and both bushing inserts 715A/715B are a number of bores 815/740 positioned for alignment and simultaneous reception and securement of bolts therein. The carousel blade 800 may be joined with any intermediate couplers mounted on the blade axle 750 in a similar manner.

Included among the electrical communications mechanisms 820 in the axle channel 810 are a number of electrical communications mechanisms 820 for mating with electrical communications mechanisms 745 exposed at the lower end of the bushing insert 715 of the upper blade coupler 700A and a number of electrical communications mechanisms 820 for mating with electrical communications mechanisms 745 exposed at the upper end of the bushing insert 715 of the lower blade coupler 700B for establishing respective electrical communications between the carousel blade 800 and the upper and lower blade couplers 700A/700B. Corresponding electrical communications mechanisms 820/745 may establish a male-female electrical joint, such as one where the electrical communications mechanisms 820 provided at the axle channel 810 are electrical plugs 820 for mating with the electrical communications mechanisms 745 provided at the bushing inserts 715A/715B in the form of electrical sockets 745.

Securing the upper and lower blade couplers 700A/700B (as well as any intermediate couplers mounted on the blade axle 750) within the axle channel 810, rotatably mounts the foil body 805 of the carousel blade 800 to the blade axle 750.

After mounting the foil body 805 to the blade axle 750, the channel cover 825 is secured to the foil body 805 to close the axle channel 810. The channel cover 825 includes a planar body 826 sized and dimensioned to completely close the axle channel 810 along a vertical surface of the foil body 805, and has an outer surface profile corresponding with the aerodynamic profile of the foil body 805.

Figure 23:
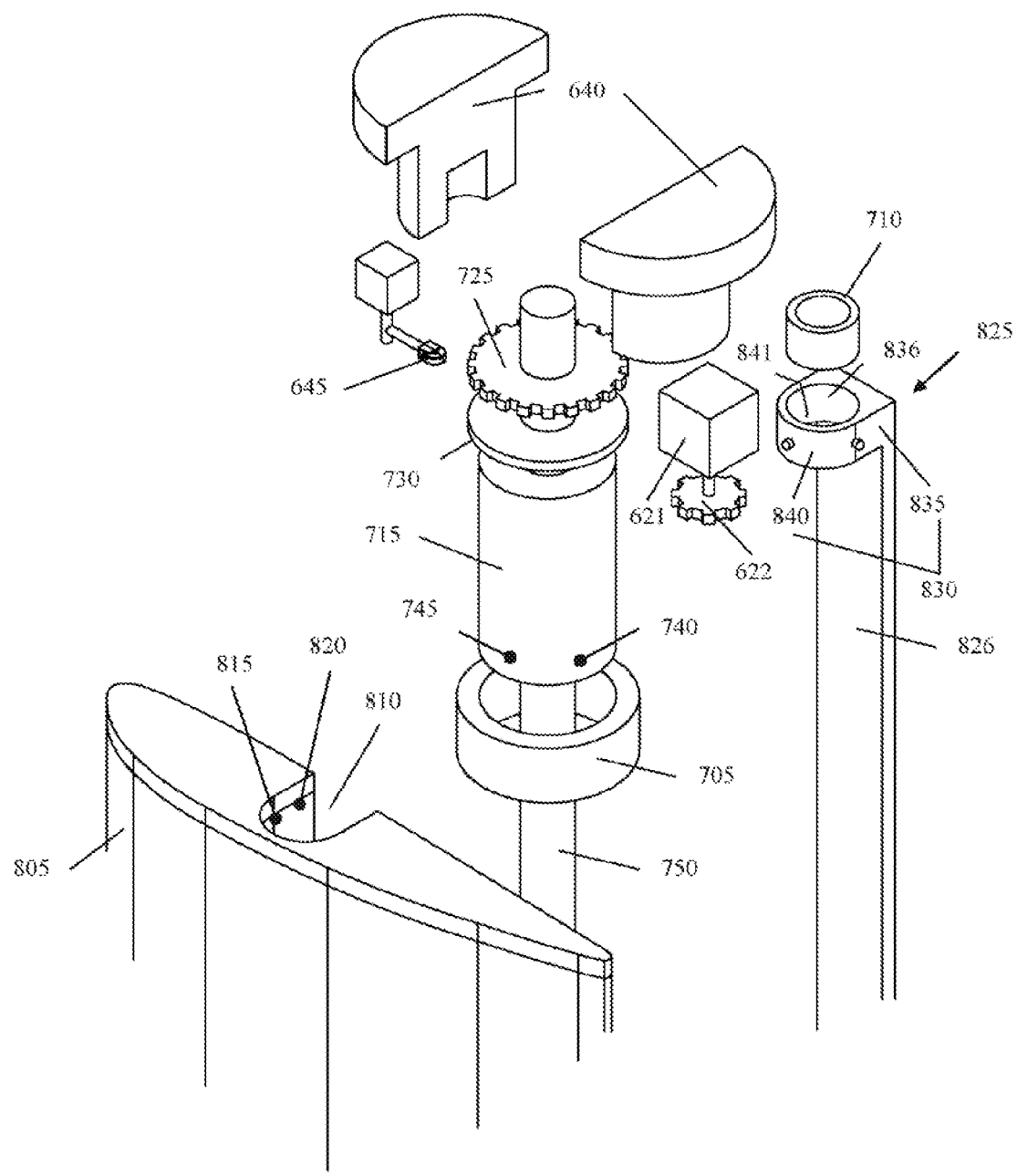
FIG. 23 shows an exploded view of a blade coupler in FIG. 20.
Figure 24:
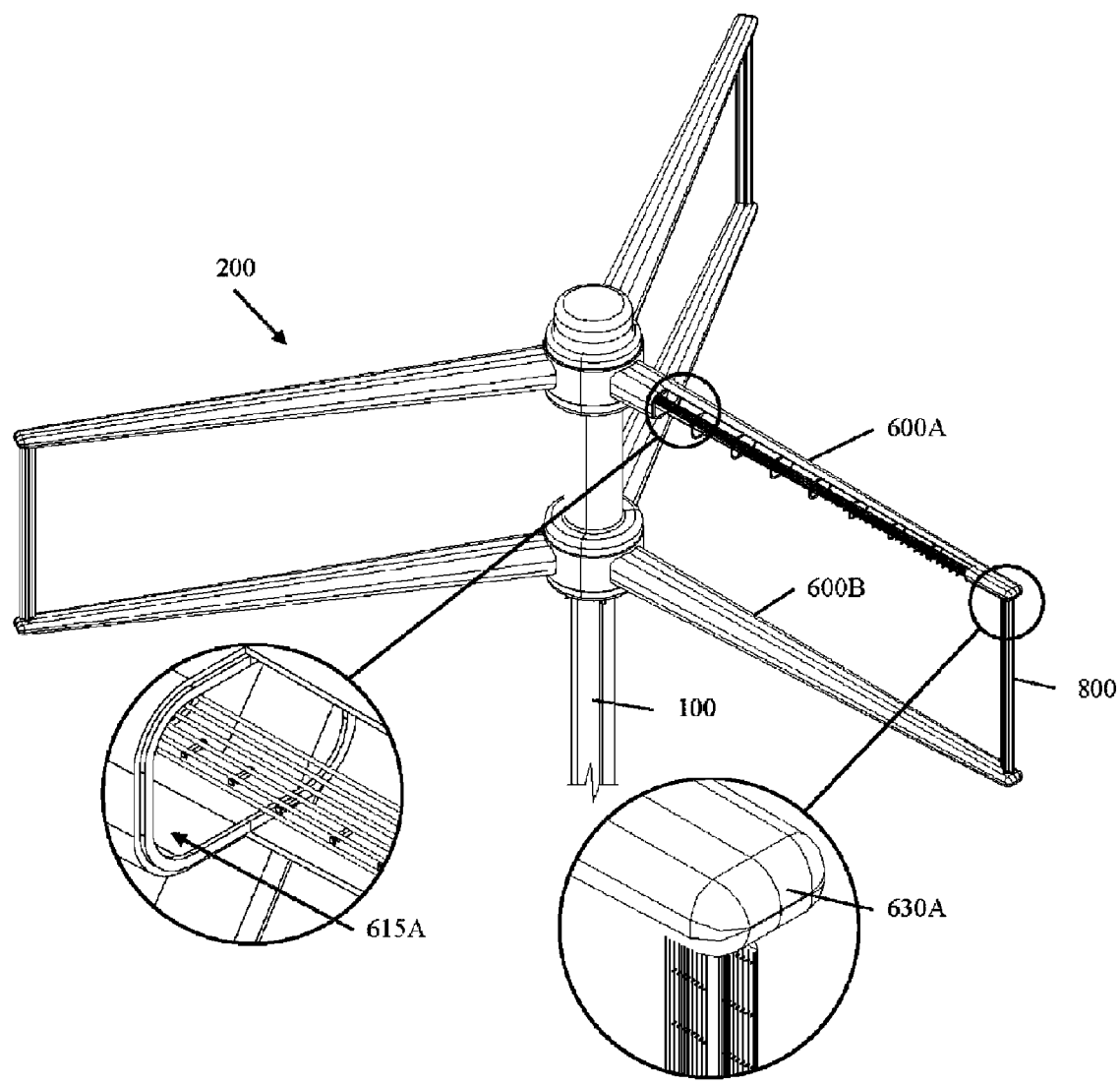
FIG. 24 shows deicing systems extending along a carousel arm and carousel blade of the turbine system in FIG. 1.

In the example shown in FIG. 23, the channel cover 825 is secured by a number of axle collars 830. Each axle collar 830 is formed of two collar sections 835/840 having corresponding semi-circular recesses 836/841. A first collar section 835 is secured to the inside-facing surface of the planar body 826 with the semi-circular recess 836 opening away from the planar body 826. The second collar section 840 is secured to an inner surface of the axle channel 810, prior to insertion of the blade axle 750 therein, with the semi-circular recess 841 opening outward from the axle channel 810 so as to provide clearance for insertion of the blade axle 750. After the blade axle 750 is inserted in the axle channel 810, and over the second collar section 840, the first and second collar sections 835/840 are then secured to one another so as to secure the channel cover 825 to the foil body 805, thereby enclosing the axle channel 810 and completing assembly of the carousel blade 800.

In another example, the axle channel 810 may have a recessed annular ledge at its periphery and the channel cover 825 may be received at the recessed annular edge so as to lie flat with substantially no seam relative to the outer surface of the foil body 805. Such an arrangement of the channel cover 825 may be secured with a number of bolts placed through the planar body 826 and into the annular ledge. When using bolts to secure the planar body 826 to the annular ledge, the channel cover 825 may optionally omit the axle collars 830.

The fasteners securing the foil body 805 to the bushing inserts 715 and the axle collars 830, and/or the bolts securing the planar body 826 of the channel cover 825 to an annular ledge of the axle channel 810 in the foil body 805, may be explosive bolts. A suitable explosive bolt may use NASA standard dual redundant initiators, or similar components that can be fired via triple-authentication enhanced crypto signals by either an automatic safety system of the turbine system and/or by a remote operator. Such use of explosive bolts may allow jettisoning the carousel blades 800 of one or more carousels 400 in order to reduce the forces on the mast 100 caused by the thrust of the wind on the blades 800, as applicable.

There may also be positioned along an inner surface of the axle channel 810, a number of disruptive charges that may be detonated when firing the explosive bolts so as to facilitate removal of the carousel blade 800 from the blade axle 750, and possibly to promote a propulsion of the carousel blade 800 away from the turbine system 1, upon release of the carousel blade 800 from the blade axle 750 by firing of the explosive bolts.

As each carousel blade 800 is joined between both an upper and lower carousel arm 600A/600B, blade rotation systems 620 and electrical communications mechanisms 645/730 may be provided in either of the two arms alone. However, in some examples these mechanisms may be present in both the upper and lower carousel arms 600A/600B.

For example, as shown in FIG. 20, both the upper and lower carousel arms 600A/600B include a blade coupler 700 having an inner bearing 710, a bushing insert 715, and an outer bearing 705. The bushing insert 715 in both the upper and lower carousel arms 600A/600B, includes a coupled gear 725 for meshing with a mating pinion 622 of a blade gearbox 621 in a corresponding blade rotation system 620 within the respective arm 600A/600B; and an electrical communications mechanism 730 (e.g., a slip ring 730) for mating with an electrical communications mechanism 645 in the respective arm 600A/600B (e.g., a slip ring brush 645). The bushing inserts 715 in both the upper and lower carousel arms 600A/600B include the fastening mechanisms 740 (e.g., bolt-receiving openings 740) and the electrical communications mechanisms 745 (e.g., electrical sockets 745) for mating with corresponding fastening mechanisms 815 (e.g., bolt-receiving openings 815) and electrical communications mechanisms 820 in the carousel blade 800 (e.g., electrical plugs 820).

Preferably, there are nearly identical configurations at the top and bottom ends of the blade axle 750 (e.g., blade rotation system 620; axle socket 635; blade coupler 700; etc.), with the exception that the configurations are inverted relative to one another. In particular, the use of matching (though inverted) configurations at both the top and bottom ends of the blade axle 750 will result in a more uniform distribution of the torque applied to the carousel blade 800 and a reduction in the torsion moments on the blade 800 as it rotates around the blade axle 750. Providing these mechanisms in both the upper and lower carousel arms 600A/600B may also allow a system in one arm to continue operating the carousel blade 800 in the event of a system failure in the other arm.

Electrical System

Figure 25:
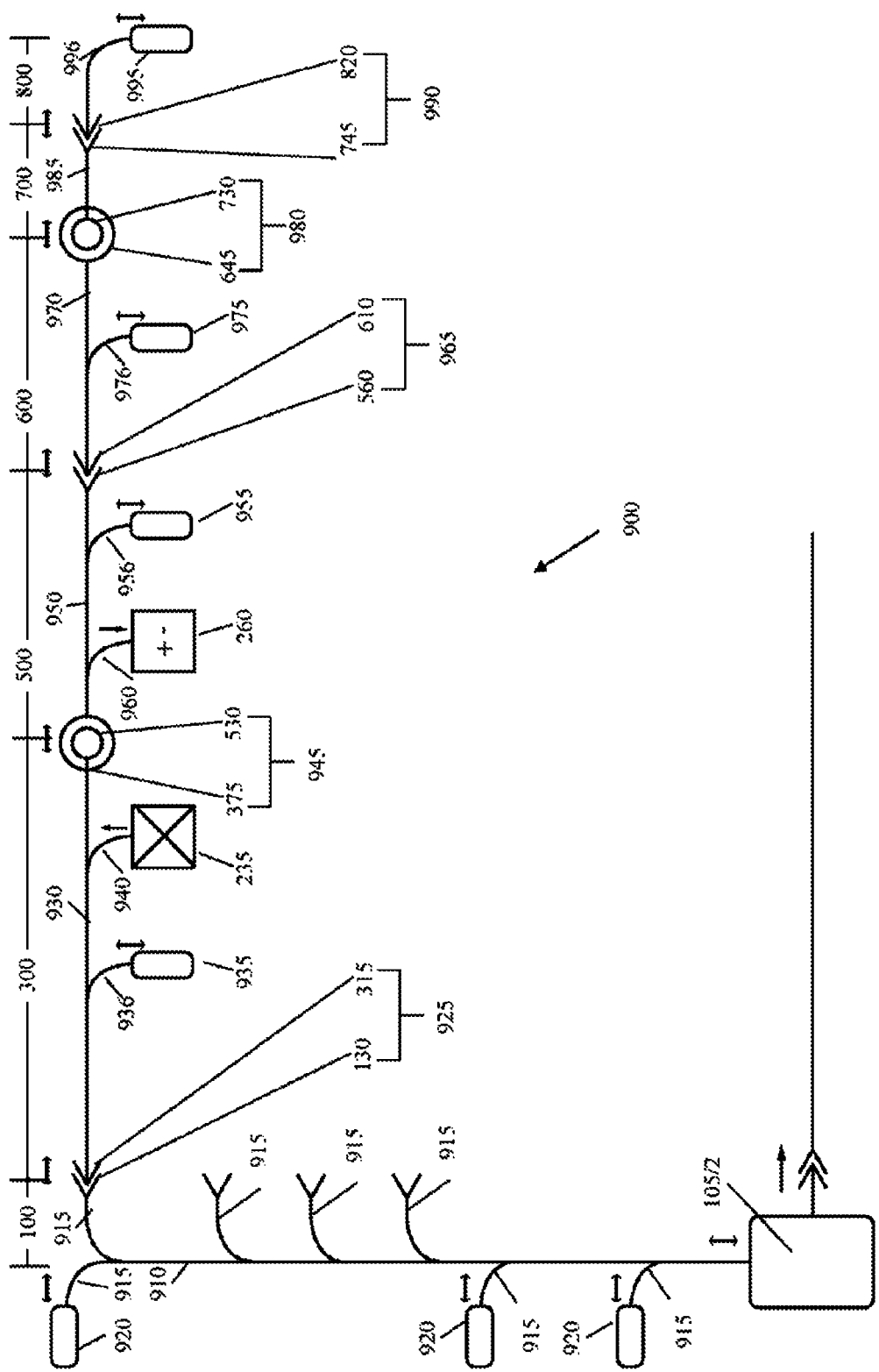
FIG. 25 shows an electrical system of the turbine system in FIG. 1.

FIG. 25 shows an example of an electrical system 900 that may be present through a single segment 201 of a turbine unit 200, along a single carousel arm 600. Some or all of the electrical system 900 may be duplicated for each carousel arm 600 in each segment 201 of a turbine unit 200.

In general, references to electrical communications mechanisms, electrical lines, electrical joints, and the like apply to arrangements for both electric power transmission and signal transmission. As such, unless otherwise stated, discussions of electrical communications mechanisms used for power transmission are also applicable to signal transmission and vice versa. Also, references to electrical lines and electrical joints and the like is understood as referring not simply to an electrical line or an electrical joint in the singular, but also collections of electrical lines and electrical joints in the plural.

At the mast base 105 and/or base-structure 2 there is housed the power distribution, power storage, and/or ancillary power support systems. These systems at the mast base 105 and/or base-structure 2 may include an integrated electrical power conditioning and control system, which allows for synchronization of each phase of multiple multiphase generators. In the mast 100, an electrical trunk line 910 communicates with the power distribution, power storage, and/or ancillary power support systems housed in mast base 105 and/or the base-structure 2 and runs vertically along the height of the mast 100. The trunk line 910 communicates with electrical branch lines 915 that communicate with electrical loads 920 along the mast 100 and the electrical communications mechanisms 130 exposed along the external surface of the mast 100.

At the electrical joint 925, the electrical communications mechanisms 130 at the mast 100 mate with the electrical communications mechanisms 315 at the vertical channel 305 of the carousel-carrier 300. In one example, the electrical communications mechanisms 130 at the mast 100 are electrical sockets 130 and the electrical communications mechanisms 315 at the vertical channel 305 of the carousel-carrier 300 are electrical plugs 315 that are received in the electrical sockets 130 in a male-female connection.

At the carousel-carrier 300, the electrical communications mechanisms 315 at the vertical channel 305 communicate with an electrical branch line 930 through the carousel-carrier 300. The branch line 930 communicates with electrical loads 935 in the carousel-carrier 300, the stator 235 of the generator 230; and the electrical communications mechanisms 375 at the peripheral channel 345 of the carousel-carrier 300. The electrical lines 936 communicating the branch line 930 to the electrical loads 935 are for delivering electrical power and/or relaying signal transmissions for the electrical loads 935. An electrical line 940 communicating the branch line 930 to the stator 235 is for receiving generated electrical power from the stator 235 for delivery to the power distribution, power storage, and/or ancillary power support systems at the mast base 105 and/or base-structure 2.

At the electrical joint 945, the electrical communications mechanisms 375 at the peripheral channel 345 of the carousel-carrier 300 mate with the electrical communications mechanisms 530 at the vertical channel 505 of the carousel-hub 500. In one example, the electrical communications mechanisms 375 at the peripheral channel 345 of the carousel-carrier 300 are a slip ring 375 and the electrical communications mechanisms 530 at the vertical channel 505 of the carousel-hub 500 are slip ring brushes 530 that rotate along the slip ring 375 to yield a rotating electrical joint 945.

At the carousel-hub 500, the electrical communications mechanisms 530 at the vertical channel 505 communicate with an electrical branch line 950 through the carousel-hub 500. The branch line 950 communicates with electrical loads 955 in the carousel-hub 500, the rotor 260 of the generator 230; and the electrical communications mechanisms 560 at the arm sockets 550 of the carousel-hub 500. The electrical lines 956 communicating the branch line 950 to the electrical loads 955 are for delivering electrical power and/or relaying signal transmissions for the electrical loads 955. An electrical line 960 communicating the branch line 950 to the rotor 260 is for delivering electrical power from electrical systems at the mast base 105 and/or base-structure 2 to the electrical coils of the rotor 260 for use in generating a magnetic field at the electromagnetic rotor 260.

At the electrical joint 965, the electrical communications mechanisms 560 at the arm sockets 550 mate with the electrical communications mechanisms 610 at the proximal ends 605 of the carousel arms 600. In one example, the electrical communications mechanisms 560 at the arm sockets 550 are electrical sockets 560 and the electrical communications mechanisms 610 at the proximal ends 605 of the carousel arms 600 are electrical plugs 610 that are received in the electrical sockets 560 in a male-female connection.

At the carousel arm 600, the electrical communications mechanisms 610 at the proximal end 605 communicate with an electrical branch line 970 extending through the carousel arm 600. The branch line 970 communicates with electrical loads 975 in the carousel arm 600, and the electrical communications mechanisms 645 at the distal end 630 of the carousel arm 600. The electrical lines 976 communicating the branch line 970 to the electrical loads 975 are for delivering electrical power and/or relaying signal transmissions for the electrical loads 975.

At the electrical joint 980, the electrical communications mechanisms 645 at an axle socket 635 in the carousel arm 600 mate with the electrical communications mechanisms 730 at the bushing insert 715 of a blade coupler 700 mounted on a blade axle 750 received in the axle socket 635. In one example, the electrical communications mechanisms 645 at the axle socket 635 are slip ring brushes 645 and the electrical communications mechanisms 730 at the bushing insert 715 is a slip ring 730 that rotates relative to the slip ring brushes 645 to yield a rotating electrical joint 980.

At the blade coupler 700, the electrical communications mechanism 730 at the arm-end of a bushing insert 715 communicates with a branch line 985 that that runs along the length of the bushing insert 715 and communicates with the electrical communications mechanisms 745 at the blade-end of the bushing insert 715.

At the electrical joint 990, the electrical communications mechanisms 745 at the blade-end of the bushing insert 715 of the blade coupler 700 mate with the electrical communications mechanisms 820 at the axle channel 810 of the carousel blade 800. In one example, the electrical communications mechanisms 745 at the blade-end of the bushing insert 715 are electrical sockets 745 and the electrical communications mechanisms 820 at the axle channel 810 of the carousel blade 800 are electrical plugs 820 that insert into the electrical sockets 745 in a male-female connection.

At the carousel blade 800, the electrical communications mechanisms 820 at the axle channel 810 communicate with one or more electrical lines 996 for delivering electrical power and/or relaying signal transmissions to one or more electrical loads 995 in the carousel blade 800.

The generator stator 235 housed in the carousel-carrier 300 and the generator rotor 260 housed in the carousel-hub 500 together make up an electrical generator 230 within the turbine unit 200. There may be multiple stators and rotors in each turbine unit 200—including multiple stators and rotors in individual upper and lower compartments 330A/330B and 535A/535B of each turbine unit 200—such that each turbine unit 200 may include multiple electrical generators 230. As such, unless stated otherwise, discussions relative to the stator 235, the rotor 260, and the electrical generator 230 as a whole, are applicable to each stator 235, rotor 260 and electrical generator 230 in the turbine unit 200.

In the carousel-carrier 300, the stator 235 includes a plurality of induction coils and stator housings 240 that protect the induction coils from the outside environment. The stator housings 240 include a plurality of external fins for heat dissipation, and radiators of the armatures of the induction coils have internal tubes to assist in cooling. The induction coils of the stator 235 communicate with the electrical communications mechanisms 315 in the carousel-carrier 300 via the electrical line 940 and the electrical branch line 930.

In the carousel-hub 500, the rotor 260 includes a rotor housing 265 that protects the rotor 260 from the outside environment. The rotor housing 265 includes a plurality of external fins for heat dissipation. When the rotor 260 is an electromagnetic type, it further includes induction coils communicating with the electrical communications mechanisms 530 in the carousel-hub 500 via the electrical line 960 and the electrical branch line 950 for receiving an electrical current that may be used to induce a magnetic field in the rotor 260. If using a permanent magnet type rotor 260, the electrical line 960 may be omitted.

Each carousel-carrier 300 and its corresponding carousel-hub 500 include, respectively, a cooling system for the stators 235 fixed to the carousel-carrier 300 and a cooling system for the rotors 260 fixed to the carousel-hub 500—both of which use external air for cooling. These cooling systems are supplied air by a plurality of air intakes located on the external periphery of the carousel-hub 500 and/or the leading edge of the carousel arms 600 near their proximal ends 605. The air intakes capture ambient air circulating outside the turbine unit 200 and direct the air into a plurality of inflow control devices that distribute the airflow to both cooling systems as needed.

The cooling system of the rotors 260 of the generator 230 include a plurality of air ducts that convey the air from the inflow control devices to a plurality of nozzles, arranged on the carousel-hub 500, which blow air onto the rotor housing 265 for cooling by convection. After the air blown by the nozzles has flowed about the finned surface of the rotor housing 265, the air is extracted to the outside through outlet air ducts.

For the cooling of the stators 235 of the generator 230, the carousel-carrier 300 includes a plurality of air ducts that carry air from the inflow control devices to a plurality of nozzles, arranged on the internal periphery of the carousel-hub 500. The nozzles blow the air into a plurality of air intakes, located on the external periphery of the carousel-carrier 300, which capture the air from the nozzles and channel it through a plurality of air ducts to a plurality of nozzles of the carousel-carrier 300 that blow the air onto the stator housing 240 for cooling by convection. The carousel-carrier 300 further includes a plurality of heat pumps that circulate gas through the radiators of the armatures of the stators 235 to collect heat generated by the induction coils and thereby increase the cooling capacity. After the air blown by the nozzles has flowed about the finned surface of the stator housing 240, the air is directed through outlet air ducts to outflow control devices that let the air flow to the outside or send it to a re-circulation circuit for the purpose of heating constituent elements of the carousel-carrier 300 as needed.

Each electrical load in the electrical system 900 represents one or more operational components and/or systems that require delivery of electrical energy and/or relaying of signal transmissions for operation.

Throughout the turbine system 1, including the mast 100 and each component of the turbine unit 200, the electrical loads may include actuators and sensors for operational control of the turbine system 1. For example, actuators may include drive units for engagement and disengagement of mechanical units; and sensors may include logic gates (e.g., for verifying conditional circumstances such as: an engagement/disengagement state of mechanical units; temperature thresholds; a relative movement/alignment state of two components; etc.).

The electrical load 935 in the carousel-carrier 300 may include: the motorized pinion systems for controlling movements of the load support mechanisms 310, the electrical communications mechanisms 315, and the vertical interlocking mechanisms 390; the carousel rotation systems; the aerodynamic command systems; and access systems controlling closures at the portals of the turbine unit 200.

The turbine system 1 may also include a number of heating and deicing systems for controlling the internal temperature of the turbine system 1 as a whole. Heating and deicing systems in the turbine unit 200 may include heating blankets, a network of heating conductors, and/or collections of electromechanical actuators that are actuated to vibrate by electric pulses arranged along the interior and/or exterior of the hull for each component—including the carousel-carrier 300, the carousel-hub 500, the carousel arms 600, and the carousel blades 800. One or more, or all, of the separate heating and deicing system types may be activated independently or simultaneously to heat the turbine unit 200 and facilitate the detachment of the first layers of ice formed during icing events. These heating and deicing systems may be included among the electrical loads in the respective components.

The turbine system 1 may also utilize a thermal gradient driven heat exchanger system to generate energy for the surface heating of critical components to minimize ice buildup; and may utilize a thermal gradient system with or without a heat exchanger to generate energy for controlling the temperature of critical heat sensitive components. Any such heat exchanger systems may also be included among the electrical loads throughout the electrical system 900.

Modular Design and Segmentation

Assembly and maintenance of the wind turbine system 1 is facilitated by each turbine unit 200 being of modular construction for assembly at the foot of the mast 100, in that each turbine unit 200 may be a modular unit formed from multiple turbine segments 201, with each segment composed of multiple segmented portions. With such a construction, the modular turbine unit 200 may be readily assembled on location at the build site of the turbine system 1; and disassembled at the site for maintenance, repair and/or replacement as needed.

A modular configuration is one wherein a component is composed of multiple predetermined segmentations that, unless stated otherwise, are releasably fastened to one another so as to permit the selective assembly thereof by fastening the individual segments to one another; and permit the selective disassembly thereof by unfastening the individual segments.

A segmented portion (or segmentation) is a pre-fabricated sub-component of a larger modular component that is assembled from multiple such segmented portions. Each segmented portion of a modular component is substantially identical to one another, such that each segmented portion is readily interchangeable and replaceable by a stock segmented portion.

Preferably, the modular design of the turbine system 1 is one wherein the modular arc-shaped circumferential components are composed of a number of segments that is a factor of three, constituting a form factor that coincides with the optimal form factor for segmenting modularly-constructed direct drive three phase generators for wind turbines.

A form factor of three is particularly advantageous if it is desired for the turbine system 1 to have the capability of generating three-phase AC power. In order to generate three-phase power, sets of three stator poles are used. As such, if a modular turbine unit 200 is to be formed from readily interchangeable segments, with substantially identical segments in each modular generator 230 assembly, then division of the modular stator 235 into a number of segments that is not a factor of three would require dividing one or more sets of poles of the stator 235. Such segmentation would not only add significant cost and complexity to the manufacture of the generator segments, but would also present undesirable complexity in interchanging segments of the generator 230. On the other hand, by using the preferred form factor of three, each stator segment 236 in each turbine segment 201 can be substantially identical, without dividing any set of stator poles. As such, a modular construction using a number of segments that is a factor of three will provide significant cost savings and reductions in complexity in the manufacture, assembly and maintenance of the generator segments as compared to other designs. Though not subject to the same three-pole characteristic as the modular stator 235, the modular rotor 260 may likewise be segmented so that each rotor segment 261 has the same number of electromagnets or permanent magnets as the number of coils in the stator segments 236.

Assembly of the modular turbine unit 200, and interchangeability of the individual turbine segments 201 thereof, is enhanced by extending the form factor of three to the components and sub-components of the turbine unit 200 that are of a circular shape and composed of multiple arc-shaped circumferential segments. As such, it is preferable that both the carousel-carrier 300 and the carousel-hub 500 be composed of a number of arc-shaped circumferential segments that is a form factor of three—with each carousel-carrier segment 301 and carousel-hub segment 501 containing portions of the respective upper and lower compartments 330A/330B, 535A/535B and intermediate sections 340, 540).

In extending the form factor of three to the sub-components within the carousel-carrier 300, it is preferable that: the circular generator stator 235 be composed of a number of arc-shaped circumferential segments 236 that is a form factor of three (each segment containing a number of coils); the movement mechanisms 350/355 (e.g., the circular conical roller platforms 353/358) at the top and bottom annular surfaces 346/347 of the peripheral channel 345 be composed of a number of arc-shaped circumferential segments 354/359 that is a form factor of three (each segment carrying a number of conical rollers 350/355); and the electrical communications mechanisms 375 (e.g., the circular slip ring 375) at the peripheral channel 345 be composed of a number of arc-shaped circumferential segments 376 that is a form factor of three.

In extending the form factor of three to the sub-components within the carousel-hub 500, it is preferable that: the circular generator rotor 260 be composed of a number of arc-shaped circumferential segments 261 that is a form factor of three (each segment containing a number of electromagnets or permanent magnets); the circular tracks 515/516 at the top and bottom annular surfaces 506/507 of the compartments 535 be composed of a number of arc-shaped circumferential segments 511/512 that is a form factor of three; the circular tracks 517 at the vertical channel 505 be composed of a number of arc-shaped circumferential segments 513 that is a form factor of three; the carousel rotation mechanism 520 (e.g., the circular crown gear 520) at the vertical channel 505 be composed of a number of arc-shaped circumferential segments 521 that is a form factor of three; and the braking mechanisms 525 (e.g., the circular annular brake rotor 525) at the vertical channel 505 be composed of a number of arc-shaped circumferential segments 526 that is a form factor of three.

Figure 26:
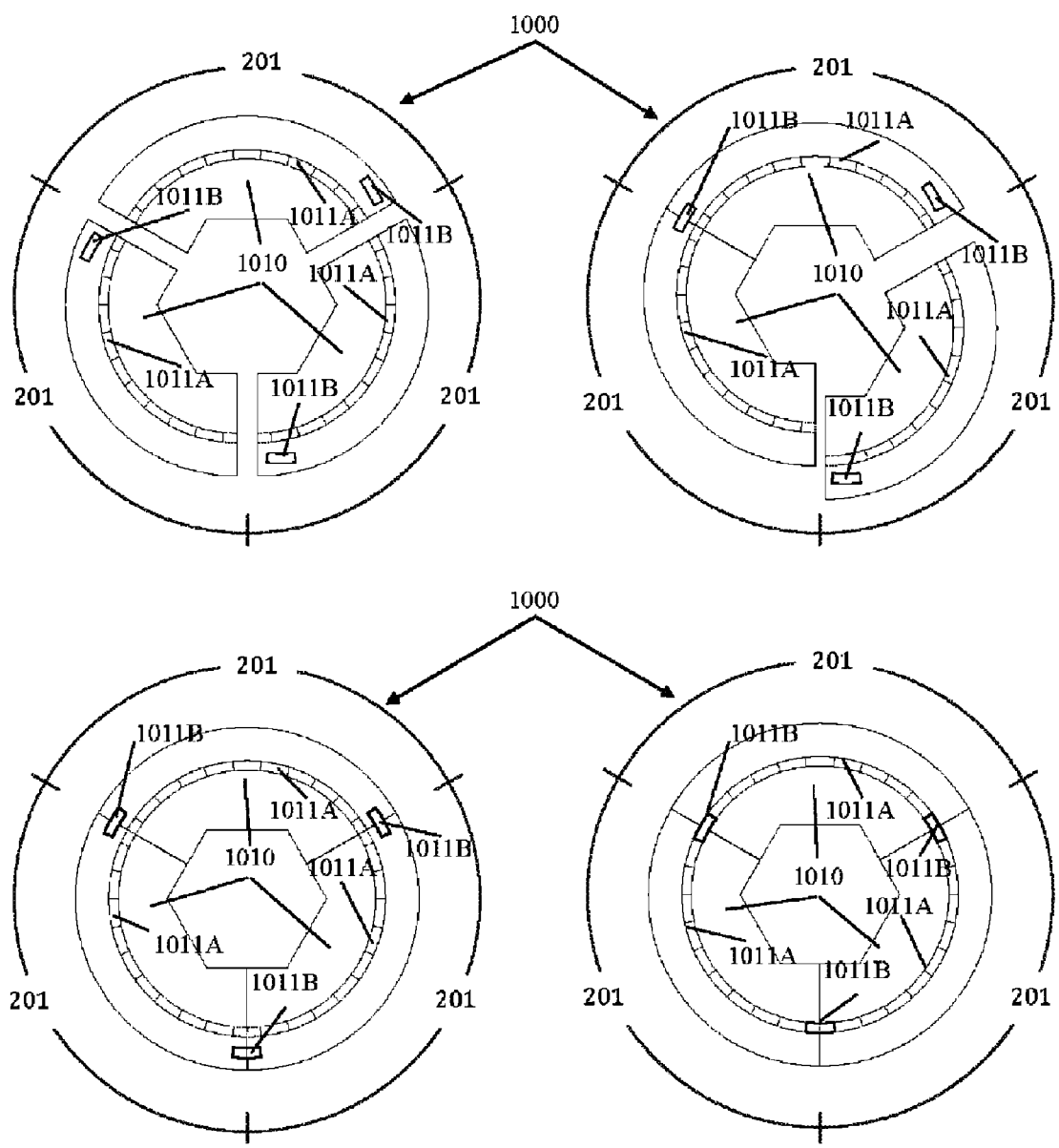
FIG. 26 shows a modular design for the turbine units in the turbine system of FIG. 1.

FIG. 26 shows a preferred modular design for circular sub-components of the carousel-carrier 300 and carousel-hub 500. In such a modular design, a circular sub-component 1010 is divided into a number of sub-component segments 1011, including standard segments 1011A and straddle segments 1011B. Each standard segment 1011A is received entirely within a single turbine segment 201, either at the carousel-carrier 300 or the carousel-hub 500 (depending on the specific sub-component), with each turbine segment 201 receiving an equal number of the standard segments 1011A. Straddle segments 1011B, however, are not received entirely within any one individual turbine segment 201. Instead, each straddle segment 1011B is half received in a first turbine segment 201 and half received in a second adjacent turbine segment 201, so as to straddle the opposing circumferential edges of the two adjacent turbine segments 201. A circular sub-component adopting such a modular design will have an equal number of straddle segments 1011B as the number of turbine segments 201, with one straddle segment 1011B straddling each circumferential edge of each turbine segment 201. Whereas the standard segments 1011A may be loaded during assembly of the individual turbine segments 201, the straddle segments 1011B are loaded only after joining the turbine segments 201 to assemble a compete turbine unit 200.

The modular design in FIG. 26 is applicable to each circular sub-component that extends entirely around the turbine unit 200, including: the generator stator 235; the movement mechanisms 350/355 (e.g., the conical roller platforms 353/358); the electrical communications mechanisms 375 (e.g., the slip ring 375); the generator rotor 260; the conical rollers tracks 515/516; the cylindrical rollers tracks 517; the carousel rotation mechanism 520 (e.g., the crown gear 520); and the braking mechanisms 525 (e.g., the annular brake rotor 525). It is also preferable that the modular design of each of these circular sub-components 1010 be composed of a sufficient number of segments 1011 that each individual segment 1011 may be sufficiently sized and dimensioned for transportation through the portals and elevator shafts of the turbine system 1. In this way, individual segments 1011 of each circular sub-component 1010 may be removed and replaced while the turbine unit 200 remains assembled on the mast 100.

In one example, a turbine unit 200 is assembled by first assembling a complete set of turbine segments 201, and then joining the separate turbine segments 201 to one another around the foot of the mast 100 at the site of the turbine system 1.

Assembly of a turbine segment 201 may begin with assembly of a carousel-carrier segment 301. The carousel-carrier 300 is a modular component in that it is composed of multiple arc-shaped circumferential segments 301, with each carousel-carrier segment 301 including a portion of: the polygonal vertical channel 305; the upper and lower compartments 330A/330B; the intermediate section 340, and the circular peripheral channels 345A/345B—as well as a division of the subsystems and mechanisms therein. Preferably, the modular design of the carousel-carrier 300 has a form factor of three in that the number of carousel-carrier segments 301 is a factor of three.

Figure 27:
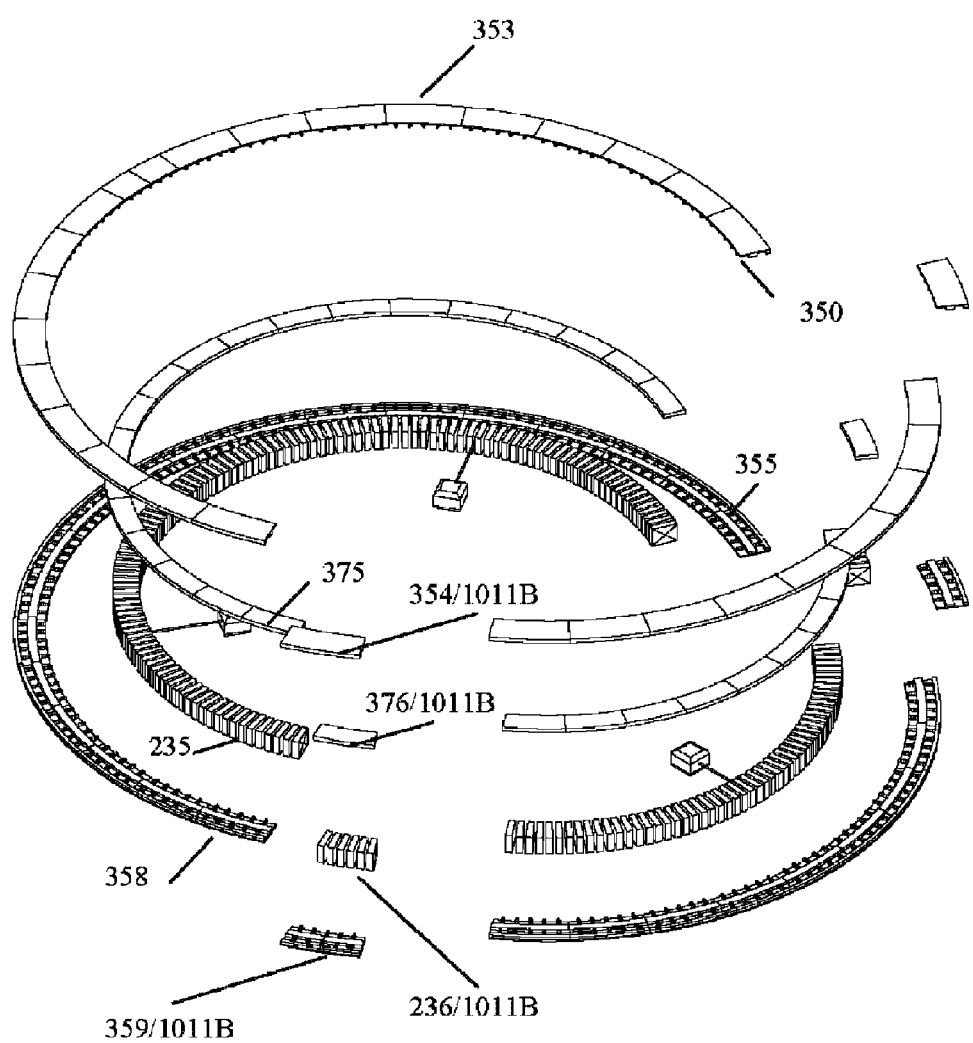
FIG. 27 shows cylindrical sub-components in a carousel-carrier with the modular design of FIG. 26.

A carousel-carrier segment 301 may come pre-loaded with the standard segments 1011A for each of the circular sub-components 1010 therein, such as those shown in FIG. 27, which includes: the generator stator 235; the movement mechanisms 350/355 (e.g., the conical roller platforms 353/358); and electrical communications mechanisms 375 (e.g., the slip ring 375). Preferably each of these sub-components 1010 has a form factor of three in that the number of segments 1011 in each is a factor of three. A pre-loaded arrangement of these sub-components 1010 will omit the straddle segments 1011B at the circumferential ends of each sub-component, leaving half-segment spaces at both circumferential ends of each sub-component 1010 for subsequent insertion of the straddle segments 1011B after assembly of a complete turbine unit 200. If not pre-loaded, then the standard segments 1011A for these sub-components 1010 may be inserted on the carousel-carrier segment 301 prior to joining a carousel-hub segment 501 thereto.

The standard movement mechanisms segments 354/359 (e.g., conical roller platform segments 354/359) may be inserted on the carousel-carrier segment 301 by positioning and securing these segments at the top and bottom annular surfaces 346/347 of the peripheral channel 345 at appropriate positions for aligning and coupling circumferential edges of adjacent segments 354/359 so as to releasably fasten the segments 354/359 to one another. Insertion of the movement mechanisms segments 354/359 is also made at appropriate positions to align the movement mechanisms segments 354/359 (e.g., the conical rollers 350/355) for engaging the circular tracks 515/516 of a carousel-hub 500.

The standard electrical communications segments 376 (e.g., slip ring segments 376) may be inserted on the carousel-carrier segment 301 by positioning and securing these segments at the intermediate annular surface 348 of the peripheral channel 345 at appropriate positions for aligning and coupling circumferential edges of adjacent segments 376 so as to releasably fasten the segments 376 to one another. Insertion of the electrical communications segments 376 is also made at appropriate positions to connect the electrical communications segments 376 with the electrical branch line 930 in the carousel-carrier segment 301; and to align the electrical communications segments 376 for engagement with electrical communications mechanisms 530 (e.g., slip ring brushes 530) in a carousel-hub 500.

Figure 29:
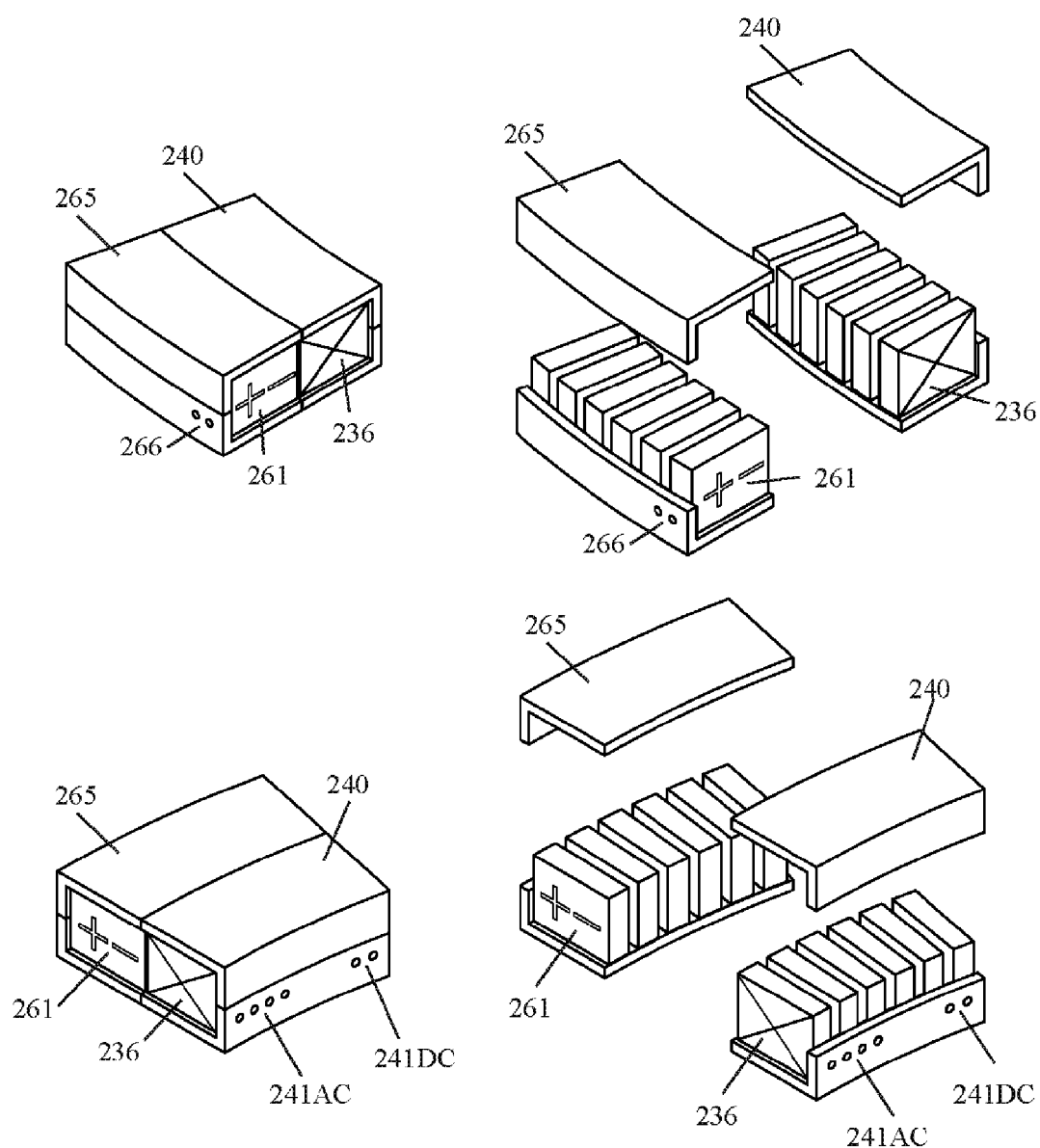
FIG. 29 shows a stator housing in the turbine system of FIG. 1.
Figure 30:
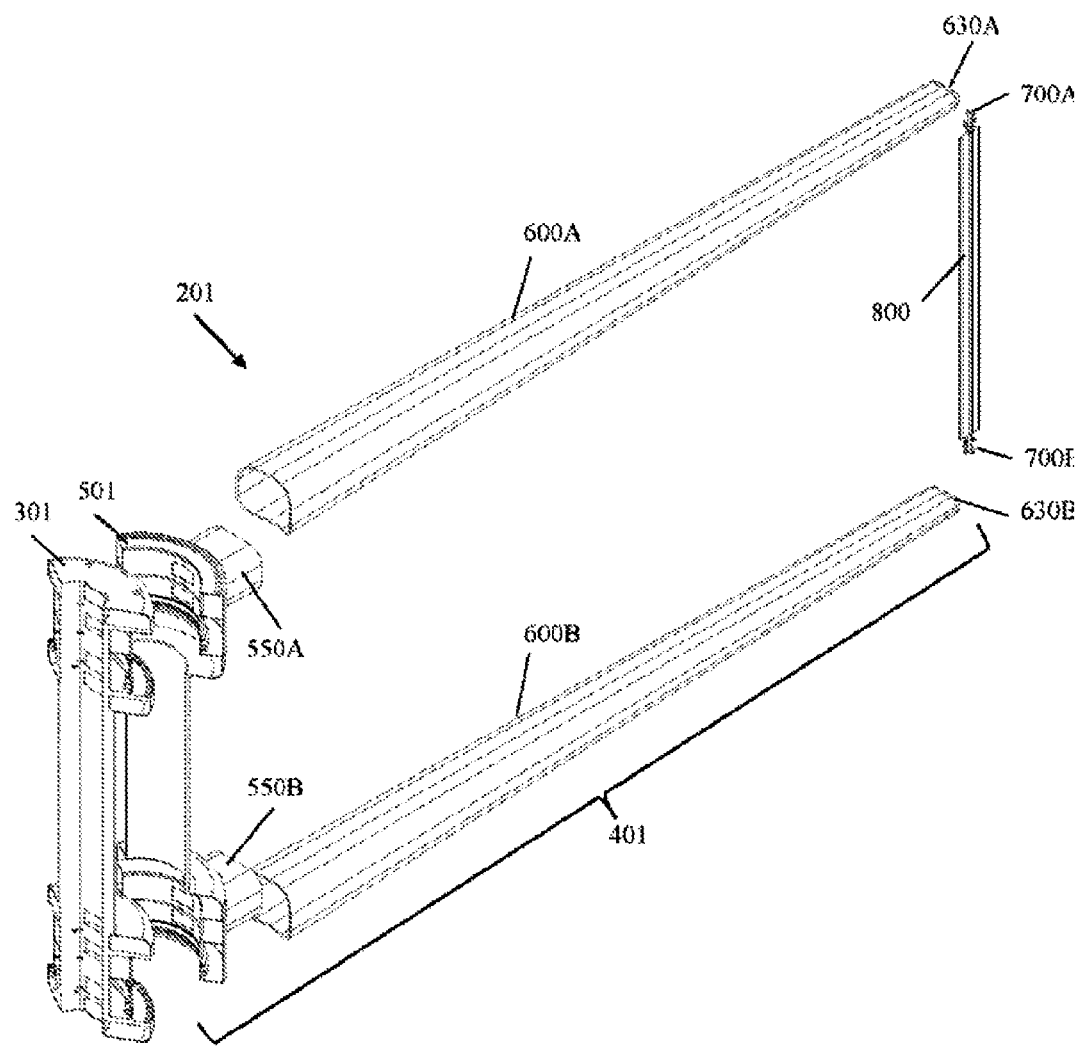
FIG. 30 shows an exploded view of a turbine segment in the turbine unit of FIG. 2.

The standard stator segments 236 may be inserted on the carousel-carrier segment 301 by inserting these segments into the stator housing 240. As shown in FIG. 29, insertion of the stator segments 236 into the stator housing 240 will include aligning and connecting electrical communications mechanisms 241 in the stator housing 240 with electrical communications mechanisms 237 on the stator segments 236, and coupling circumferential edges of adjacent stator segments 236 so as to releasably fasten the stator segments 236 to one another within the stator housing 240. Insertion of the stator segments 236 in the stator housing 240 will position the stator segments 236 to face rotor segments 261 in a carousel-hub 500. Advantageously, because insertion of the stator segments 236 is achieved merely by alignment and engagement of electrical connections within the stator housing 240, the modular stator 235 within the carousel-carrier 300 may at any time be converted between an AC generator stator and a DC generator stator by simply replacing each of the individual stator segments 236. In particular, as shown in FIG. 29, each stator segment 236 will come pre-wired with the induction coils arranged in either an AC configuration or a DC configuration, and with an electrical connection that is readily receivable by a mating electrical connection within the stator housing 240. In this way, if wishing to convert a turbine unit 200 between DC electrical power generation and AC electrical power generation, all that is required is the removal and replacement of each DC stator segment with an AC stator segment—an AC to DC conversion may also be achieved in the same fashion. In this way, an entire turbine unit 200 may be selectively converted between AC and DC operations by simply replacing the individual stator segments 236 via the internal passageways of the turbine system 1 while the turbine unit 200 remains mounted on the mast 100. This is of considerable advantage, as in conventional turbine systems such a conversion would require removal and replacement of the entire turbine unit, which would incur significant expenses and down time for the turbine system.

When inserting segments 1011 of circular sub-components 1010 of the carousel-carrier 300 into a non-pre-loaded carousel-carrier segment 301, only the standard segments 1011A may be inserted prior to assembly of the whole turbine unit 200. The straddle segments 1011B of each circular sub-component are omitted from insertion during assembly of the individual turbine segments 201, and care is taken, if inserting the standard segments 1011A during assembly of the individual turbine segments 201, to leave half-segment spaces at both circumferential ends of each circular sub-component 1010 for the subsequent insertion of the corresponding straddle segments 1011B upon assembly of the whole turbine unit 200. Optionally, all segments 1011 of the circular sub-components 1010 of the carousel-carrier 300, including the standard and straddle segments 1011A/1011B, may be inserted after the individual turbine segments 201 are joined to yield an assembled turbine unit 200.

The carousel-hub 500 is also a modular component composed of multiple arc-shaped circumferential segments 501, with each carousel-hub segment 501 including a portion of: the circular vertical channel 505 at the radial center of the carousel-hub 500, the upper and lower compartments 535A/535B, and the intermediate section 540—as well as a division of subsystems and mechanisms therein. Preferably, the modular design of the carousel-hub 500 has a form factor of three in that the number of carousel-hub segments 501 is a factor of three.

Figure 28:
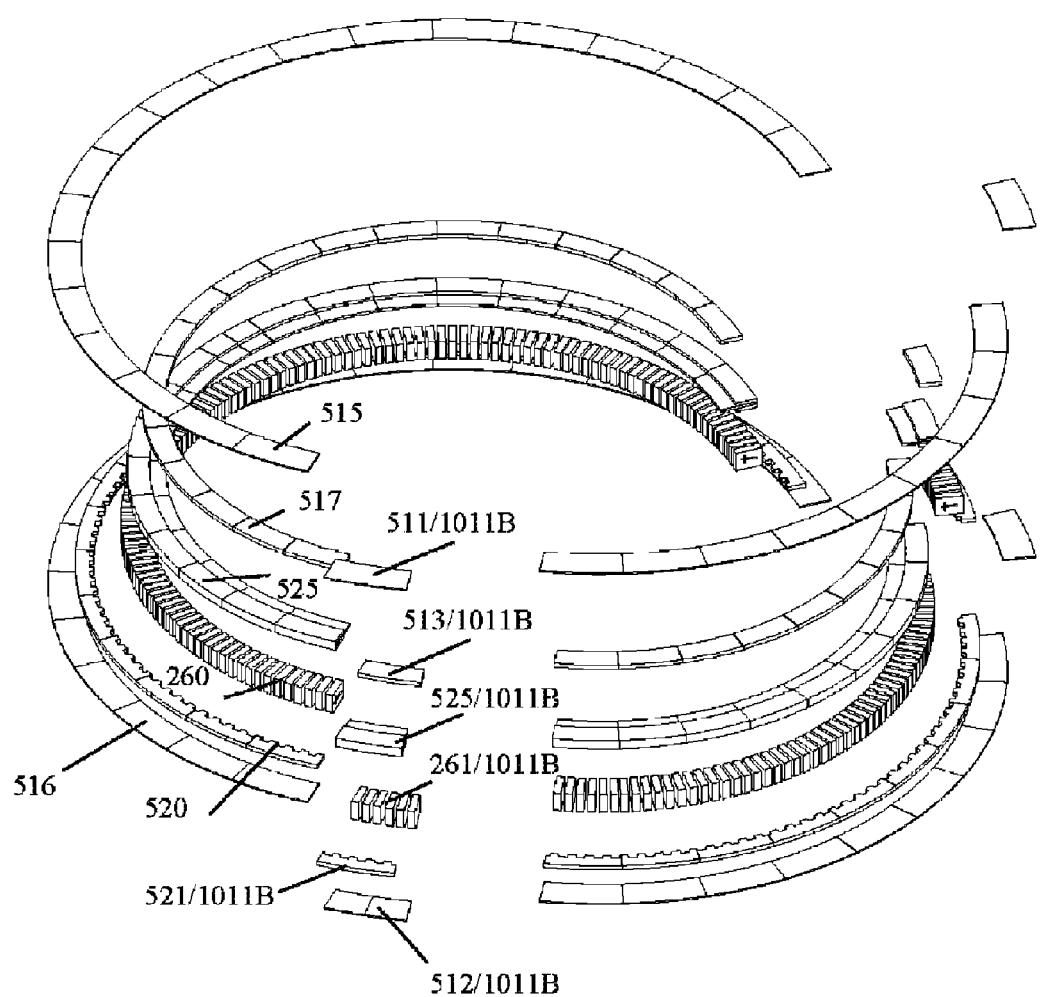
FIG. 28 shows cylindrical sub-components in a carousel-hub with the modular design of FIG. 26.

A carousel-hub segment 501 may come pre-loaded with the standard segments 1011A for each of the circular sub-components 1010 therein, such as those shown in FIG. 28, which includes: the generator rotor 260; the circular tracks 515/516 at the top and bottom annular surfaces; the circular tracks 517 at the intermediate annular surface; the carousel rotation mechanisms 520 (e.g., the crown gear 520); and braking mechanisms 525 (e.g., the annular brake rotor 525). Preferably each of these sub-components 1010 has a form factor of three in that the number of segments 1011 in each is a factor of three. A pre-loaded arrangement of these sub-components 1010 will omit the straddle segments 1011B at the circumferential ends of each sub-component 1010, leaving half-segment spaces at both circumferential ends of each sub-component 1010 for subsequent insertion of the straddle segments 1011B. If not pre-loaded, then the standard segments 1011A for these sub-components 1010 may be inserted on the carousel-hub segment 501 prior to joining the carousel-hub segment 501 to a carousel-carrier segment 301.

The standard circular roller track segments 511/512 may be inserted on the carousel-hub segment 501 by positioning and securing these segments at the top and bottom annular surfaces 506/507 of the compartments 535A/535B at appropriate positions for aligning and coupling circumferential edges of adjacent track segments 511/512 so as to releasably fasten the track segments 511/512 to one another. Insertion of the track segments 511/512 is also made at appropriate positions to align the track segments 511/512 for engagement by the movement mechanisms 350/355 (e.g., the conical rollers 350/355 in conical roller platforms 353/358) of a carousel-carrier 300.

The standard circular roller track segments 513 may be inserted on the carousel-hub segment 501 by positioning and securing these segments at an intermediate annular surface 508 of the vertical channel 505 at appropriate positions for aligning and coupling circumferential edges of adjacent track segments 513 so as to releasably fasten the track segments 513 to one another. Insertion of the track segments 513 is also made at appropriate positions to align the track segments 513 for engagement by the movement mechanisms 360 (e.g., the cylindrical rollers 360) of a carousel-carrier 300.

The standard carousel rotation mechanisms segments 521 (e.g., the crown gear segments 521) may be inserted on the carousel-hub segment 501 by positioning and securing these segments at an intermediate annular surface 508 of the vertical channel 505 at appropriate positions for aligning and coupling circumferential edges of adjacent segments 521 so as to releasably fasten the carousel rotation mechanisms segments 521 to one another. Insertion of the carousel rotation mechanisms segments 521 is also made at appropriate positions to align the carousel rotation mechanisms segments 521 for engagement by the carousel rotation mechanism 365 (e.g., the pinion 365) of a carousel-carrier 300.

The standard braking mechanisms segments 526 (e.g., the annular brake rotor segments 526) may be inserted on the carousel-hub segment 501 by positioning and securing these segments at an intermediate annular surface 508 of the vertical channel 505 at appropriate positions for aligning and coupling circumferential edges of adjacent braking mechanisms segments 526 so as to releasably fasten the braking mechanisms segments 526 to one another. Insertion of the braking mechanisms segments 526 is also made at appropriate positions to align the braking mechanisms segments 526 for engagement by the braking mechanisms 370 (e.g., the brake calipers 370) of a carousel-carrier 300.

The standard rotor segments 261 may be inserted on the carousel-hub segment 501 by inserting these segments into the rotor housing 265. Insertion of the rotor segments 261 into the rotor housing 265 will include aligning and connecting electrical communications mechanisms in the rotor housing 265 with electrical communications mechanisms on the rotor segments 261, and coupling circumferential edges of adjacent rotor segments 261 so as to releasably fasten the rotor segments 261 to one another within the rotor housing 265. Insertion of the rotor segments 261 in the rotor housing 265 will position the rotor segments 261 to face stator segments 236 in a carousel-carrier 300. The electrical connections of the rotor segments 261 and the rotor housing 265 may be similar in construction to the electrical connections 237/241 at the stator segments 236 and the stator housing 265. If using a permanent magnet rotor, there need not be any alignment and engagement of electrical communications mechanisms between the rotor segments 261 and the rotor housing 265.

When inserting segments 1011 of circular sub-components 1010 of the carousel-hub 500 into a non-pre-loaded carousel-hub segment 501, only the standard segments 1011A may be inserted prior to assembly of the whole turbine unit 200. The straddle segments 1011B of each circular sub-component 1010 are omitted from insertion during assembly of the individual turbine segments 201, and care is taken, if inserting the standard segments 1011A during assembly of the individual turbine segments 201, to leave half-segment spaces at both circumferential ends of each circular sub-component 1010 for the subsequent insertion of the corresponding straddle segments 1011B upon assembly of the whole turbine unit 200. Optionally, all segments 1011 of the circular sub-components 1010 of the carousel-hub 500, including the standard and straddle segments 1011A/1011B, may be inserted after the individual turbine segments 201 are joined to yield an assembled turbine unit 200.

A carousel-hub segment 501 is joined to a carousel-carrier segment 301 by aligning the portion of the circular vertical channel 505 of the carousel-hub segment 501 with the radial outer surface of the carousel-carrier segment 301—which will include aligning and engaging: the circular tracks 515-517 and movement mechanisms 350/355/360; the braking mechanisms 525/370; and the electrical communications mechanisms 530/375.

When assembled on a carousel-carrier segment 301, the carousel-hub segment 501 is supported principally by the movement mechanisms 350/355/360 at the peripheral channel 345 of the carousel-carrier segment 301 engaging the circular tracks 515-517 on the carousel-hub segment 501. Preferably, the braking mechanisms 370/525 at the carousel-carrier segment 301 and the carousel-hub segment 501 are engaged while assembly of the turbine segment 201 proceeds, so as to secure and stabilize the carousel-hub segment 501 on the carousel-carrier segment 301.

Carousel arms 600 are joined to the arm sockets 550 on the radial outer surface of the carousel-hub segment 501 by mating coupling mechanisms at the proximal ends of the carousel arms 600 with coupling mechanisms at the arm socket 550. Preferably, the coupling mechanisms of the carousel arms 600 and arm sockets 550 is one facilitating a releasable fastening of the carousel arms 600, such as one wherein the arms 600 are slidably inserted either into or over the arm sockets 550 and releasably bolted in place. The electrical communications mechanisms 560/610 of the arm socket 550 and the carousel arm 600 may be engaged simultaneously upon engaging the carousel arm 600 to the arm socket 550, or subsequent thereto.

In one example, a blade axle 750 is first secured between the distal ends 630A/630B of a pair of upper and lower carousel arms 600A/600B, via insert through the corresponding axle sockets 635 and engagement with the respective axle stays 640. Fixation of the upper and lower ends of the blade axle 750 with the components in the upper and lower carousel arms 600A/600B may be undertaken from within the passageways 615 of the respective carousel arms 600A/600B. After fixing the upper and lower arms 600A/600B to opposite ends of a blade axle 750, the complete arrangement of the arms 600A/600B and axle 750 are joined, as a unit, to the carousel-hub segment 501 by joining the proximal ends 605A/605B of the carousel arms 600A/600B to the upper and lower arm sockets 550A/550B.

In another example, as when the carousel arms 600 are sufficiently pliable to permit flexing of the distal ends 630, both carousel arms 600A/600B may first be secured to the carousel-hub segment 501, and the blade axle 750 then inserted into the axle sockets 635 thereafter. Subsequent insertion of the blade axle 750 into the axle sockets 635 may be achieved by flexing the upper carousel arm 600A to allow for insertion of the blade axle 750 in both axle sockets, and releasing the upper arm 600A from the flexed state after insertion.

Once a blade axle 750 is secured between corresponding upper and lower carousel arms 600A/600B, the carousel blade 800 is then mounted on the blade axle 750 by securing the bushing inserts 715 of the upper and lower blade couplers 700 mounted on the blade axle 750 to an inner surface of the axle channel 810 in the foil body 805. The electrical communications mechanisms 745/820 of the bushing insert 715 and of the carousel blade 800 are also engaged at this time. The channel cover 825 is then fastened to the foil body 805 to close the axle channel 810 and secure the blade axle 750 therein, and to complete the aerodynamic profile of the carousel blade 800.

The joining of a carousel-carrier segment 301, a carousel-hub segment 501, a pair of carousel arms 600A/600B and a carousel blade 800 will yield a complete turbine segment 201. Preferably, each turbine segment 201 is assembled at a testing facility so that operational tests may first be performed to ensure systems in the assembled turbine segment 201 are properly operational, and to facilitate any needed maintenance, prior to deploying the turbine segment 201 to the site of the turbine system 1.

Each individual turbine segment 201 for a complete turbine unit 200 may be assembled at the testing facility according to the foregoing assembly methods, and subjected to the same operational testing to ensure proper operation. Upon successful testing, the turbine segments 201 are then transported from the testing facility to the site of the turbine system 1.

In addition to testing the individual turbine segments 201 alone, the testing facility may include systems for testing all of the turbine segments 201 in an assembled state as a turbine unit 200. For example, the testing facility may include a model mast that simulates a length of the mast 100 at the turbine system 1; and the individual turbine segments 201 may be temporarily assembled around the model mast to yield a fully assembled turbine unit 200. The turbine unit 200 may then be tested on the model mast at the testing facility to ensure proper operation—including full rotation of the carousel 400 around the carousel-carrier 300; and vertical movement of the carousel-carrier 300 along a height of the model mast. Upon completing testing, and any needed maintenance, the turbine unit 200 is disassembled down to the individual turbine segments 201 and the individual turbine segments 201 are then transported from the testing facility to a storage site or to the site of the turbine system 1.

A complete turbine unit 200 is assembled by joining the individual turbine segments 201 with one another around the foot of the mast 100 at the site of the turbine system 1. Joining of the turbine segments 201 will include aligning the portion of the polygonal vertical channel 305 of each carousel-carrier segment 301 with a corresponding portion of the polygonal outer surface of the mast 100; and aligning and engaging the movement mechanisms 325 exposed at the vertical channel 305 of the carousel-carrier segment 301 with the vertical tracks 115 extending along the mast 100. Joining of the turbine segments 201 will also include aligning circumferential coupling mechanisms 399/399 at opposing circumferential edges of adjacent carousel-carrier segments 301 and releasably coupling the separate carousel-carrier segments 301 to one another; and aligning circumferential coupling mechanisms 599/599 at opposing circumferential edges of adjacent carousel-hub segments 501 and releasably coupling the separate carousel-hub segments 501 to one another.

Once all alignments, engagements, and couplings between the individual components of the turbine segments 201 (and the mast 100) are completed, there is achieved an assembled turbine unit 200. Assembly of a turbine unit 200 in this manner simultaneously results in assembly of a whole carousel-carrier 300, a whole carousel-hub 500, and a whole carousel 400.

Once the turbine unit 200 is assembled, assembly of the circular sub-components 1010 within the turbine unit 200 is competed by inserting the straddle segments 1011B of each circular sub-component. Insertion of the straddle segments 1011B is undertaken by transporting the straddle segments through a portal at the base-structure 2, through the elevator shafts, and through the portals in the mast 100 and the turbine unit 200 to deliver the straddle segments 1011B to interior rooms of the turbine unit 200 that grant access for insertion of the straddle segments 1011B to their respective sub-component assemblies. This is done for each circular sub-component 1010 having a modular design that includes straddle segments 1011B.

In some instances, assembly of the individual turbine segments 201 and the turbine unit 200 as a whole may have been completed without prior insertion of the standard segments 1011A of the modular segmented circular sub-components 1010. In such instances, the standard segments 1011A may be inserted into the fully assembled turbine unit 200 in the same manner as the straddle segments 1011B.

The assembly of a whole turbine unit 200 from individual turbine segments 201, and the insertion of segments 1011 of modular circular sub-components 1010 (both standard and straddle segments 1011A/1011B), around a model mast at the test facility is undertaken in the same manner as the forgoing assembly methods relative to the mast 100 at the site of turbine system 1. However, upon completing testing and maintenance of the turbine unit 200 on the model mast at the test facility, disassembly of the turbine unit 200 down to the individual turbine segments 201 requires removal of at least the straddle segments 1011B from their inserted positions. However, the straddle segments 1011B may be stowed within interior rooms of the turbine segments 201 to await reinsertion upon rejoining the turbine segments 201 at the mast 100 of the turbine system 1, without then requiring transport through the entire turbine system 1.

In some examples, transportation of the components for assembling the turbine unit 200 might be further facilitated by breaking down a tested turbine unit 200 to the separate components that make up the turbine segments 201. For example, if wishing to transport the components as individually smaller units, a tested turbine unit 200 may be disassembled down to: the individual carousel-carrier segments 301; the individual carousel-hub segments 501; the individual carousel arms 600A/600B; the individual blade couplers 700A/700B; the individual blade axles 750; and the individual carousel blades 800 (with foil body 805 and channel cover 810). The individual components may then be separately transported to the site of the turbine system 1, and reassembled to form a complete turbine unit 200 at the foot of the mast 100. Disassembly of a tested turbine unit 200 down to its individual components (such as the foregoing) may also prove helpful in pre-testing and storing component segments for later delivery on an as-needed basis in the event that a component or component segment previously deployed at a turbine system 1 fails and is in need of replacement by one or more pre-tested component segments.

The circumferential coupling mechanisms 399/599 along circumferential edges of the carousel-carrier segments 301 and carousel-hub segments 501, for coupling the segments to form both an assembled carousel-carrier 300 and an assembled carousel 400 (and thus an assembled turbine unit 200) preferably enable a simplified assembly method of sliding the individual turbine segments 201 into position and releasably fastening the segments together.

One example of a suitable circumferential coupling mechanisms 399/599 is a number of flanges along the walls of the interior rooms and/or along the exterior hulls of the carousel-carrier 300 and the carousel-hub 500, with horizontal bores formed in the flanges—the horizontal bores being positioned for alignment and reception of bolts therein. With such circumferential coupling mechanisms 399/599 adjacent circumferential segments may be coupled to one another by simply positioning the segments side by side, with alignment of the horizontal bores on adjacent segments, and insertion and securement of bolts in aligned pairs of bores.

The use of such circumferential coupling mechanisms 399/599 as the foregoing enables coupling of adjacent circumferential segments without overlapping any portion of the adjacent circumferential segments in the radial direction. Such a coupling arrangement permits insertion and engagement, as well as disengagement and removal, of an individual circumferential segment without requiring an adjustment in the position of the adjacent circumferential segments.

Assembly of the turbine unit 200 is completed once the individual turbine segments 201 are joined to one another at the foot of the mast 100. Once so assembled, winch cables 151 from the winches at the mast roof 110 may be secured to the winch coupling mechanisms 380 at the top surface of the carousel-carrier 300 and the turbine unit 200 may be raised along the mast 100.

As each turbine unit 200 is independently operable to generate electrical power, the turbine system 1 may include only one turbine unit 200 positioned along the mast 100. However, additional turbine units 200 may be added to the mast 100 as desired. FIGS. 36A-37B show examples of the turbine system 1 with one, two, three and four turbine units 200.

The addition of further turbine units 200 to the mast 100 may proceed according to the same assembly methods as that for the first turbine unit 200, once the first turbine unit 200 is moved upward along the mast 100 from the lower assembly region.

Turbine Operation

An assembled turbine unit 200 is moved along the mast 100 by the winches 150 at the mast roof 110 that are connected to the winch coupling mechanisms 380 at the upper surface of the carousel-carrier 300 by winch cables 151. Cooperation of the movement mechanisms 325 at the vertical channel 305 of the carousel-carrier 300 and the vertical tracks 115 at the mast 100 facilitates movement of the turbine unit 200 along the mast 100 upon operation of the winches 150. The corresponding polygonal shapes of the mast 100 and the vertical channel 305 in the carousel-carrier 300 further promote a stable linear movement of the turbine unit 200 along the mast 100 by inhibiting rotation around the mast 100.

As a further measure to facilitate stable movement of the turbine unit 200, the braking mechanisms 370/525 between the carousel-carrier 300 and the carousel-hub 500 may remain engaged during vertical movements of the turbine unit 200 so as to prevent rotation of the carousel 400 around the carousel-carrier 300, and prevent occurrence of the associated stresses that result from such rotation.

An assembled turbine unit 200 may be placed into electrical power generating operation by moving the turbine unit 200 vertically along the mast 100 and placing it at a parked position. There may be a number of parked positions along the mast 100, and the number of parked positions may exceed the number of turbine units 200—such that turbine units 200 may be selectively moved to preferred parked positions based on current and/or projected weather patterns.

Parked positions along the mast 100 are defined by the placement of the load supporting mechanisms 125, the electrical communications mechanisms 130, and the portals 120 along the mast 100—each of which are positioned for alignment and engagement, respectively, with the load supporting mechanisms 310, electrical communications mechanisms 315, and portals 320 arranged along the radial inner surface of the vertical channel 305 extending through the carousel-carrier 300.

Upon movement of the turbine unit 200 to a parked position, the load support mechanisms 125/310 may first be engaged to secure the carousel-carrier 300 and fix it against vertical motion along the mast 100 and enable the load supporting mechanisms 125/310 to relieve some or all of the load borne by the winches 150 at the mast roof 110. The electrical communications mechanisms 130/315 may then be engaged to establish an electrical communication between an electrical network in the mast 100 and electrical systems in the carousel-carrier 300 (and the turbine unit 200 as a whole). In some examples of the turbine system 1, when the electrical communications mechanisms 130/315 are integral with the load supporting mechanisms 125/310, the two may be engaged simultaneously with one another.

Upon engaging the load supporting mechanisms 125/310 and electrical communications mechanisms 130/315, the turbine unit 200 is operationally secured at the parked position, and may then be placed into an electrical power generating operation by rotation of the carousel 400 on the carousel-carrier 300.

Rotation of the carousel 400 first requires disengaging the braking mechanisms 370/525 between the carousel-carrier 300 and the carousel-hub 500 such that the carousel 400 is made free to rotate. In some instances, as in the presence of strong winds, disengagement of the braking mechanisms 370/525 may yield rotation of the carousel 400 under just the influence of a torque force generated by the wind flow over the surface of the carousel blades 800. Such an initiation of carousel rotation is facilitated by operation of the rotatable carousel blades 800 by the aerodynamics command system. In particular, rotational control of the rotatable carousel blades 800 allows for rotation of the blades to an appropriate angle relative to the direction of wind flow so as to achieve a preferred angle of attack that may generate a sufficient torque force to overcome the frictional forces between the movement mechanisms 350/355/360 at the carousel-carrier 300 and the carousel-hub 500—thereby initiating rotation of the carousel 400. In this way, carousel rotation at the turbine unit 200 may be self-starting via torque from wind flow alone.

As a back-up, as in instances where frictional forces between the movement mechanisms 350/355/360 at the carousel-carrier 300 and the carousel-hub 500 might be abnormally high, initiation of carousel 400 rotation may be achieved by operation of the carousel rotation system housed in the carousel-carrier 300 and communicating with the carousel-hub 500. In one example, the carousel rotation system may include a motor, a gearbox and a pinion 365 that engages and disengages a receiving gear 520 arranged on the inner circumference of the carousel-hub 500 to generate a torque between the carousel-carrier 300 and the carousel-hub 500. Such an initiation of carousel rotation at the turbine unit 200 remains self-starting, though via the local carousel rotation system.

Upon initiating carousel rotation, the carousel arms 600 and carousel blades 800 will revolve in an orbit around the vertical axis of the mast 100. While revolving around the mast 100, a wind flow will act on the carousel blades 800 to generate a torque force that further promotes rotation of the carousel 400.

With the direct drive configuration of the turbine system 1, rotation of the carousel 400 around the mast 100 is translated one-to-one to a rotation of the generator rotor 260 in the carousel-hub 500 around the generator stator 235 in the carousel-carrier 300. Rotation of the magnetized rotor 260 around the stationary stator 235 induces a moving magnetic field in the stator 235, which induces an electrical current in the induction coils wrapped on the stator 235. It is in this manner that rotation of a carousel 400 in a turbine unit 200 generates direct drive electrical energy.

While the turbine unit 200 may use fixed carousel blades 800, the use of rotatable carousel blades 800 is preferred. In particular, while a fixed carousel blade may generate a sufficient torque to rotate the carousel 400 (and generate electrical power), the angle of attack of the wind relative to the airfoil shape of a fixed blade changes as the blade revolves around the mast 100. As a result, a fixed blade is not able to maintain an optimum angle of attack relative to a wind flow, thus failing to realize an optimum power conversion and presenting energy fluctuations that may prove problematic in operation of the turbine system 1.

The use of rotatable carousel blades 800 may address the problems experienced with fixed blades. In particular, a rotatable carousel blade 800 may be controlled to rotate the foil body 805 around the blade axle 750 so as to orient the carousel blade 800 relative to oncoming wind to achieve a preferred angle of attack and maximize the torque produced by the blade 800. In the turbine system 1, the aerodynamic command system enables controlled rotation of the carousel blades 800 continuously while the blades revolve around the mast 100. In this way, the rotatable carousel blade 800 may be controlled to more reliably maintain an optimum angle of attack to the wind flow as it revolves around the mast 100 to better optimize power conversion and maintain more constant power generation levels that will also lessen the potential problems associated with energy fluctuations. The aerodynamic command system may also rotate the carousel blades 800 to help prevent damage to the turbine system 1 by rotating the blades to present an angle of attack that reduces the torque produced by the blades in instances of excessive wind flow speeds. The carousel blades 800 may be operated in this manner to act as aerodynamic brakes to reduce the rotation speed of the carousel 400 and possibly facilitate a stop in the rotation of the carousel 400.

A turbine unit 200 may be placed into a non-operational condition by braking the carousel 400 against rotation around the carousel-carrier 300. Such a non-operational condition may be employed to halt operation of the turbine unit 200 either to reduce energy generation or to secure the turbine unit 200 during severe weather conditions. In extreme weather conditions (e.g., hurricane level winds), each turbine unit 200 may be placed in a non-operational condition, by disengaging them from elevated parked positions (where electrical generation operations are performed) and moving them to lower parked positions at a lower end of the mast 100, where they may be stowed in non-operational states.

The non-operational condition may also be employed to permit personnel to safely access the turbine unit 200, via the elevator shafts 135A/135B/135C and the aligned portals 120/320 at the parked position, for maintenance and/or repairs. Access to the turbine unit 200 may be limited (e.g., to just the carousel-carrier 300) or all together prevented (e.g., no access beyond an elevator shaft 135) when the turbine unit 200 is operational (e.g., when the carousel-hub 500 is rotating to generate electrical power at the generator 230). When allowing personnel access to the turbine unit 200, the electrical communications mechanisms may provide electrical power to personnel support systems within the turbine unit 200 (e.g., lighting, HVAC, etc.).

FIGS. 31-35 show examples of floor plans for a fully accessible parked turbine unit 200. In particular, a turbine unit 200 may be placed in a fully accessible parked position by moving and locking the carousel-hub 500 at a position aligning a portal 510 at the vertical channel 505 of the carousel-hub 500 with a portal 395 at the peripheral channel 345 of the carousel-carrier 300. The carousel-hub 500 may be placed in the appropriate position relative to the carousel-carrier 300 by operating the carousel rotation system to rotate the carousel-hub 500 (and the carousel 400 as a whole) to align the portals 395/510 and then engaging the braking mechanisms 370/525 to secure the carousel-hub 500 at the aligned position.

Figure 31:
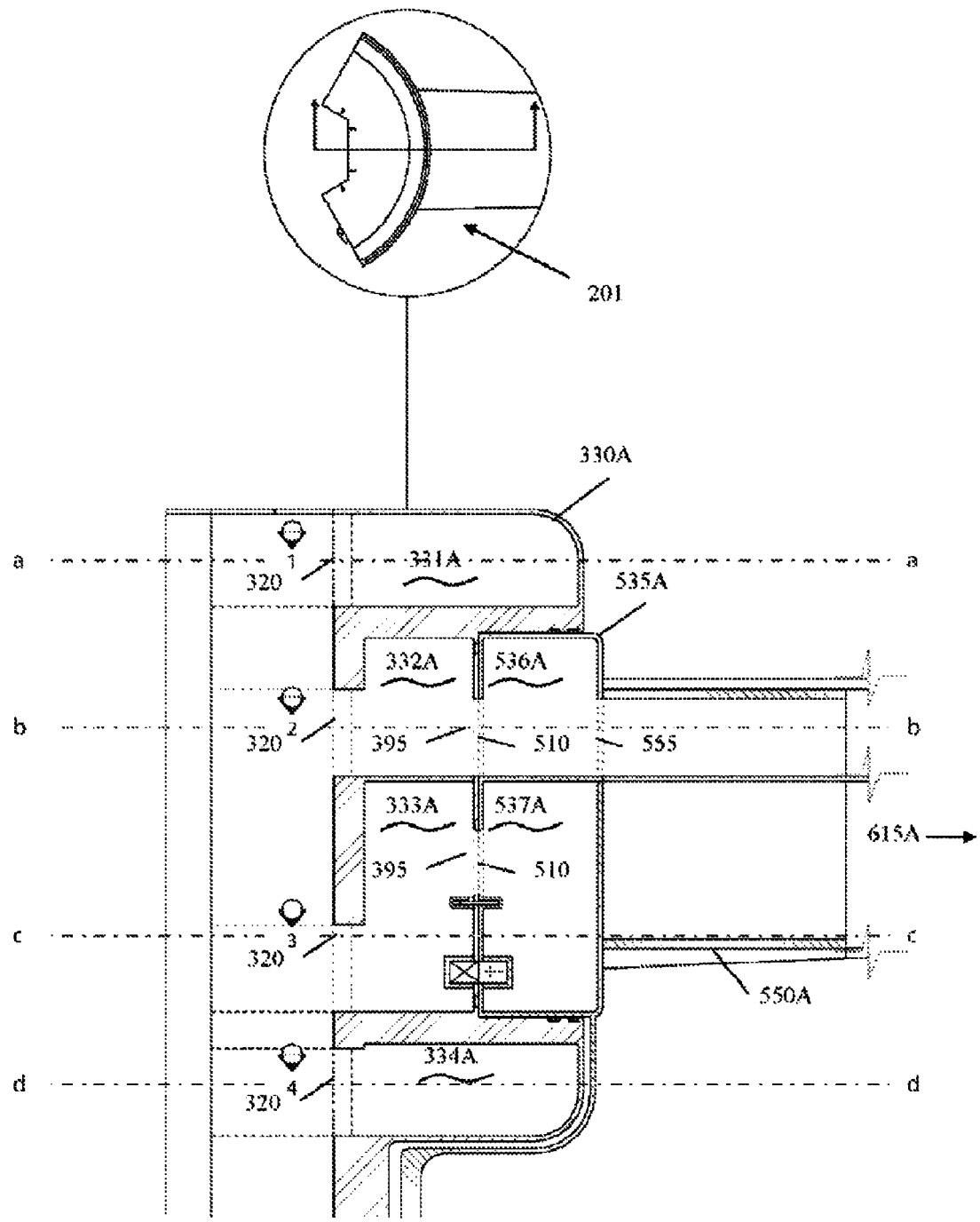
FIG. 31 shows a cross-sectional view of a turbine segment in the turbine unit of FIG. 2.
Figure 32:
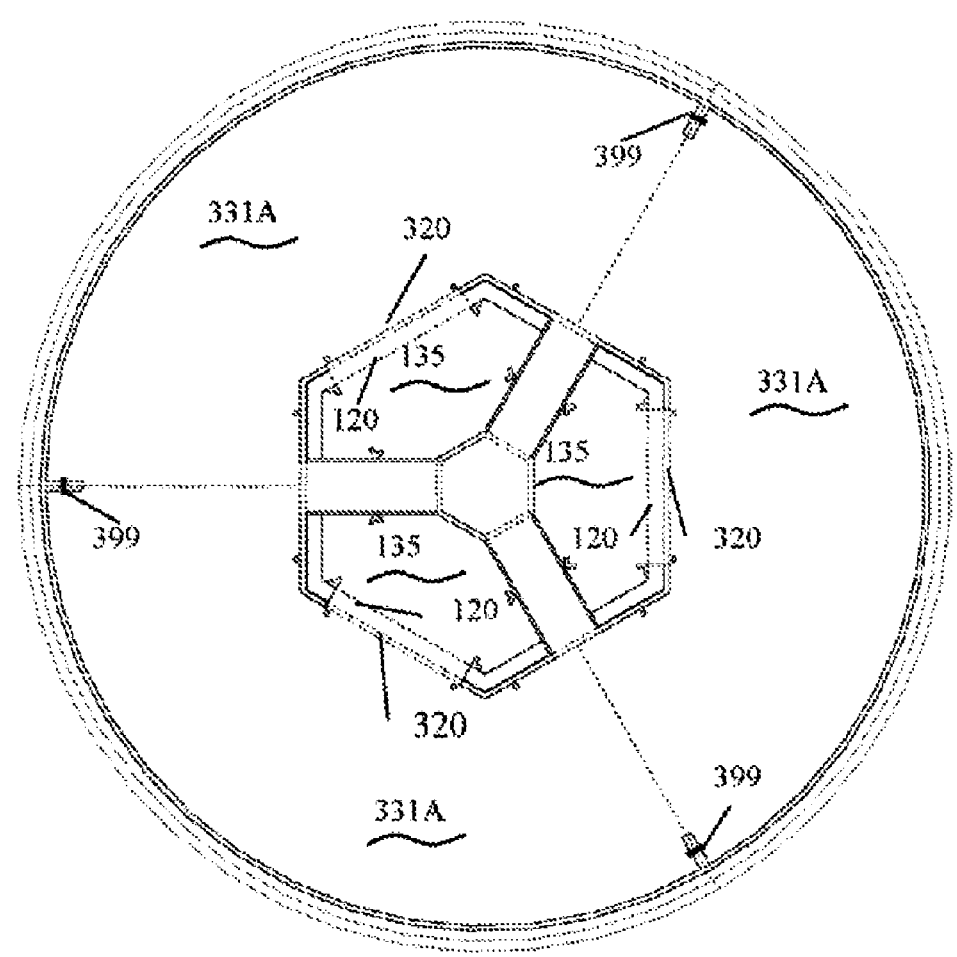
FIG. 32 shows a first floor plan of a turbine unit in the turbine system of FIG. 1, as seen in a top plan view at line a-a.
Figure 33:
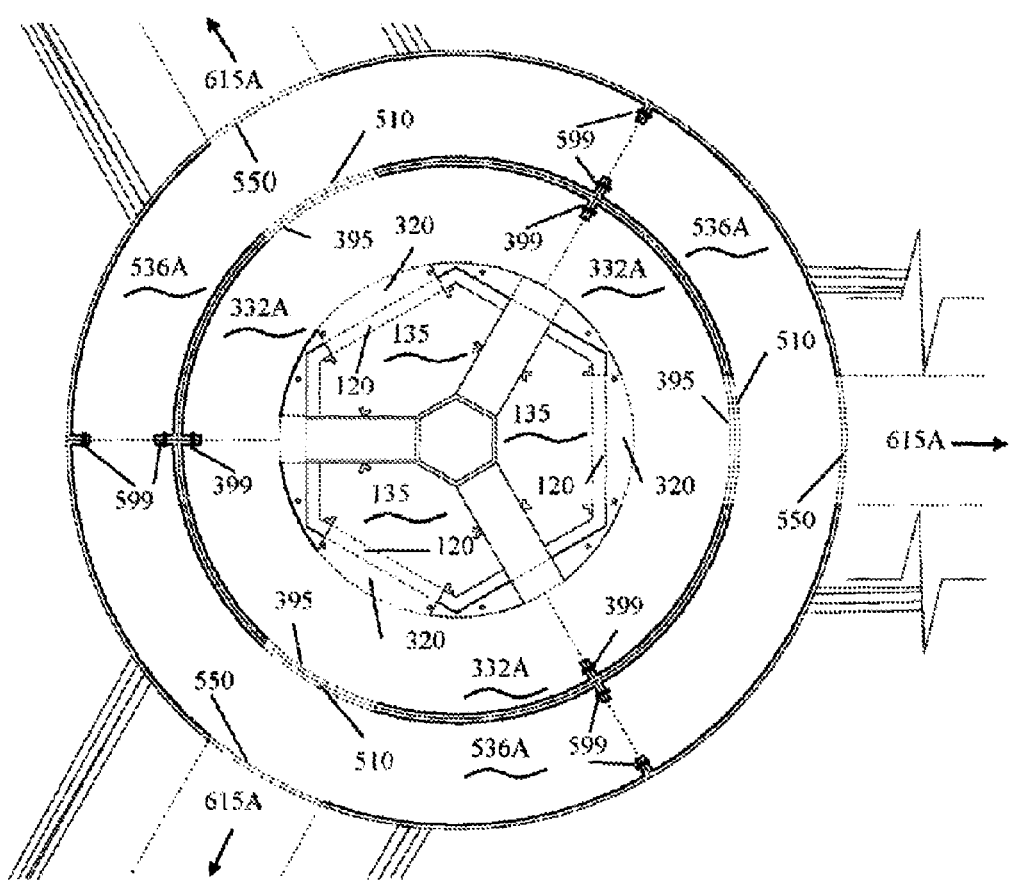
FIG. 33 shows a second floor plan of a turbine unit in the turbine system of FIG. 1, as seen in a top plan view at line b-b.
Figure 34:
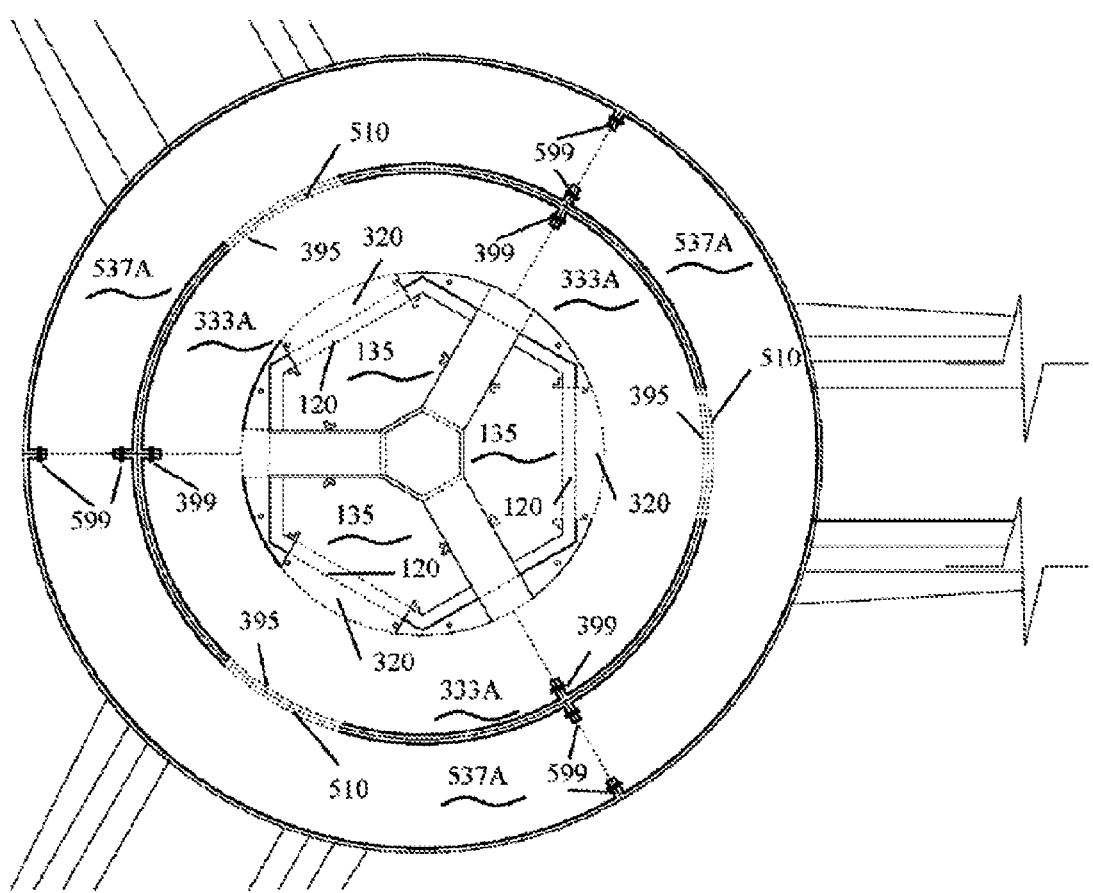
FIG. 34 shows a third floor plan of a turbine unit in the turbine system of FIG. 1, as seen in a top plan view at line c-c.
Figure 35:
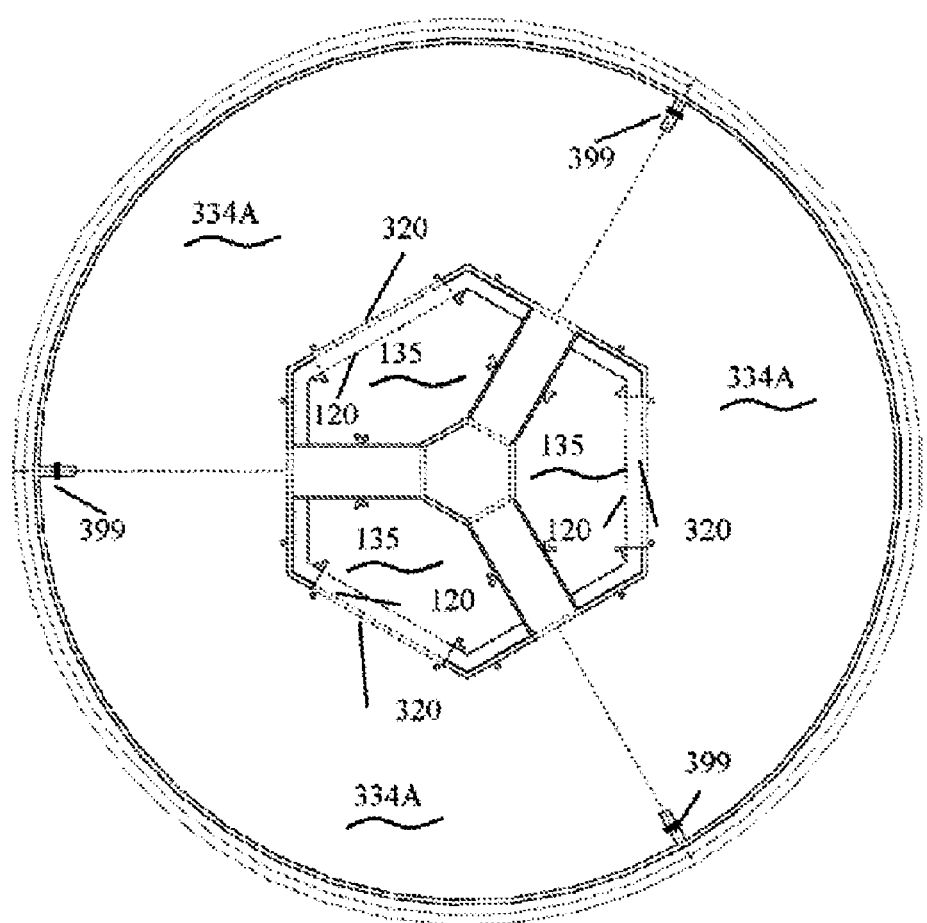
FIG. 35 shows a fourth floor plan of a turbine unit in the turbine system of FIG. 1, as seen in a top plan view at line d-d.
Figure 36A:
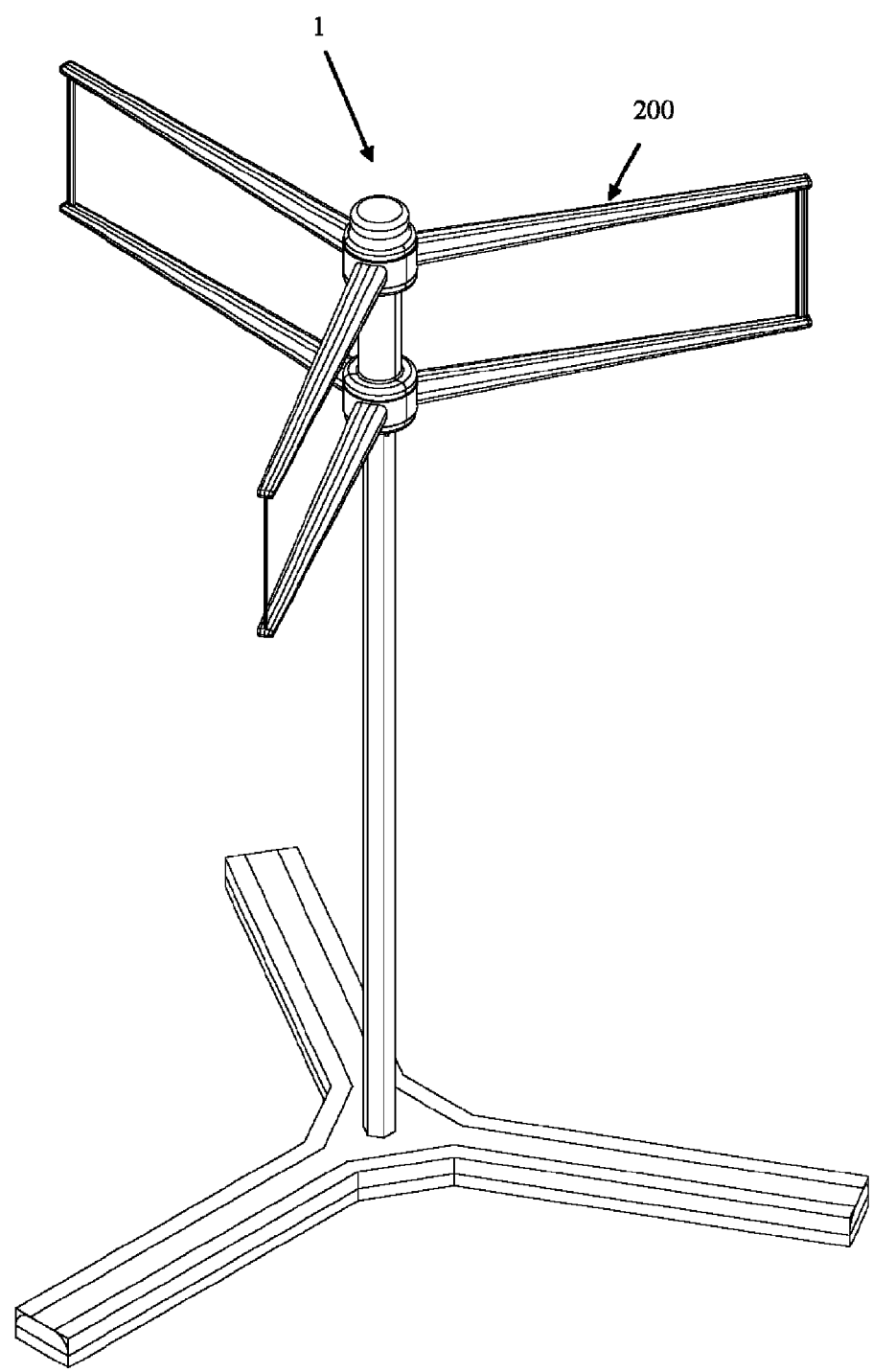
FIG. 36A shows the turbine system of FIG. 1 with a single turbine unit.
Figure 36B:
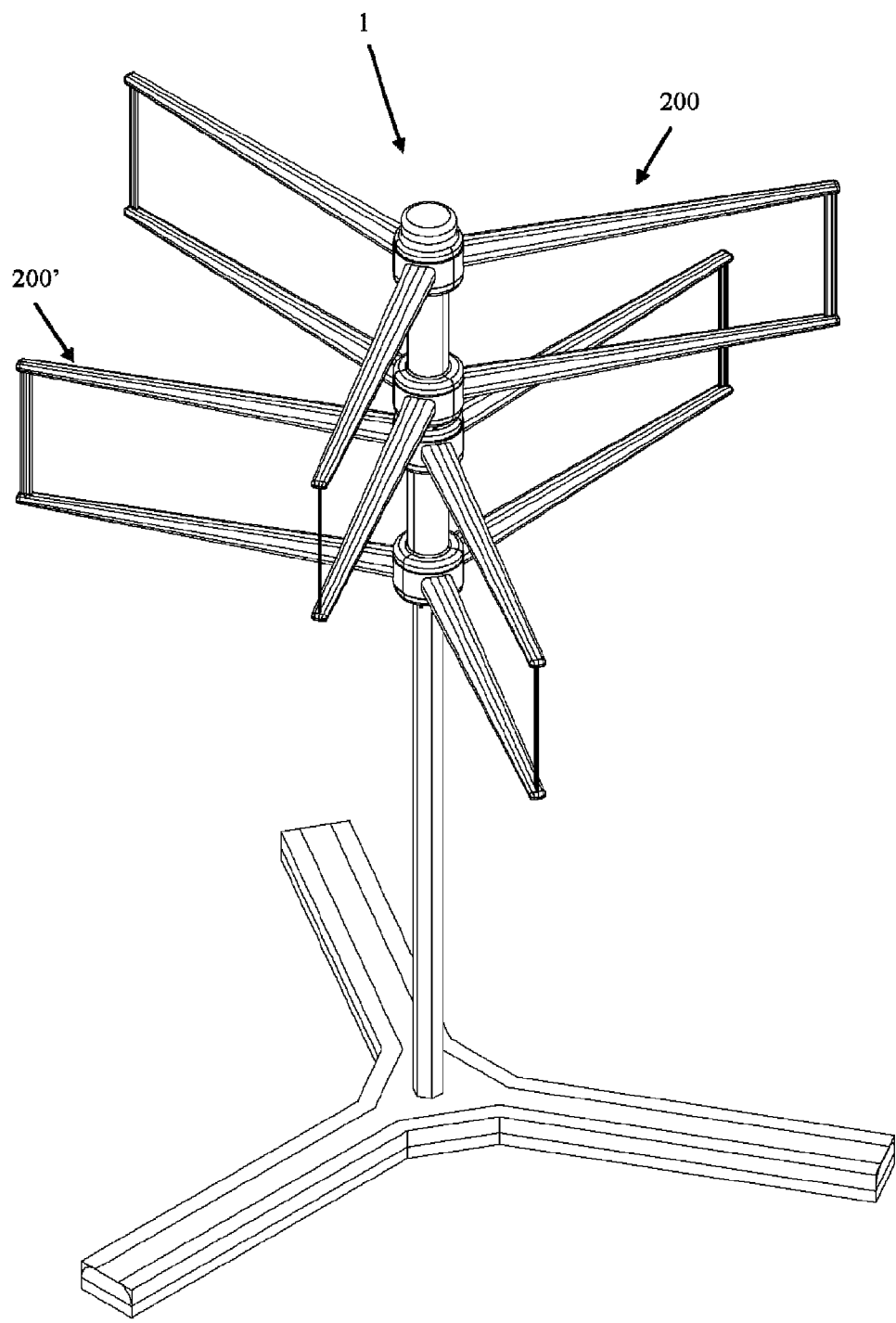
FIG. 36B shows the turbine system of FIG. 1 with two turbine units.
Figure 36C:
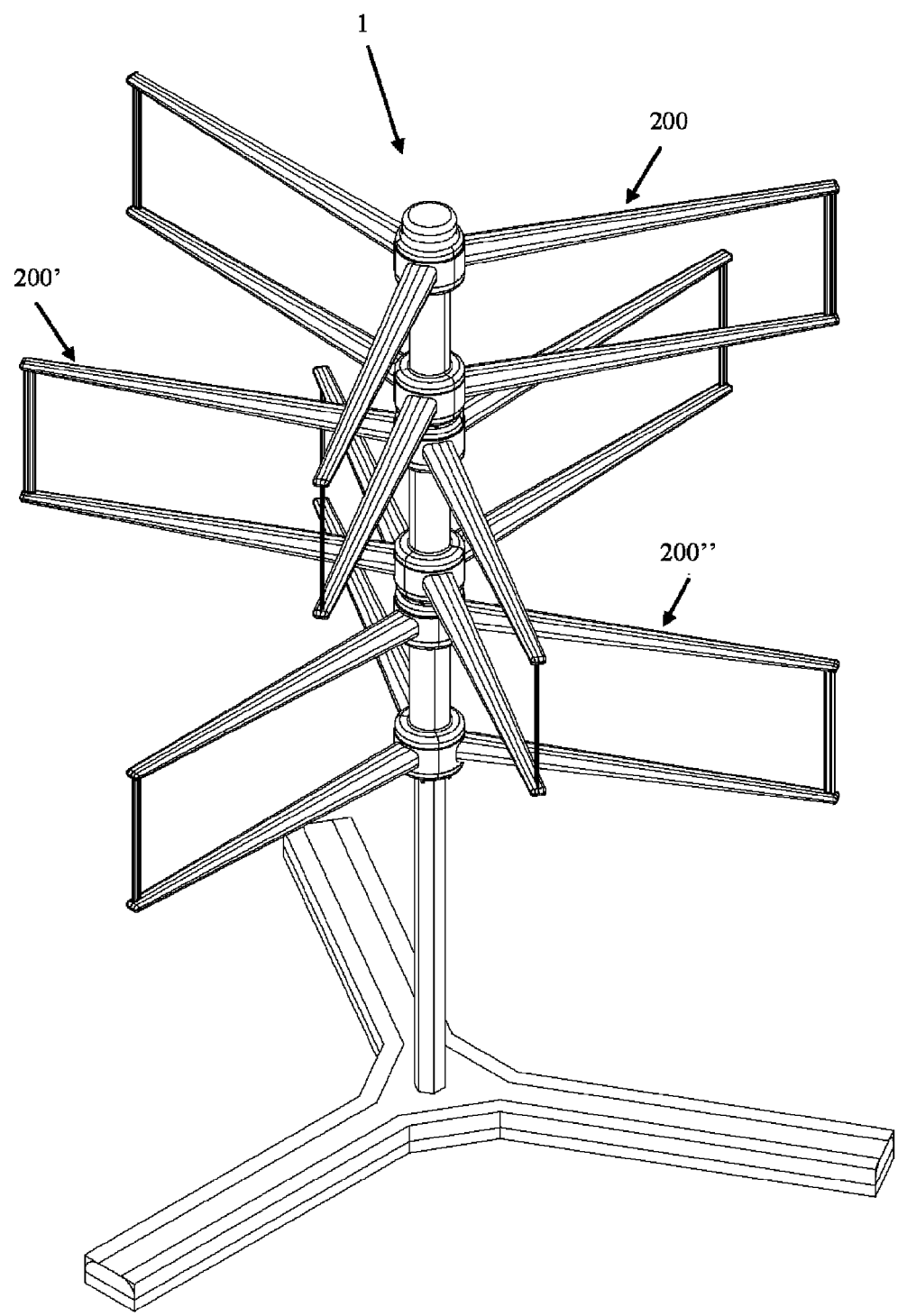
FIG. 36C shows the turbine system of FIG. 1 three turbine units.
Figure 37A:
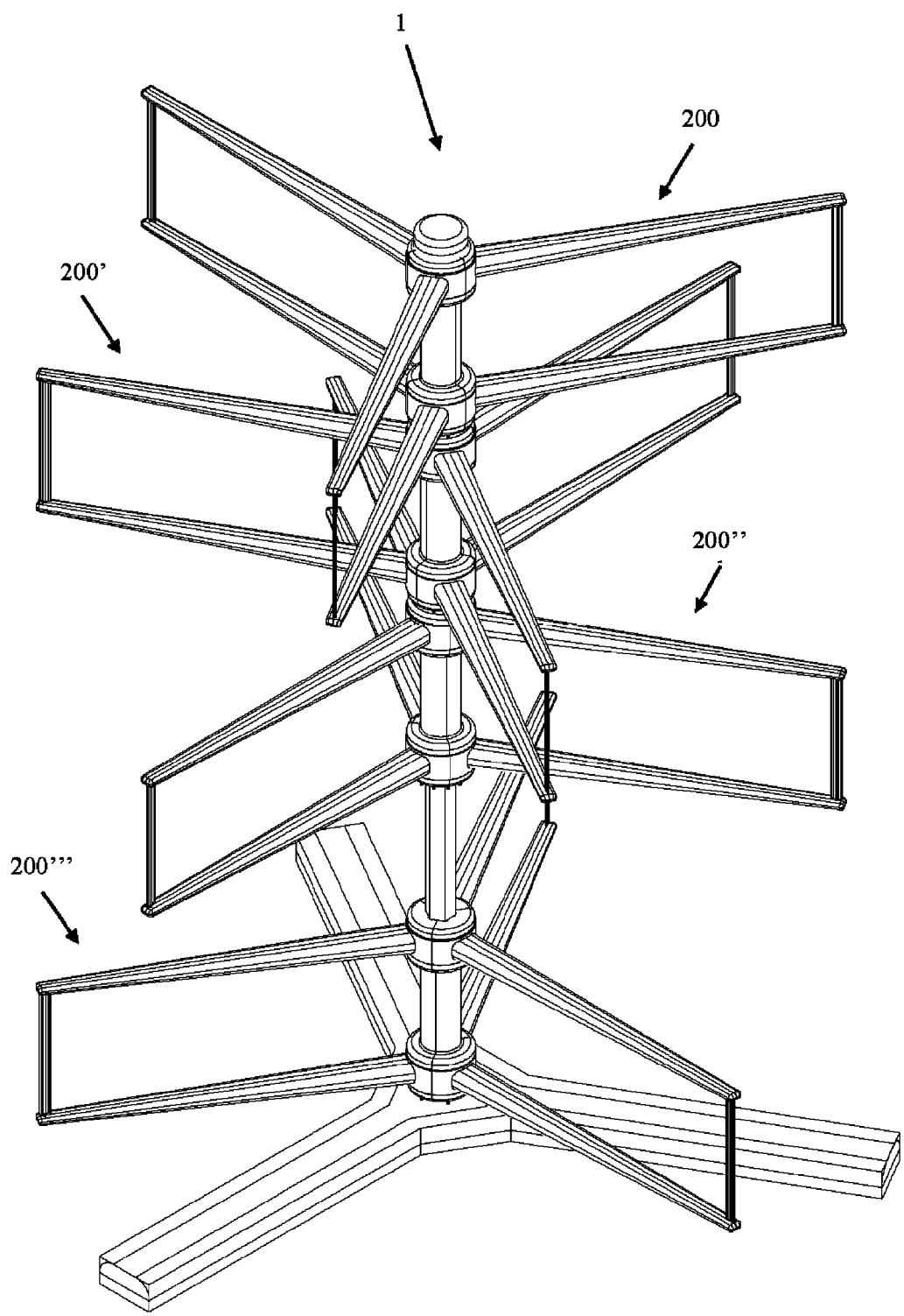
FIG. 37A shows the turbine system of FIG. 1 with three elevated turbine units and one lowered turbine unit.
Figure 37B:
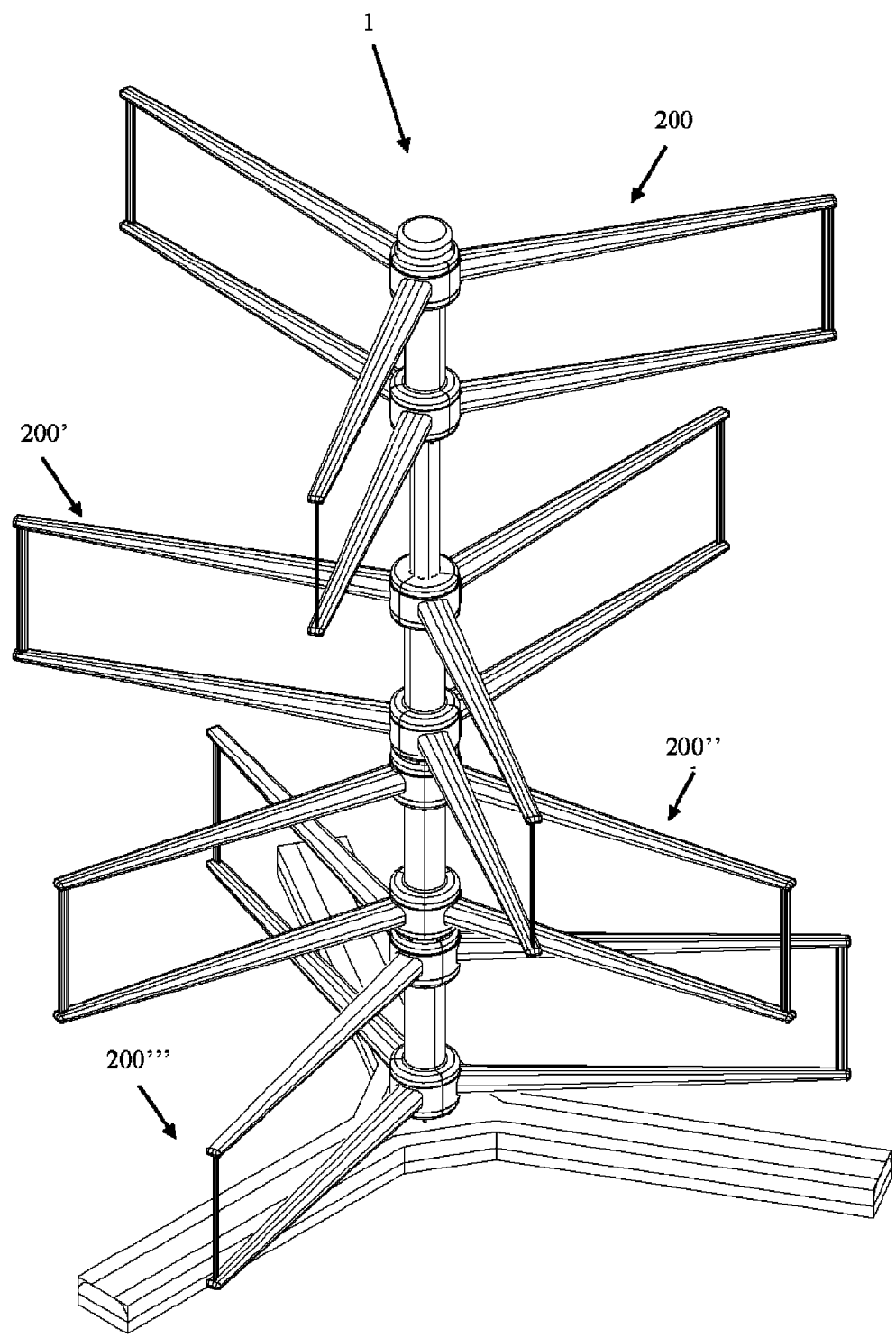
FIG. 37B shows the turbine system of FIG. 1 with one elevated turbine unit and three lowered turbine units.

Placing a turbine unit 200 in an alignment such that in FIG. 31 will result in the unit having floor plans such as those shown in FIGS. 32-35 and will permit personnel to access every interior room 331-334, 536-537, 615 of the turbine unit 200 via the elevator shafts 135A/135B/135C. In particular, each carousel-carrier segment 301 may include at least one portal 320 at the vertical channel 305 that aligns with at least one portal 120 at the mast 100, such that an elevator shaft 135 in the mast 100 may communicate with the interior rooms 331-334 of the carousel-carrier 300 via the aligned portals 120/320. Also, each carousel-carrier segment 301 may include at least one portal 395 at the peripheral channel 345 that aligns with at least one portal 510 at the vertical channel 505 of a corresponding carousel-hub segment 501, such that at least some of the interior rooms 331-334 in the carousel-carrier 300 may communicate with some or all of the interior rooms 536-537 of the carousel-hub 500 via the aligned portals 395/510. Also, each carousel-hub segment 501 may include at least one portal 555 at an arm socket 550 (upper and/or lower) that opens to the carousel arm 600 coupled to the arm socket 550, such that at least some of the interior rooms 536-537 in the carousel-hub 500 may communicate with the passageway 615 through the carousel arm 600 via the portal 555 at the arm socket 550.

An access control system may control accessibility to all portals at the mast 100 and in the turbine unit 200. In particular, an access control system may determine whether a portal is safe for passage, and may operate to secure a closure at that portal to prevent passage therethrough when it is determined there is a safety concern associated with passage through that portal. In this way, the access control system may permit access through portals 120 along the mast 100 only when it is determined there is a carousel-carrier 300 properly aligned at the other side of the particular portal 120. When a carousel-carrier 300 is not present (or not properly aligned) at a particular portal 120, the access control system will maintain a closure at that portal 120 in a secured position to prevent personnel from passing therethrough. In one example, the access control system may simply prevent an elevator 136 in the elevator shaft 135 from stopping at any portal 120 that is not deemed safe for access.

In a similar manner, the access control system may permit access through portals 395 at the peripheral channel 345 of the carousel-carrier 300 only when it is determined the carousel-hub 500 is braked against rotation with a properly aligned portal 510. When the carousel-hub 500 is not properly aligned (or not braked), the access control system will maintain a closure at that portal 395 in a secured position to prevent personnel from passing therethrough. In one example, the access control system may deny entry into the carousel-carrier 300 of a turbine unit 200 that is determined to have an unaligned (or unbraked) carousel-hub 500. In another example, the access control system may prevent an elevator 136 in the elevator shaft 135 from stopping at any portal 120 where there is parked a turbine unit 200 that is deemed to have an unaligned (or unbraked) carousel-hub 500.

As the carousel arms 600 do not move relative to the arm sockets 550, the access control system will normally permit access to the portal 555 at the arm socket 550 by default. However, the access control system may deny access to a portal 555 at an arm socket 550 if there is deemed a safety issue with passing into the particular carousel arm 600. For example, the access control system may secure closures at any portal in the turbine system 1 when there is detected a safety concern such as fire, smoke, and/or a breach in the exterior hull of a turbine unit 200 or turbine component (e.g., carousel arm 600; carousel-hub 500; etc.). The access control system may also secure closures at portals to the interior rooms housing the stator 235 and the rotor 260 if there is deemed any irregularities in the electrical state of those components that may pose a safety concern.

The access control system may be a centralized system located at the mast base 105 (or base-structure 2); and/or each carousel-carrier 300 may house a localized access control system that may act independently for that turbine unit 200 and/or supplement the operations of the centralized access control system. The access control system may also control access to any external portals at outer surfaces of the carousel-carrier 300, the carousel-hub 500, and the carousel arms 600—as well as access to any portals at the mast roof 110.

As shown in FIGS. 36A-37B, the turbine system 1 may include multiple turbine units 200 positioned along a common mast 100. The addition of one or more subsequent turbine units 200 to the mast 100 may proceed according to the same assembly methods as that for the first turbine unit 200, once the first turbine unit 200 is moved upward along the mast 100 from the assembly position at the foot of the mast 100.

Advantageously, the independent nature of the turbine units 200 allows for upgrading of older turbine systems 1 previously deployed and operated (e.g., for months or years) by the addition of one or more additional turbine units 200—or by the replacement of one or more turbine units 200 previously deployed on the mast 100.

When employing winches 150 at the mast roof 110 for raising and lowering turbine units 200 along the mast 100, attachment of a second or subsequent turbine unit 200 below a first higher elevated turbine unit 200 may be achieved by the use of winch channels 385 extending through the turbine units 200 (e.g., through the carousel-carrier 300 components).

Figure 38:
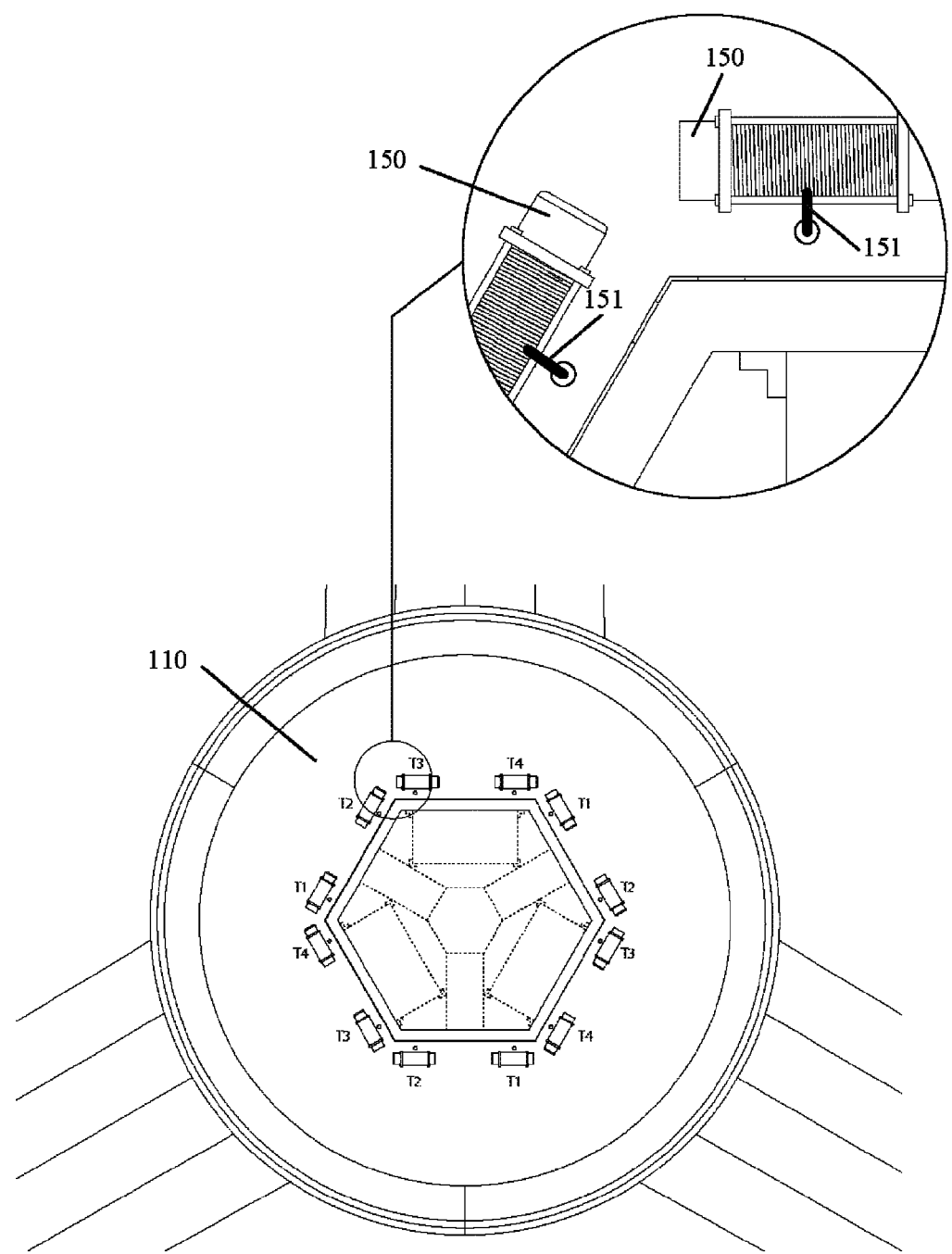
FIG. 38 shows winches at the mast roof of the turbine system in FIG. 1.

FIGS. 38-40 show one example of a turbine system 1 with multiple turbine units 200 that are raised and lowered by winch cables 151 from winches 150 at the mast roof 110. In that example, the carousel-carrier 300 of each turbine unit 200 includes a number of winch channels 385 extending vertically through the carousel-carrier 300, from the top surface to the bottom surface. When connecting a second turbine unit 200, additional winch cables 151 are lowered from the winches 150 at the mast roof 110 and fed through the winch channels 385 in the first turbine unit 200, and coupled to the winch coupling mechanisms 380 on the top surface of the second turbine unit 200. Similarly, if connecting a third turbine unit 200, further winch cables 151 are lowered from the winches 150 at the mast roof 110 and feed through winch channels 385 in both the first and second turbine units 200, and coupled to the winch coupling mechanisms 380 at the top surface of the third turbine unit 200. The addition of a fourth or further turbine unit 200 proceeds in a similar fashion.

Rotation of a carousel 400 in a turbine unit 200 mounted to the mast 100 confers torsional stresses and moments to the mast 100. The addition of further carousels 400 rotating in further turbine units 200 presents a risk of increased torsional stresses and moments. The cumulative effect of torsional stresses and moments from multiple rotating carousels 400 may cause the integrity of the turbine system 1 to degrade at a faster rate than if there were only one rotating carousel 400; and, if left unchecked, could yield failures in the mast 100.

In the turbine system 1, the cumulative effect of multiple rotating carousels 400 is addressed by controlling adjacent carousels 400 to rotate in opposite directions relative to one another. In this way, the torsional stresses and moments generated by one rotating carousel 400 may be offset by the torsional stresses and moments generated by an adjacent rotating carousel 400, thereby minimizing the cumulative torsional stresses and moments to the mast 100. Though not being bound by theory, it is considered that in some circumstances operating the turbine system 1 with the carousels 400 on adjacent turbine units 200 rotating in opposite directions may theoretically result in lesser cumulative torsional stresses and moments to the mast 100 than would result from the operation of a single turbine unit 200 with a single rotating carousel 400 due to the cancellation of oppositely oriented torsional stresses and moments.

Figure 41:
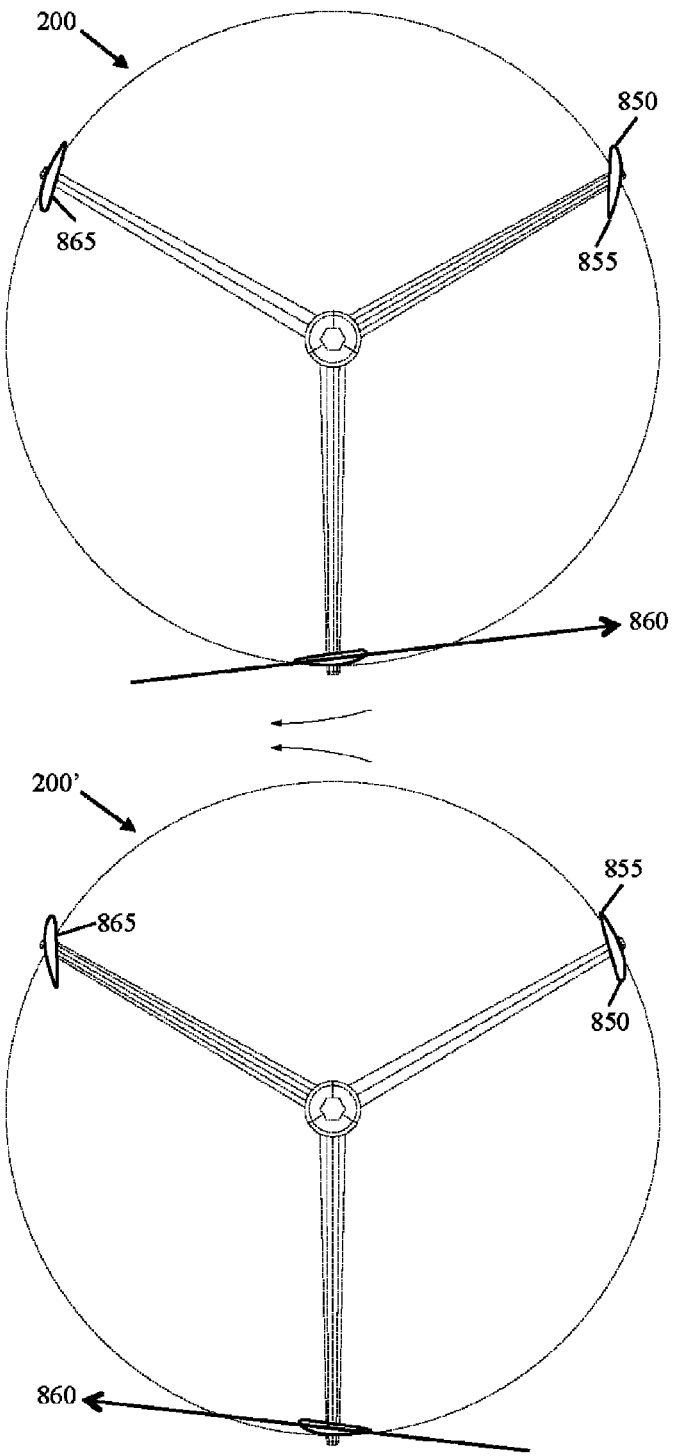
FIG. 41 shows a schematic of alternating alignments for carousel blades in the turbine system of FIG. 1.

In the turbine system 1, carousels 400 of adjacent turbine units 200 may be made to rotate in opposite directions by controlling the carousel blades 800 on the adjacent carousels 400 to have opposing angles of attack relative to the oncoming wind flow. For example, as shown in FIG. 41, the carousel blades 800 on a first turbine unit 200 may be controlled such that the leading edges 850 are oriented in a first direction, while the carousel blades 800 on a second adjacent turbine unit 200 are controlled such that the leading edges 850 are oriented in a second opposing direction. The reverse rotation of adjacent carousels may be further promoted by providing adjacent carousels 400 with asymmetric carousel blades 800 mounted with inverted orientations. For example, as also shown in FIG. 41, a first turbine unit 200 may have asymmetric blades 800 that are mounted such that the "higher pressure surface" 865 faces radially inward of the blade orbit (i.e., towards the mast 100) when a trailing-to-leading edge vector 860 of the blade is oriented substantially in a counterclockwise direction, while a second adjacent turbine unit 200 may have asymmetric blades 800 that are mounted such that the "higher pressure surface" 865 faces radially inward of the blade orbit when a trailing-to-leading edge vector 860 of the blade is oriented substantially in a clockwise direction.

Upon initiating rotation of adjacent carousels 400 in opposite directions, the aerodynamic command systems of the turbine units 200 may be employed to constantly rotate the carousel blades 800 of the respective turbine units 200 to achieve angles of attack relative to the wind flow that will not only maximize the torque forces but also maintain the opposite rotation directions of the respective carousels 400.

In addition to rotating carousels 400 on adjacent turbine units 200 in opposite directions, the turbine system 1 may enhance the counter-active effect of such a counter rotation operation by locking the adjacent turbine units 200 to one another by the vertical interlocking mechanisms 390 at the top and bottom surfaces of the adjacent turbine units 200 (e.g., at the carousel-carrier 300 components).

Figure 42:
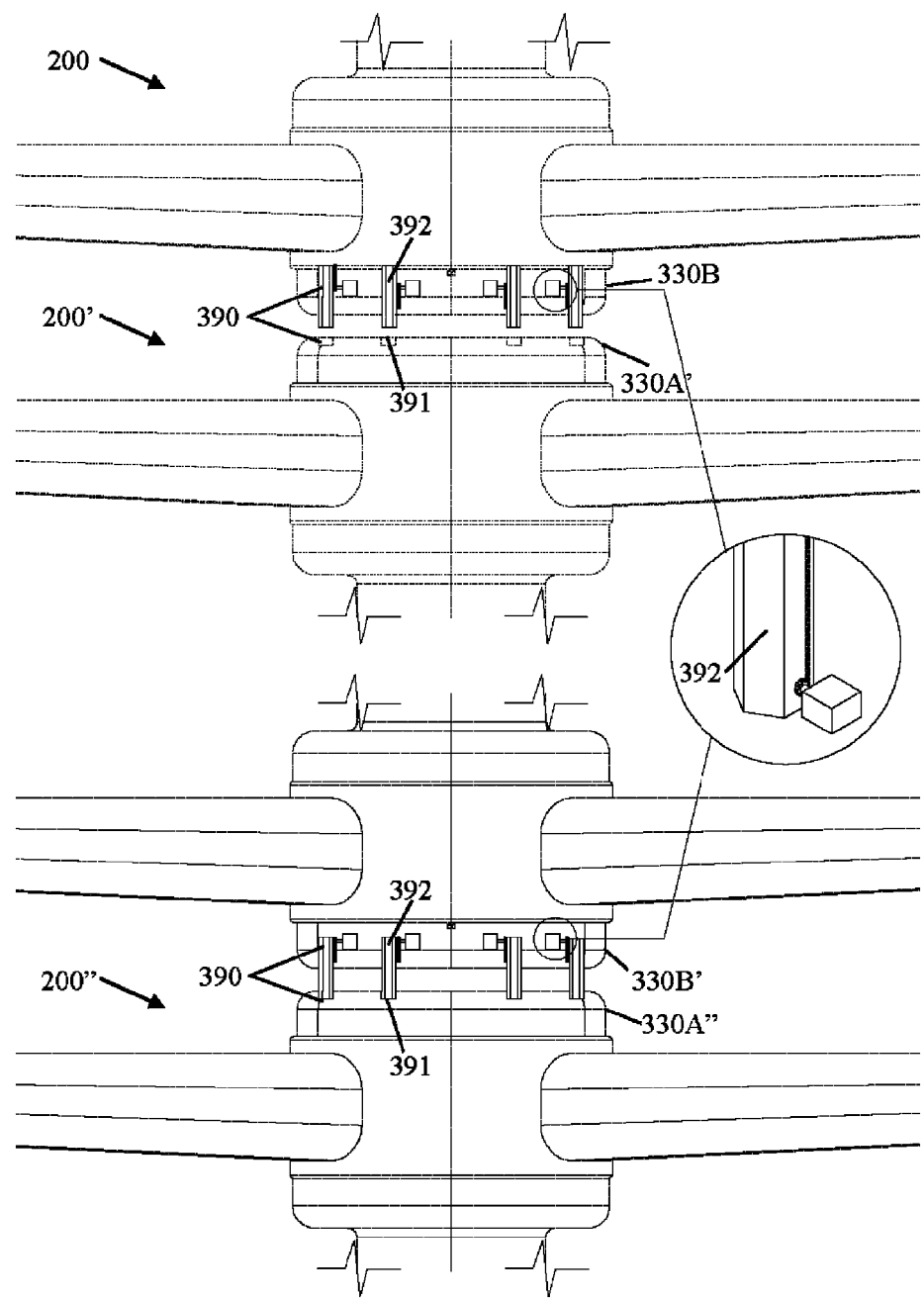
FIG. 42 shows vertical interlocking mechanisms between three adjacent turbine units in the turbine system of FIG. 1.

In the example of FIG. 42, the vertical interlocking mechanisms 390 include a number of cavities 391 in the top and/or bottom surfaces of each carousel-carrier 300 and a corresponding number of vertical beams 392 in the top and/or bottom surfaces of each carousel-carrier 300. As such, vertical beams 392 in a carousel-carrier 300 may be extended for insertion into cavities 391 in an opposing surface of another adjacent carousel-carrier 300.

Normally torsional stresses and moments generated at a carousel-carrier 300 will be transmitted to the mast 100, via the mating of the vertical channel 305 of the carousel-carrier 300 and the outer surface of the mast 100 and the mating of the load supporting mechanisms 125/310. By mating the vertical interlocking mechanisms 390 on two adjacent carousel-carriers 300, the torsional stresses and moments transmitted through the two carousel-carriers 300 will then be divided between transmission to the mast 100 and transmission to the adjacent carousel-carrier (which is locked by the vertical interlocking mechanisms 390). However, because the carousels 400 on the adjacent carousel-carriers 300 are rotating in opposite directions, the torsional stresses and moments of the two carousel-carriers 300 will have opposite orientations and will counteract one another at the vertical interlocking mechanisms 390 to reduce the cumulative effect on the mast 100.

Turbine System Operation

The power distribution, power storage, and ancillary power support systems housed in the mast base 105 and/or base-structure 2 may include at least two redundant independent and coupled or cross-linked control systems. Such control systems arbitrate control among themselves, and at least one control system at the wind farm control center; and provide for overall operational control of the turbine system, while systems at a wind farm control center provide redundancy for the turbine system 1 in issuing shutdown orders in the case of abnormal conditions, as well as balancing the overall output of the entire wind farm.

Operational control of the turbine system 1 is facilitated by a plurality of redundant sensors throughout selected components of the turbine system 1, including micro miniaturized embedded sensors in all critical components. Redundancy is further provided by alternate paths between the redundant sensors and each of the control systems at the mast base 105. There are at least two redundant control and data paths linking the control systems at the mast base 105 with the wind farm control system for both normal and abnormal operations.

Control and data between the mast base 105 and the wind farm control system may be transmitted by one or more fiber-optic encrypted links; satellite encrypted RF links; cellular encrypted RF links; other high frequency encrypted RF links. Communications between the mast base 105 and the wind farm control system may incorporate three-level authentication adaptive encrypted protocols, with the protocols used for internal and external communications.

The turbine system 1 may also incorporate redundant onboard A/I enhanced computer systems that integrate, in real-time, data acquisition from all sensors and data feeds including the weather station 160 at the mast roof 110 and external data sent by the wind farm control center. The redundant computer systems process the input data and generate commands to control the turbine system 1 to optimize its management, operation, and performance. In some examples, the rules for the A/I enhanced computer systems may be dynamically changed as the turbine system 1 matures based on experience in prior operations and/or changes in operational regulations including operational limits.

The turbine system 1 may also incorporate software with A/I capabilities for controlling the stepper motors of each pair of carousel arms 600 in a manner that facilitates adjustments to rotational controls of individual stepper motors for factoring the proximate weather conditions affecting the respective carousel blade 800 in order to optimize the performance and operation of the respective turbine unit 200.

The turbine system 1 may also incorporate adaptive real-time feedback from the sensors and the weather station 160, and other data from the wind farm control center, to control and optimize power generation and control settings of the turbine system including those for minimizing offsetting loads and maintaining platform stability in both nominal and off nominal conditions.

The turbine system 1 may also incorporate, in real-time, environmental and weather conditions data from the weather station 160 and external data sent by the wind farm control center in order to mature the artificial intelligence systems of the turbine system 1 for predictive control during normal, abnormal, and severely abnormal weather conditions.

The turbine system 1 may also incorporate sensor data for optimizing operating conditions, both nominal and off nominal, for the purpose of enhancing overall capability factors by minimizing outages and the need for unscheduled maintenance; and may incorporate predictive A/I for scheduling maintenance by utilizing the information acquired from all sensors.

The operational systems of the turbine system 1 may incorporate a manual override capability, through computer system/optic fiber/RF means and/or via human physical interaction, that can be used to shut down, and secure the entire turbine system 1, and configure the turbine system 1 for maintenance, as needed.

The turbine systems disclosed herein may yield substantially larger electrical power generating capacity than that of the largest turbines in operation today, and to do so with a modular design that includes a number of electrical generators divided into separate turbine units, and separate compartments in individual turbine units. The modular design may also allow for a fractional power generation, over the multiple turbine units, which allows the turbine system to continue generating power even though a generation unit may be stopped and awaiting repair.

The splitting of the power conversion and output into independent electrical generators may also allow the use of individual components of much smaller size and weight over which the loads exerted and stresses incurred may be spread—which is expected to significantly prolong the lifetime of the system as a whole. Also, by spreading the bulk of the system over multiple turbine units, the heft of the arms and blades may be reduced, which is expected to permit the construction of longer arms that may allow for swept areas substantially larger than those of the largest horizontal axis wind turbines currently in use.

As the turbine system is constructed with modular components, the system may be assembled at the installation site, at the very foot of the mast, thereby facilitating manufacturing, transportation and assembly of the complete turbine system. This may allow land-based constructions to be assembled with conventional cranes and construction equipment; and offshore-based constructions to be assembled with readily available commercial seagoing construction craft.

The modular design based on circumferentially segmented assemblies and subassemblies, and the use of multiple generator systems therein, may provide the system with a higher lifetime capacity as the individual segmented assemblies and subassemblies may be efficiently maintained, serviced and replaced as necessary over an extended lifetime without having to disassemble the entire turbine assembly. As such, this system may significantly reduce the costs and risks associated with assembling and maintaining a turbine system, especially those systems that require more frequent maintenance due their operation in and exposure to adverse environmental conditions. Also, as the modular components are segmented with a form factor of three, the individual turbine units are given an optimal form factor for segmenting modularly constructed direct drive three phase generators for wind turbines.

Although the present invention is described with reference to particular embodiments, it will be understood to those skilled in the art that the foregoing disclosure address exemplary embodiments only, and is not limiting the invention as defined by the appended claims and their equivalents. Thus, the scope of the invention is not limited to the disclosed embodiments, and may encompass additional embodiments embracing various changes and modifications relative to the examples disclosed herein without departing from the scope of the invention as defined in the appended claims.

For example, various mating components such as the electrical communications mechanisms, movement mechanisms, load supporting and interlocking mechanisms; and braking mechanisms may be replaced with other suitable such mechanisms other than the specific examples set forth herein. Also, such mating mechanisms may be reversed between the mating components—for example, by switching male/female components relative to the above examples.

In another example, instead of using smooth rollers as the movement mechanisms at the vertical channel of the carousel-carrier, there may alternatively be used toothed rollers that mate with toothed tracks along the mast. In such an alternative, the toothed rollers may communicate with a ratchet mechanism within the carousel-carrier that acts as a safety catch to prevent reverse movement of the tooth rollers and unintended sliding of the carousel-carrier along the mast. In some examples, such toothed rollers may communicate with a motorized system and be the principal movement mechanism for the carousel-carrier (and the turbine unit as a whole), thereby foregoing the need for a separate winch system.

While the disclosed methods may be performed by executing all of the disclosed steps in the precise order disclosed, those skilled in the art will appreciate the methods may also be performed: with further steps interposed between the disclosed steps; with the disclosed steps performed in an order other than the exact order disclosed; with one or more disclosed steps performed simultaneously; and with one or more disclosed steps omitted.

To the extent necessary to understand or complete the disclosure of the present invention, all publications, patents, and patent applications mentioned herein are expressly incorporated by reference herein to the same extent as though each were individually so incorporated. In addition, ranges expressed in the disclosure are considered to include the endpoints of each range, all values in between the end points, and all intermediate ranges subsumed by the end points.

Accordingly, the present invention is not limited to the specific embodiments as illustrated herein, but is instead characterized by the appended claims.

What is claimed is:

1. A wind turbine system comprising:
   a wind turbine unit comprising a carousel-carrier and a carousel supported on the carousel-carrier such that the carousel is rotatable around the carousel-carrier, wherein
   the carousel-carrier comprises an interior space for housing a generator stator, and a vertical channel extending through a radial center of the carousel-carrier for reception of a vertical mast, the vertical channel being configured to prevent the carousel-carrier from rotating around a mast received in the vertical channel,
   the carousel comprises a carousel-hub having an interior space for housing a generator rotor, multiple pairs of carousel arms extending outwardly from an outer surface of the carousel-hub, and a carousel blade extending between carousel arms in respective pair of carousel arms,
   the carousel-carrier comprises a peripheral channel extending circumferentially around an outer surface of the carousel-carrier for receiving and rotatably supporting the carousel-hub,
   the turbine unit is a modular turbine unit that is an assembly of multiple turbine segments, the turbine segments being circumferential segments that releasably couple to adjacent turbine segments to assemble a complete turbine unit,
   the carousel-carrier is a modular carousel-carrier that is an assembly of multiple carousel-carrier segments, the carousel-carrier segments being circumferential segments that releasably couple to circumferentially adjacent carousel-carrier segments to assemble a complete carousel-carrier, and
   the carousel-hub is a modular carousel-hub that is an assembly of multiple carousel-hub segments, the carousel-hub segments being circumferential segments that releasably couple to circumferentially adjacent carousel-hub segments to assemble a complete carousel-hub.

2. The wind turbine system of claim 1, wherein
   the carousel-carrier segments comprise subcomponent segments of multiple subcomponents, the subcomponent segments of the carousel-carrier segments being circumferential segments that releasably couple to circumferentially adjacent subcomponent segments to assemble a complete modular subcomponent of the carousel-carrier.

3. The wind turbine system of claim 1, wherein the carousel-hub segments comprise subcomponent segments of multiple subcomponents, the subcomponent segments of the carousel-hub segments being circumferential segments that releasably couple to circumferentially adjacent subcomponent segments to assemble a complete modular subcomponent of the carousel-hub.

4. The wind turbine system of claim 1, wherein the interior space of the carousel-hub comprises a rotor housing that releasably receives rotor segments of a modular generator rotor.

5. The wind turbine system of claim 4, wherein the rotor housing receives rotor segments that are sufficiently sized for passage through interior rooms and portals of the carousel-carrier and carousel-hub, such that individual rotor segments may be selectively inserted and removed in the wind turbine system while the carousel-hub remains supported on the carousel-carrier.

6. The wind turbine system of claim 4, wherein the rotor housing comprises electrical connections for mating with pre-wired rotor segments, including electrical connections for mating with rotor segments pre-wired for generating alternating electrical current and electrical connections for mating with rotor segments pre-wired for generating direct electrical current.

7. A wind turbine system comprising:
a wind turbine unit comprising a carousel-carrier and a carousel rotatably supported on the carousel-carrier, wherein
a vertical channel extends through a radial center of the carousel-carrier for reception of a vertical mast, and a peripheral channel extends circumferentially around an outer surface of the carousel-carrier for receiving and rotatably supporting the carousel,
the carousel comprises a carousel-hub, a pair of carousel arms extending from the carousel-hub, and a carousel blade extending between the pair of carousel arms,
the turbine unit is a modular turbine unit that is an assembly of multiple turbine segments, the turbine segments being circumferential segments that releasably couple to adjacent turbine segments, and
a rotating electrical joint for transmitting an electrical power between the carousel-carrier and the carousel, the rotating electrical joint comprising a slip ring and a number of slip ring brushes mounted for rotating engagement with the modular slip ring, wherein the slip ring is a modular slip ring that is an assembly of multiple slip ring segments, the slip ring segments being circumferential segments that releasably couple to adjacent slip ring segments.

8. A wind turbine system comprising:
a wind turbine unit comprising a carousel-carrier and a carousel rotatably supported on the carousel-carrier, wherein
a vertical channel extends through a radial center of the carousel-carrier for reception of a vertical mast, and a peripheral channel extends circumferentially around an outer surface of the carousel-carrier for receiving and rotatably supporting the carousel,
the carousel comprises a carousel-hub, a pair of carousel arms extending from the carousel-hub, and a carousel blade extending between the pair of carousel arms,
the turbine unit is a modular turbine unit that is an assembly of multiple turbine segments, the turbine segments being circumferential segments that releasably couple to adjacent turbine segments, and
a carousel rotation system for rotating the carousel on the carousel-carrier, the carousel rotation system comprising a crown gear and a pinion mounted for rotating engagement with the crown gear, wherein the crown gear is a modular crown gear that is an assembly of multiple crown gear segments.

9. A wind turbine system comprising:
a wind turbine unit comprising a carousel-carrier and a carousel rotatably supported on the carousel-carrier, wherein
a vertical channel extends through a radial center of the carousel-carrier for reception of a vertical mast, and a peripheral channel extends circumferentially around an outer surface of the carousel-carrier for receiving and rotatably supporting the carousel,
the carousel comprises a carousel-hub, a pair of carousel arms extending from the carousel-hub, and a carousel blade extending between the pair of carousel arms,
the turbine unit is a modular turbine unit that is an assembly of multiple turbine segments, the turbine segments being circumferential segments that releasably couple to adjacent turbine segments, and
a carousel braking system for braking the carousel against rotation on the carousel-carrier, the carousel braking system comprising a brake rotor and a number of brake calipers mounted for braking engagement with the brake rotor, wherein the brake rotor is a modular brake rotor that is an assembly of multiple brake rotor segments.

10. A wind turbine system comprising:
a wind turbine unit comprising a carousel-carrier and a carousel rotatably supported on the carousel-carrier, wherein
a vertical channel extends through a radial center of the carousel-carrier for reception of a vertical mast, and a peripheral channel extends circumferentially around an outer surface of the carousel-carrier for receiving and rotatably supporting the carousel,
the carousel comprises a carousel-hub, a pair of carousel arms extending from the carousel-hub, and a carousel blade extending between the pair of carousel arms,
the turbine unit is a modular turbine unit that is an assembly of multiple turbine segments, the turbine segments being circumferential segments that releasably couple to adjacent turbine segments,
the carousel-carrier is a modular carousel-carrier that is an assembly of multiple carousel-carrier segments, the carousel-carrier segments being circumferential segments that releasably couple to adjacent carousel-carrier segments,
the carousel-hub is a modular carousel-hub that is an assembly of multiple carousel-hub segments, the carousel-hub segments being circumferential segments that releasably couple to adjacent carousel-hub segments,
the carousel-carrier segments comprise first braking mechanisms and the carousel-hub segments comprise second braking mechanisms, the first and second braking mechanisms being engageable to secure the carousel-hub segments to corresponding carousel-carrier segments, and
an individual turbine segment comprises a carousel-carrier segment and a carousel-hub segment that are secured to one another by first and second braking mechanisms, the individual turbine segment being releasably couplable to adjacent turbine segments while the carousel-carrier segment and the carousel-hub segment are secured by the first and second braking mechanisms such that the turbine segments are configured to enable assembly of the turbine unit from the multiple turbine segments contemporaneously with assembly of the carousel-carrier from the multiple carousel-carrier segments and assembly of the carousel-hub from the multiple carousel-hub segments.

11. A method of assembling a wind turbine system of claim 1, comprising:
coupling together adjacent segments to yield an assembled modular structure.

12. The method of assembling a wind turbine system according to claim 11, wherein
the turbine segments are circumferentially aligned around the foot of a vertical mast, such that the assembled turbine unit is mounted on the vertical mast.

13. The method of assembling a wind turbine system according to claim 12, further comprising
raising the turbine unit from the foot of the mast along the vertical height of the mast via a movement mechanism mounted at the mast or the turbine unit.

14. A method of assembling a turbine system,
the turbine system comprising:
a wind turbine unit comprising a carousel-carrier and a carousel rotatably supported on the carousel-carrier, wherein
a vertical channel extends through a radial center of the carousel-carrier for reception of a vertical mast, and a peripheral channel extends circumferentially around an outer surface of the carousel-carrier or receiving and rotatably supporting the carousel,
the carousel comprise a carousel-hub, a pair of carousel arms, and a carousel blade extending between the pair of carousel arms, and
the turbine unit is a modular turbine unit that is an assembly of multiple turbine segments, the turbine segments being circumferential segments that releasably couple to adjacent turbine segments,
the method comprising:
coupling together a number of turbine segments to yield an assembled turbine unit, wherein
the number of turbine segments are coupled together around the foot of a vertical mast, such that the assembled turbine unit is mounted on the vertical mast,
the carousel-carrier is a modular carousel-carrier that is an assembly of multiple carousel-carrier segments, the carousel-carrier segments being circumferential segments that releasably couple to adjacent carousel-carrier segments,
the carousel-hub is a modular carousel-hub that is an assembly of multiple carousel-hub segments, the carousel-hub segments being circumferential segments that releasably couple to adjacent carousel-hub segments,
the carousel-carrier segments comprise first braking mechanisms and the carousel-hub segments comprise second braking mechanisms, the first and second braking mechanisms being engageable to secure the carousel-hub segments to corresponding carousel-carrier segments, and
the method further comprises:
assembling individual turbine segments by joining individual carousel-hub segments to corresponding individual carousel-carrier segments, and securing the individual carousel-hub segments to the corresponding individual carousel-carrier segments by engaging the respective first and second braking mechanisms, and
while the individual carousel-hub segments are secured to the corresponding individual carousel-carrier segments by the first and second braking mechanisms, coupling together the number of turbine segments to yield the assembled turbine unit by coupling carousel-carrier segments in the individual turbine segments to adjacent carousel-carrier segments in adjacent turbine segments and coupling carousel-hub segments in the individual turbine segments to adjacent carousel-hub segments in adjacent turbine segments.

15. The wind turbine system of claim 1, wherein
the turbine segments are assemblies comprising at least one carousel-carrier segment and/or at least one carousel-hub segment.

16. The wind turbine system of claim 2, wherein
the carousel-carrier segments comprise subcomponent segments for assembling:
a modular generator stator subcomponent that is an assembly of multiple generator stator segments;
a modular roller platform subcomponent that is an assembly of multiple roller platform segments, or a modular roller track subcomponent that is an assembly of multiple roller track segments; and
a modular slip ring subcomponent that is an assembly of multiple slip ring segments, or a modular annular brake rotor subcomponent that is an assembly of multiple annular brake rotor segments.

17. The wind turbine system of claim 3, wherein
the carousel-hub segments comprise subcomponent segments for assembling:
a modular generator rotor subcomponent that is an assembly of multiple generator rotor segments;
a modular roller track subcomponent that is an assembly of multiple roller track segments, or a modular roller platform subcomponent that is an assembly of multiple roller platform segments;
a modular annular brake rotor subcomponent that is an assembly of multiple annular brake rotor segments, or a modular slip ring subcomponent that is an assembly of multiple slip ring segments; and
a modular crown gear subcomponent that is an assembly of multiple crown gear segments.

18. The method of assembling a wind turbine system according to claim 11, wherein
coupling together adjacent segments to yield an assembled modular structure comprises coupling a subcomponent segment in a first turbine segment with a subcomponent in a second adjacent turbine segment by inserting a straddling segment, and
inserting a straddling segment comprises aligning a first end of the straddling segment to be received in the first turbine segment and aligning a second end of the straddling segment to be received in the second turbine segment, the first and second turbine segments being circumferentially aligned adjacent to one another.

19. The method of assembling a wind turbine system according to claim 11, wherein
coupling together adjacent segments to yield an assembled modular structure comprises circumferentially aligning the turbine segments such that circumferential ends of adjacent turbine segments abut one another, and the turbine segments are assemblies comprising at least one carousel-carrier segment and/or at least one carousel-hub segment, such that circumferentially aligning the turbine segments results in contemporaneous circumferential alignment of the carousel-carrier segments such that circumferential ends of adjacent carousel-carrier segments abut one another, and contemporaneous circumferential alignment of the carousel-hub segments such that circumferential ends of adjacent carousel-hub segments abut one another.

20. The method of assembling a wind turbine system according to claim 11, wherein coupling together adjacent segments to yield an assembled modular structure comprises circumferentially aligning the carousel-carrier segments such that circumferential ends of adjacent carousel-carrier segments abut one another, and then circumferentially aligning the carousel-hub segments such that circumferential ends of adjacent carousel-hub segments abut one another.

\* \* \* \* \*